United States Patent
Kim

(10) Patent No.: US 12,256,266 B2
(45) Date of Patent: *Mar. 18, 2025

(54) METHODS AND APPARATUSES FOR TRANSMITTING AND RECEIVING DATA IN WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,156

(22) Filed: Jan. 21, 2022

(65) Prior Publication Data

US 2022/0167210 A1    May 26, 2022

Related U.S. Application Data

(63) Continuation of application No. 16/578,956, filed on Sep. 23, 2019, now Pat. No. 11,265,759.

(30) Foreign Application Priority Data

Sep. 21, 2018 (KR) .......................... 10-2018-0114324

(51) Int. Cl.
*H04W 28/06* (2009.01)
*H04W 12/03* (2021.01)
(Continued)

(52) U.S. Cl.
CPC ........... *H04W 28/06* (2013.01); *H04W 12/03* (2021.01); *H04W 12/106* (2021.01);
(Continued)

(58) Field of Classification Search
CPC . H04W 12/03; H04W 12/033; H04W 12/106; H04W 28/06; H04W 4/70;
(Continued)

(56) References Cited

U.S. PATENT DOCUMENTS

2009/0103445 A1   4/2009   Sammour et al.
2012/0039471 A1*  2/2012   Kim ...................... H04W 12/10
                                              380/270
(Continued)

FOREIGN PATENT DOCUMENTS

KR    10-2018-0137384 A    12/2018

OTHER PUBLICATIONS

3rd Generation Partnership Project; Technical Specification Group Radio Access Network; E-UTRA; Packet Data Convergence Protocol (PDCP) specification (Release 15)) 3GPP TS 36.323 V15.0.0 (Year: 2018).*

(Continued)

*Primary Examiner* — Marcus Smith
*Assistant Examiner* — Zhaohui Yang
(74) *Attorney, Agent, or Firm* — Jefferson IP Law, LLP

(57) ABSTRACT

A method, performed by a user equipment (UE), of deciphering data in wireless communication system is provided. The method includes receiving a packet data convergence protocol (PDCP) data packet data unit (PDU), determining a RCVD_COUNT of the PDCP data PDU, determining whether integrity protection is performed to the PDCP data PDU, and performing, based on whether the integrity protection is performed to the PDCP data PDU, deciphering of the PDCP data PDU using the RCVD_COUNT, wherein the RCVD_COUNT is determined based on hyper frame number (HFN) of the PDCP data PDU determined according to RCVD_DELIV and sequence number (SN) of the PDCP data PDU, and wherein RX_DELIV is a count value of a first (Continued)

PDCP service data unit (SDU) not delivered to an upper layer of PDCP and waiting to be delivered to the upper layer of PDCP.

7 Claims, 25 Drawing Sheets

(51) Int. Cl.
    *H04W 12/106* (2021.01)
    *H04W 76/27* (2018.01)
    *H04W 76/30* (2018.01)
    *H04W 80/08* (2009.01)
(52) U.S. Cl.
    CPC ........... *H04W 76/27* (2018.02); *H04W 76/30* (2018.02); *H04W 80/08* (2013.01)
(58) Field of Classification Search
    CPC ..... H04W 76/19; H04W 76/27; H04W 76/30; H04W 80/02; H04W 80/08
    See application file for complete search history.

(56) References Cited

U.S. PATENT DOCUMENTS

| | | | |
|---|---|---|---|
| 2015/0296414 A1 | 10/2015 | Yi et al. | |
| 2018/0098309 A1 | 4/2018 | Yi et al. | |
| 2019/0044880 A1 | 2/2019 | Yi et al. | |
| 2019/0053113 A1* | 2/2019 | Wu | H04W 36/02 |
| 2019/0191474 A1 | 6/2019 | Jin et al. | |
| 2020/0099481 A1* | 3/2020 | Pan | H04L 1/1841 |
| 2021/0100063 A1* | 4/2021 | Sharma | H04W 80/02 |

OTHER PUBLICATIONS

3rd Generation Partnership Project; Technical Specification Group Radio Access Network; NR; Packet Data Convergence Protocol (PDCP) specification (Release 15)) 3GPP TS 38.323 V15.2.0 (Year: 2018).*
LG Electronics Inc, "E-mail discussion summary of PDCP receive operation", 3GPP Draft, R2-1706869, 3GPP TSG-RAN WG2 NR AdHoc, Qingdao, China, Jun. 17, 2017, XP051307176.
European Office Action dated Feb. 2, 2023, issued in European Patent Application No. 19863532.8.
ETSI; 5G; NR; Packet Data Convergence Protocol (PDCP) specification (3GPP TS 38.323 version 15.2.0 Release 15); ETSI TS 138 323; V15.2.0; Sep. 2018; France.
3GPP; 3rd Generation Partnership Project; Technical Specification Group Radio Access Network; NR; Packet Data Convergence Protocol (PDCP) specification; (Release 15); 3GPP TS 38.323; V15.2.0; Jun. 2018; Valbonne, FR.
Ericsson; Introduction of Ultra Low Latency Communication for LTE; 3GPP TSG-RAN2 Meeting #102; R2-1809210; May 21-25, 2018; Busan, South Korea.
Huawei et al.; Discarding PDCP PDUs due to disordering in IAB network with HbH ARQ; 3GPP TSG-RAN WG2 #103; R2-1812854; Aug. 20-24, 2018; Gothenburg, Sweden.
International Search Report with Written Opinion dated Dec. 30, 2019; International Appln. No. PCT/KR2019/012327.
Qualcomm Inc, "Correction to 5GS PDCP Test case 7.1.3.4.1 PDCP handover / Lossless handover / PDCP sequence number maintenance / PDCP status report to convey the information on missing or acknowledged PDCP SDUs at handover / In-order delivery and duplicate elimination in the downlink", 3GPP Draft, R5-184343, 3rd Generation Partnership Project (3GPP), vol. RAN WG5, Gothenburg, Sweden, Aug. 20, 2018-Aug. 24, 2018, Sep. 9, 2018.
Extended European Search Report dated Oct. 15, 2021, issued in European Patent Application No. 19863532.8.
Korean Office Action dated Jan. 21, 2024, issued in Korean Patent Application No. 10-2018-0114324.
European Notice of Allowance dated Dec. 9, 2024, issued in European Patent Application No. 19863532.8.

* cited by examiner

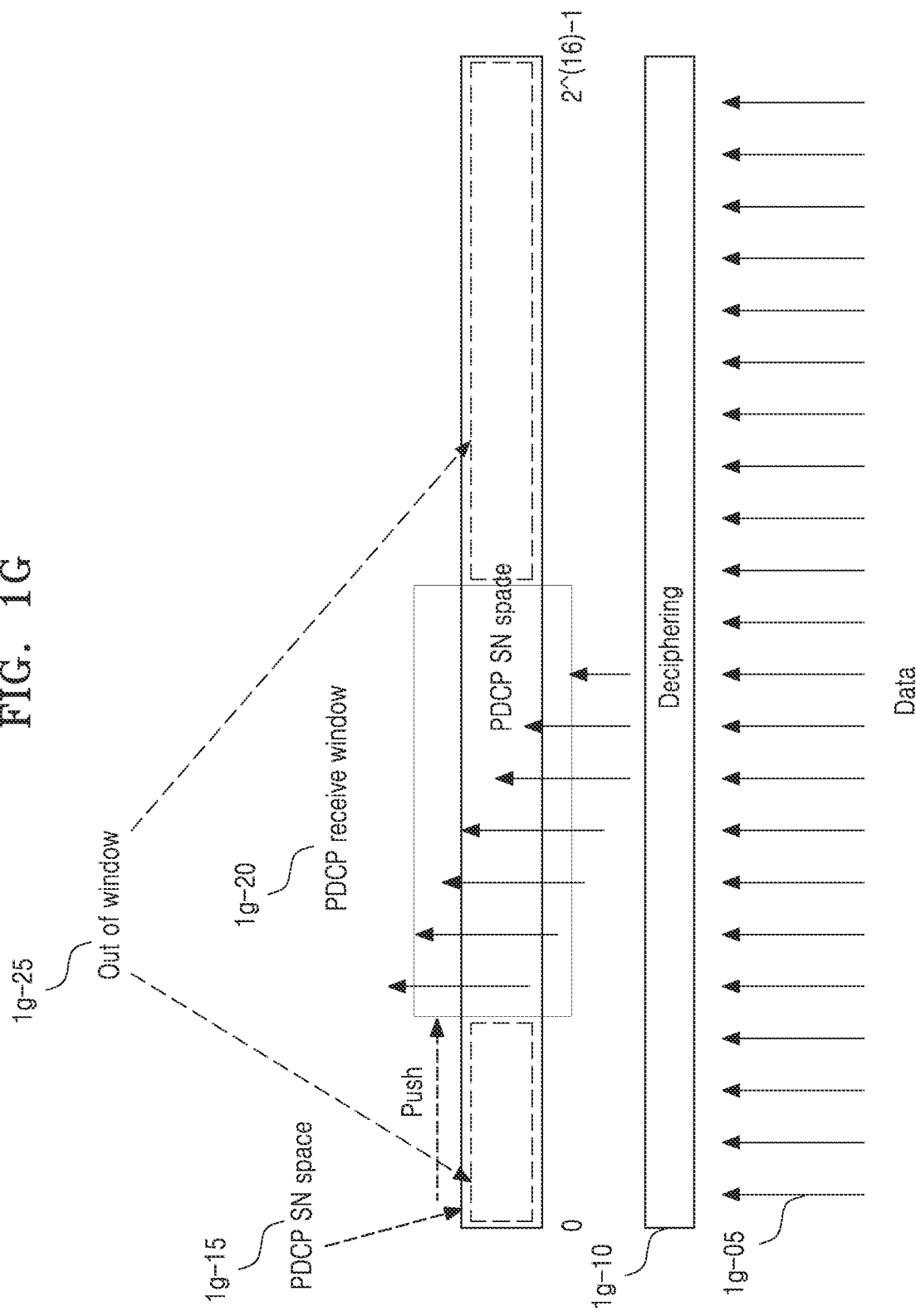

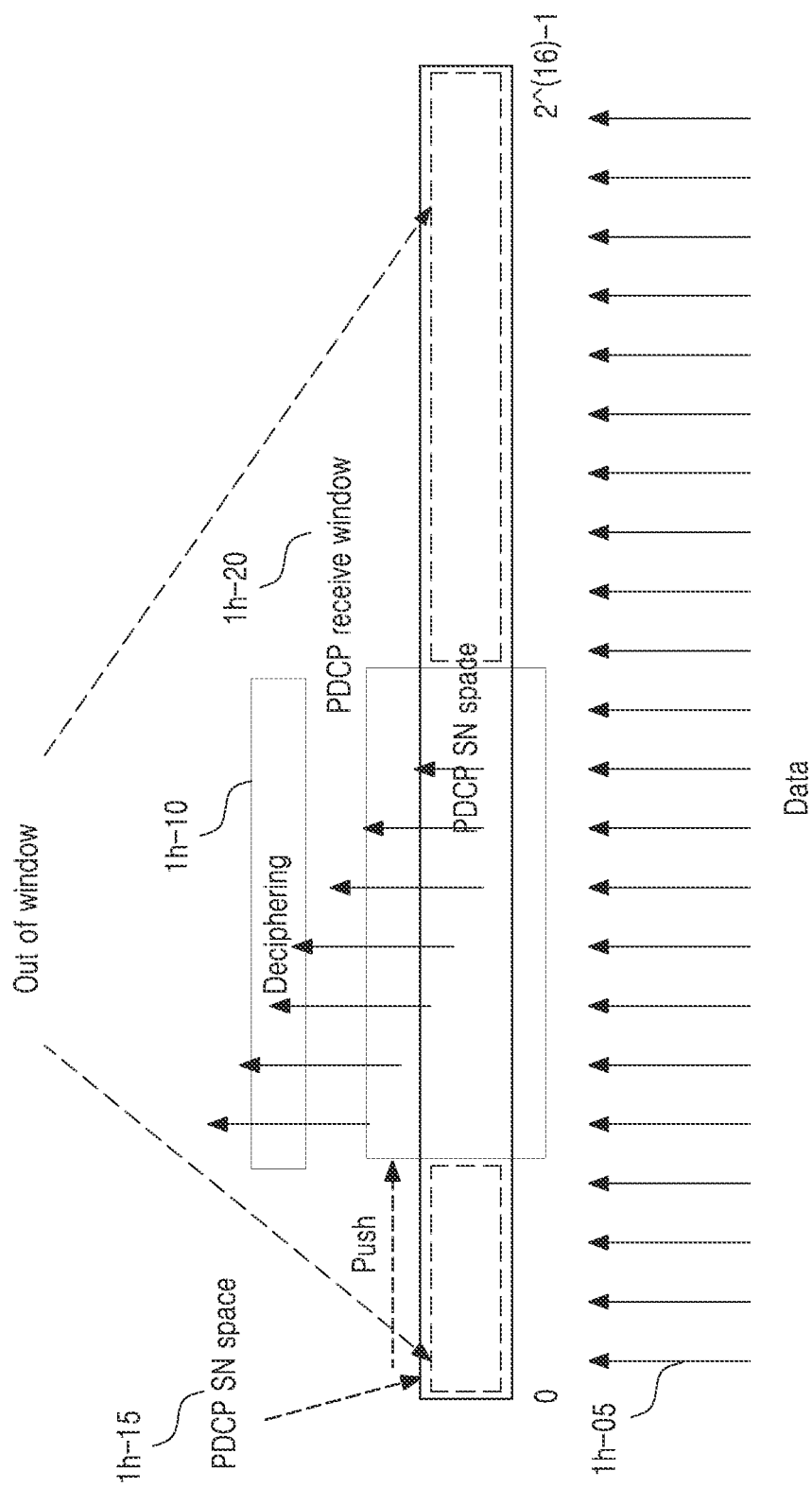

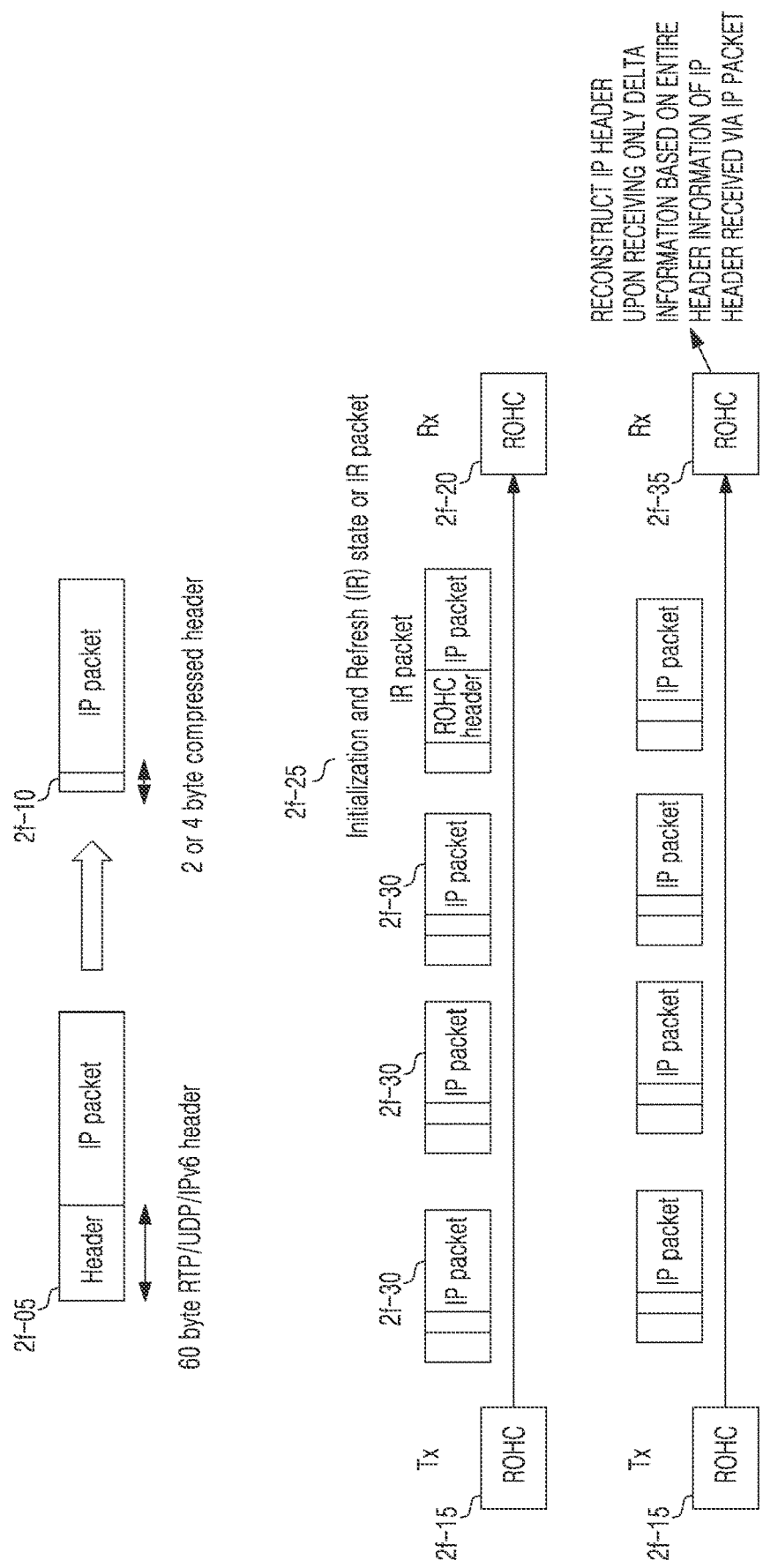

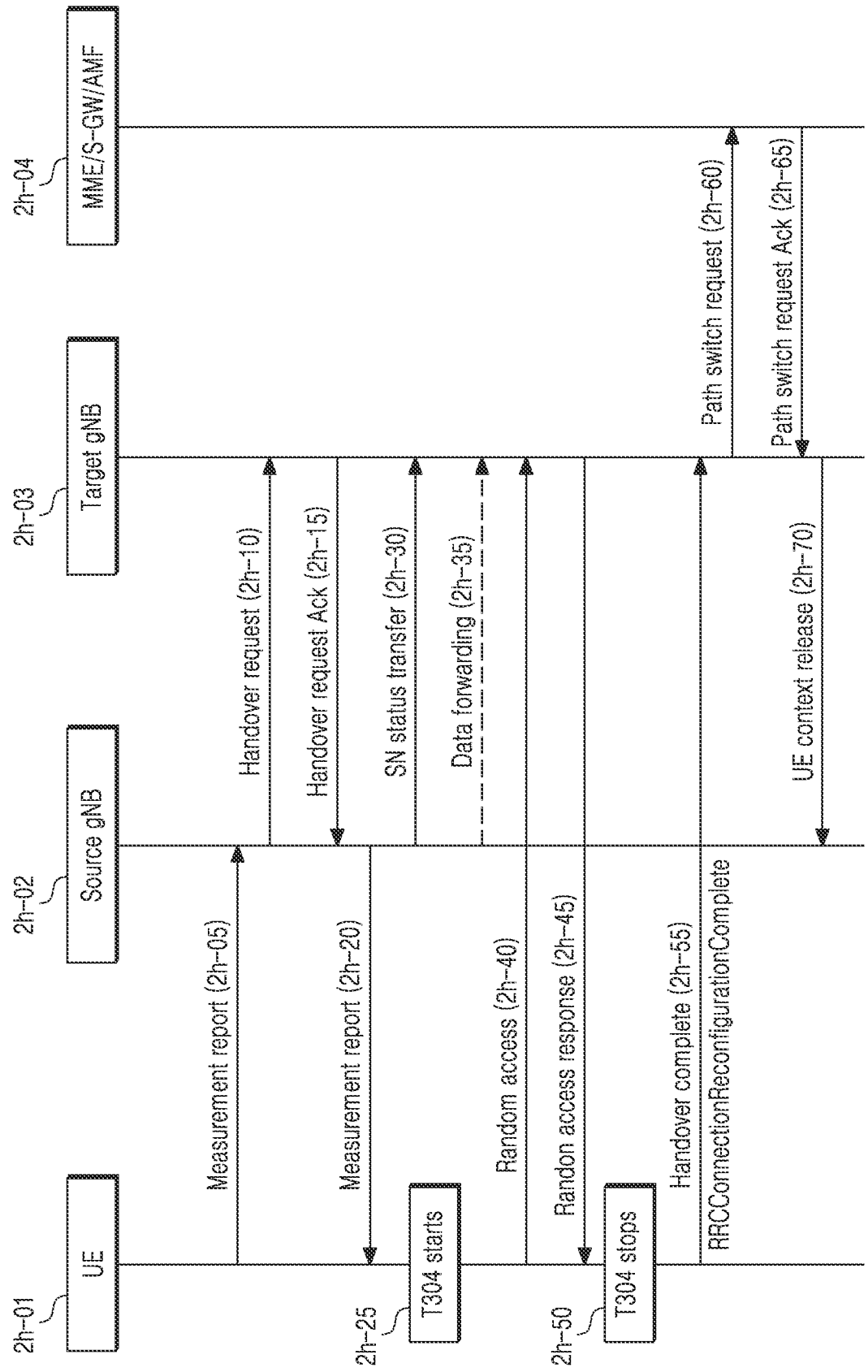

METHODS AND APPARATUSES FOR TRANSMITTING AND RECEIVING DATA IN WIRELESS COMMUNICATION SYSTEM

CROSS-REFERENCE TO RELATED APPLICATION(S)

This application is a continuation application of prior application Ser. No. 16/578,956, filed on Sep. 23, 2019, which is based on and claims priority under 35 U.S.C § 119(a) of a Korean patent application number 10-2018-0114324, filed on Sep. 21, 2018, in the Korean Intellectual Property Office, the disclosure of which is incorporated by reference herein in its entirety.

BACKGROUND

1. Field

The disclosure relates to methods and apparatuses for transmitting and receiving data in a wireless communication system.

2. Description of Related Art

To meet the increase in demand for wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post Long-Term Evolution (LTE) systems.' A 5G communication system defined by 3GPP is referred to as a new radio (NR) system. In order to achieve a high data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies are being studied, for example, beam-forming, massive multiple-input multiple-output (MIMO), Full Dimensional MIMO (FD-MIMO), array antennas, analog beam-forming, and large-scale antennas, and have been applied to NR systems. In order to improve system networks for 5G communication systems, various technologies have been developed, e.g., evolved small cells, advanced small cells, cloud radio access networks (Cloud-RAN), ultra-dense networks, Device-to-Device communication (D2D), wireless backhaul, moving networks, cooperative communication, Coordinated Multi-Points (CoMP), and interference cancellation. Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA), and sparse code multiple access (SCMA), which are advanced access schemes.

At the same time, the Internet has evolved from a human-based connection network where humans create and consume information, to the Internet of Things (IoT) where distributed configurations such as objects, exchange information with each other to process the information. Internet of Everything (IoE) technology is also emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

In this regard, various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

As described above, various services are able to be provided due to the development of wireless communication systems and thus, there is need for methods of effectively providing such services.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an apparatus and method for effectively providing a service in a wireless communication system.

Additional aspects will be set forth in part in the description which follows and, in part, will be apparent from the description, or may be learned by practice of the presented embodiments.

In accordance with an aspect of the disclosure, a method performed by a user equipment (UE) of deciphering data in wireless communication system is provided. The method includes receiving a packet data convergence protocol (PDCP) data packet data unit (PDU), determining a RCVD_COUNT of the PDCP data PDU, determining whether integrity protection is performed to the PDCP data PDU, and performing, based on whether the integrity protection is performed to the PDCP data PDU, deciphering of the PDCP data PDU using the RCVD_COUNT, wherein the RCVD_COUNT is determined based on a hyper frame number (HFN) of the PDCP data PDU determined according to a RCVD_DELIV and a sequence number (SN) of the PDCP data PDU, and wherein RX_DELIV is a count value of a first PDCP service data unit (SDU) not delivered to an upper layer of PDCP and waiting to be delivered to the upper layer of PDCP.

In accordance with another aspect of the disclosure, the performing of the deciphering of the PDCP data PDU may include performing deciphering of the PDCP data PDU using the RCVD_COUNT if the integrity protection is performed to the PDCP data PDU, and may further include performing integrity verification of the deciphered PDCP data PDU.

In accordance with another aspect of the disclosure, the method further includes discarding the PDCP data PDU if the integrity verification of the deciphered PDCP data PDU fails.

In accordance with another aspect of the disclosure, the method further includes indicating the failure of the integrity verification to an upper layer of the PDCP if the integrity verification of the deciphered PDCP data PDU fails.

In accordance with another aspect of the disclosure, the method further includes discarding the PDCP data PDU if the RCVD_COUNT is smaller than the RX_DELIV or if a PDCP data PDU corresponding to the RCVD_COUNT is received before receiving the PDCP data PDU.

In accordance with another embodiment of the disclosure, the method may further include discarding the PDCP data PDU if the RCVD_COUNT is smaller than the RX_DELIV or if a PDCP data PDU corresponding to the RCVD_COUNT is received before receiving the PDCP data PDU.

In accordance with another aspect of the disclosure, the method further includes performing the deciphering of the PDCP data PDU using the RCVD_COUNT if the PDCP data PDU is not discarded and if the integrity protection is not performed to the PDCP data PDU.

In accordance with another aspect of the disclosure, the determining of the RCVD_COUNT of the PDCP data PDU may include comparing the SN of the PDCP data PDU to an SN of the RX_DELIV, and determining according to a result of the comparing, an HFN of the PDCP data PDU based on HFN of the RX_DELIV.

In accordance with another aspect of the disclosure, a user equipment (UE) deciphering data in wireless communication system is provided. The user equipment includes a transceiver, and at least one controller or processor coupled with the transceiver, the at least one controller or processor configured to receive a packet data convergence protocol (PDCP) data packet data unit (PDU), determine a RCVD_COUNT of the PDCP data PDU, determine whether integrity protection is performed to the PDCP data PDU, and perform, based on whether the integrity protection is performed to the PDCP data PDU, deciphering of the PDCP data PDU using the RCVD_COUNT, wherein the RCVD_COUNT is determined based on a hyper frame number (HFN) of the PDCP data PDU determined according to a RCVD_DELIV and a sequence number (SN) of the PDCP data PDU, and wherein RX_DELIV is a count value of a first PDCP service data unit (SDU) not delivered to an upper layer of PDCP and waiting to be delivered to the upper layer of PDCP.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1G is a diagram of procedures of performing a first example of an operation of a reception PDCP layer by a UE or base station, in which integrity protection is not set, according to an embodiment of the disclosure;

FIG. 1H is a diagram of procedures of performing a second example of an operation of a reception PDCP layer by a UE or base station, in which integrity protection is not set, according to an embodiment of the disclosure;

FIG. 1I is a diagram of procedures of performing a third example of an operation of a reception PDCP layer by a UE or base station, in which integrity protection is set, according to an embodiment of the disclosure;

FIG. 2F is a diagram for describing a Robust header compression (ROHC) protocol, according to an embodiment of the disclosure;

FIG. 2H is a diagram for describing a handover process in a next-generation mobile communication system, according to an embodiment of the disclosure;

Throughout the drawings, like reference numerals will be understood to refer to like parts, components, and structures.

DETAILED DESCRIPTION

Figure 1A:
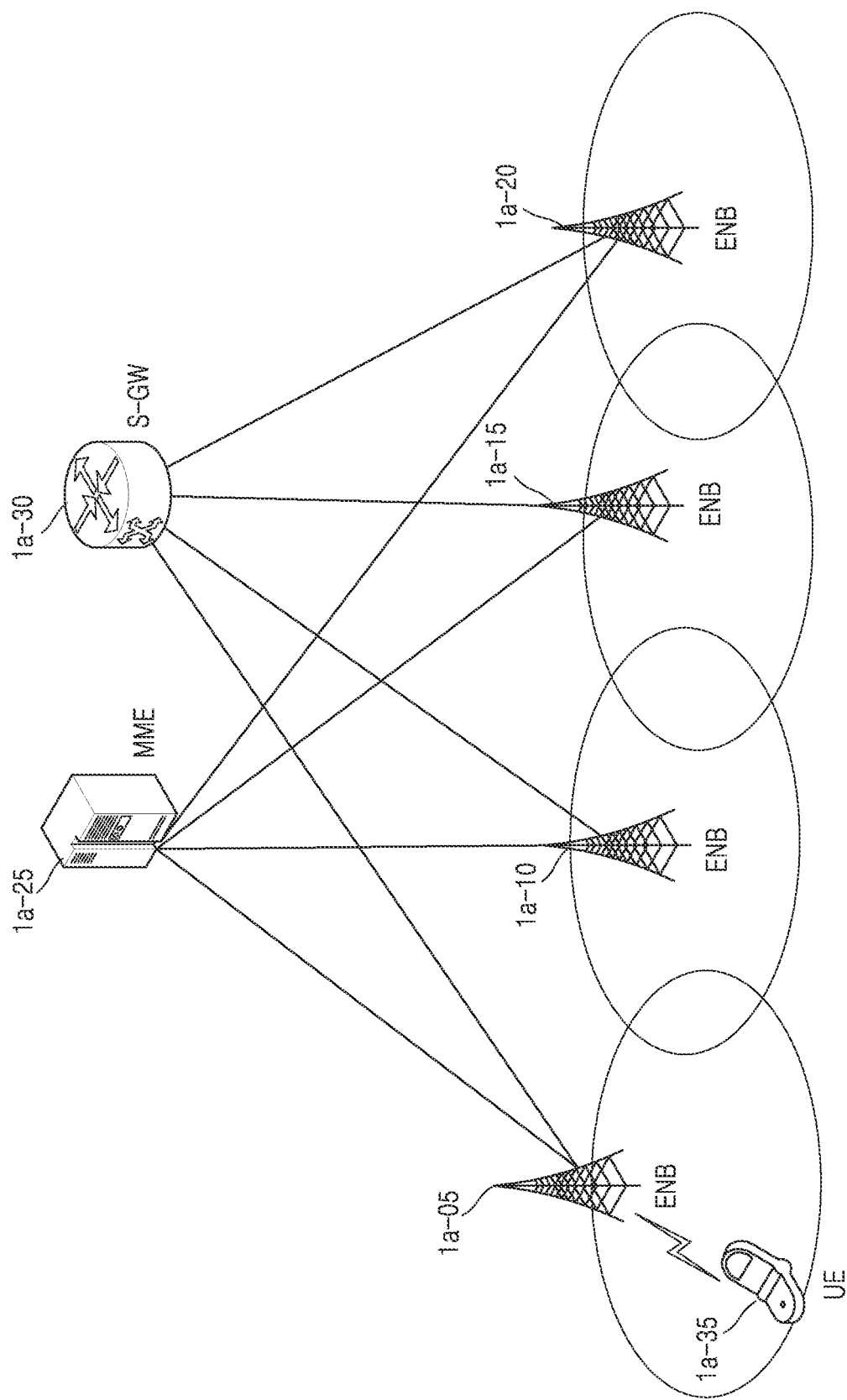
FIG. 1A is a diagram of a structure of a long-term evolution (LTE) system, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Hereinafter, operation principles of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

For the same reasons, components may be exaggerated, omitted, or schematically illustrated in drawings for clarity. Also, the size of each component does not completely reflect the actual size. In the drawings, like reference numerals denote like elements.

Advantages and features of one or more embodiments of the disclosure and methods of accomplishing the same may be understood more readily by reference to the following detailed description of the embodiments of the disclosure and the accompanying drawings. In this regard, the present embodiments of the disclosure may have different forms and should not be construed as being limited to the descriptions set forth herein. Rather, these embodiments of the disclosure are provided so that this disclosure will be thorough and complete and will fully convey the concept of the present embodiments of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out-of-order. For example, two blocks illustrated successively may actually be executed substantially concurrently, or the blocks may sometimes be performed in a reverse order according to the corresponding function.

Here, the term "unit" in the embodiments of the disclosure means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

Hereinafter, embodiments of the disclosure will be described with reference to accompanying drawings.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, for convenience of description, the disclosure uses terms and names defined by the 3rd Generation Partnership Project Long Term Evolution (3GPP LTE) standard. However, the disclosure is not limited by such terms and names, and may be equally applied to systems conforming to other standards. In the disclosure, an evolved node B (eNB) will be used interchangeably with a next generation node B (gNB) for convenience of description. In other words, a base station (BS) described as an eNB may also indicate a gNB. Also, the term 'terminal' may indicate not only mobile phones, narrow band-Internet of Things (NB-IoT) devices, and sensors, but also other wireless communication devices.

Hereinafter, a BS is an entity that allocates resources of a terminal, and may be at least one of a gNB, an eNB, an NB, a BS (base station), a wireless access unit, a BS controller, or a node on a network. Examples of a terminal may include user equipment (UE), a mobile station (MS), a cellular phone, a smartphone, a computer, and a multimedia system capable of performing a communication function. The disclosure is not limited to the above examples.

In particular, the disclosure may be applied to 3GPP New Radio (NR) (5th generation (5G) mobile communication standard). Also, the disclosure may be applied to intelligent services (e.g., smart homes, smart buildings, smart cities, smart cars or connected cars, health care, digital education, retail business, and security and safety related services) based on 5G communication technology and IoT related technology.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which UE or an MS transmits data or a control signal to a BS (e.g., eNB), and the DL refers to a radio link through which a BS transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby dividing the data or the control information of each user.

As a future communication system after the LTE system, that is, a 5G communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra reliability low latency communication (hereinafter, URLLC), etc.

According to some embodiments of the disclosure, the eMBB aims to provide a higher data transfer rate than a data transfer rate supported by the LTE, LTE-A, or LTE-Pro system. For example, in the 5G communication system, the eMBB should be able to provide a peak data rate of 20 Gbps in the DL and a peak data rate of 10 Gbps in the UL from the viewpoint of one BS. In addition, the 5G communication system should provide the increased user perceived data rate of the terminal simultaneously with providing the peak data rate. In order to satisfy such requirements, improvement of various transmitting/receiving technologies including a further improved multiple-input and multiple-output (MIMO) transmission technology may be demanded. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data transmission rate required in the 5G communication system.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/$km^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal requires a wider coverage than other services provided by the 5G communication system. The terminals that support the mMTC should be configured as inexpensive terminals and require very long battery lifetime, such as 10 to 15 years, because it is difficult to frequently replace batteries of the terminals.

Finally, the URLLC that is a cellular-based wireless communication service used for mission-critical purposes may be used, for example, in remote control for robots or machinery, industrial automation, unmanaged aerial vehicles, remote health care, or emergency alert. Accordingly, communication provided by the URLLC should provide very low latency (ultra low latency) and very high reliability (ultra high reliability). For example, URLLC-supportive services need to meet an air interface latency of less than 0.5 milliseconds simultaneously with a packet error rate of 10-5 or less. Accordingly, for URLLC-supportive services, the 5G system may be required to provide a transmit time interval (TTI) shorter than those for other services while securing reliable communication links by allocating a broad resource in a frequency band.

The three services, that is, eMBB, URLLC, and mMTC, considered in the above 5G communication system may be multiplexed in one system and may be transmitted. In this case, the services may use different transmission and reception methods and transmission and reception parameters in order to meet their different requirements. However, the mMTC, URLLC, and eMBB are examples of different service types, and service types to which the disclosure is applied are not limited thereto.

Also, although embodiments of the disclosure are described by using the LTE, LTE-A, LTE Pro, or 5G (or NR) system, the embodiments of the disclosure may be applied to other communication systems having a similar technical background or channel type. Also, it will be understood by one of ordinary skill in the art that embodiments of the disclosure may be applied to other communication systems through some modifications without departing from the scope of the disclosure.

In a next-generation mobile communication system, a terminal and a BS encode and decode data when exchanging the data. While encoding and decoding the data, a PDCP layer applies encoding and decoding algorithms by using an encryption key (or a security key). Throughout the specification, a layer may also be referred to as an entity. The encryption keys applied to the encoding and decoding algorithms include pre-set encryption keys (for example, KgNB, K_RRCenc, and the like) and encryption keys (count values) that change for each piece of data.

Processing complexity in data processing by the terminal (or the BS) is the highest in encoding procedures for transmission and in decoding procedures for reception. Thus, unnecessary encoding or decoding procedures may result in data processing complexity and may be a major ground of battery consumption. Accordingly, in the next-generation mobile communication system, because a high data transmission rate and a low transmission delay need to be supported, it is required to minimize the unnecessary data processing and perform optimization. In this regard, the unnecessary encoding or decoding procedures need to be reduced.

The disclosure intends to provide a method and apparatus for reducing unnecessary decryption processing when the terminal or the BS receives data in the next-generation mobile communication system, thereby reducing the burden of decoding processing and saving battery power and data processing efficiency, and to provide a receiving PDCP window operation for reducing unnecessary decoding procedures when a reception PDCP layer performs decoding procedures.

FIG. 1A is a diagram of a structure of an LTE system, according to an embodiment of the disclosure.

Referring to FIG. 1A, a radio access network (RAN) of the LTE system includes evolved base stations (e.g., eNBs or NBs) 1a-05, 1a-10, 1a-15, and 1a-20, a mobility management entity (MME) 1a-25, and a serving-gateway (S-GW) 1a-30. A user equipment (UE) or a terminal 1a-35 may access an external network via the eNB 1a-05, 1a-10, 1a-15, or 1a-20 and the S-GW 1a-30.

In FIG. 1A, each of the eNBs 1a-05, 1a-10, 1a-15, and 1a-20 may correspond to an existing NB of a universal mobile telecommunications system (UMTS). Each eNB 1a-05, 1a-10, 1a-15, or 1a-20 may be connected to the UE 1a-35 through radio channels and may perform complex functions compared to the existing NB. Because all user traffic data including real-time services such as voice over Internet protocol (VoIP) is serviced through shared channels in the LTE system, an entity for collating buffer status information of UEs, available transmission power status information, channel status information, etc. and performing scheduling is required and each of the eNBs 1a-05, 1a-10, 1a-15, and 1a-20 serves as such an entity. A single eNB generally controls multiple cells. For example, the LTE system may use radio access technology such as orthogonal frequency-division multiplexing (OFDM) at a bandwidth of 20 MHz to achieve a data rate of 100 Mbps. The LTE system may also use adaptive modulation & coding (AMC) to determine a modulation scheme and a channel coding rate in accordance with a channel status of the UE 1a-35. The S-GW 1a-30 is an entity for providing data bearers and may configure or release the data bearers under the control of the MME 1a-25. The MME 1a-25 is an entity for performing a mobility management function and various control functions for the UE 1a-35 and may be connected to the eNBs 1a-05, 1a-10, 1a-15, and 1a-20.

Figure 1B:
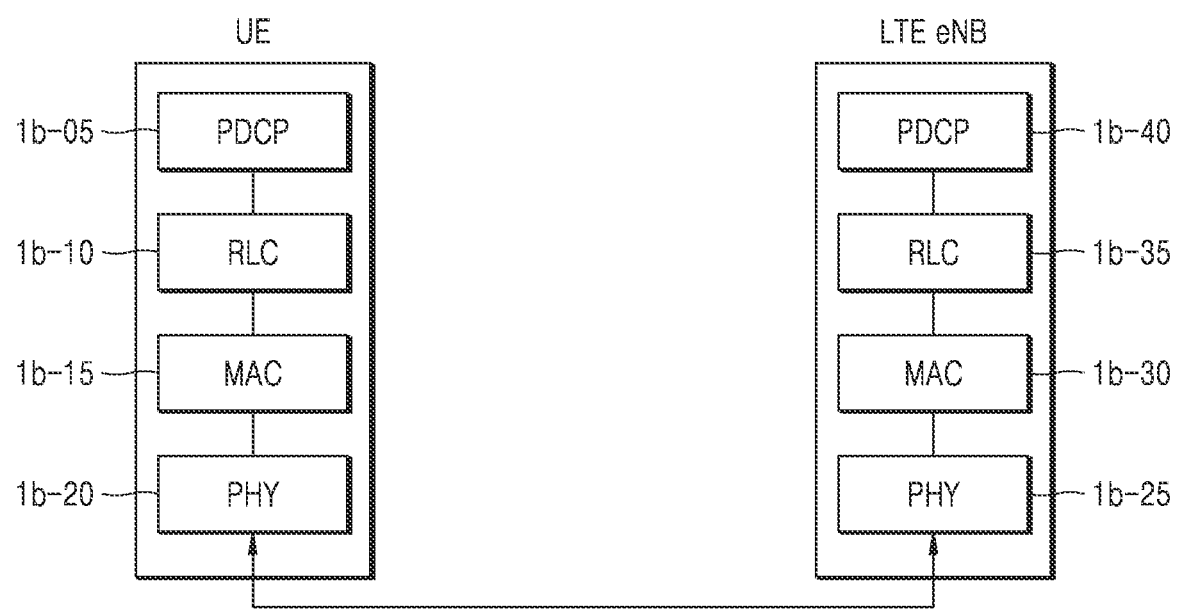
FIG. 1B is a block diagram of a radio protocol architecture in an LTE system, according to an embodiment of the disclosure.

FIG. 1B is a block diagram of a radio protocol architecture in an LTE system, according to an embodiment of the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 is in charge of IP header compression/decompression, etc. Main functions of the PDCP layer 1b-05 or 1b-40 are summarized below. However, the main functions are not limited thereto.

- Header compression and decompression: robust header compression (ROHC) only;
- Transfer of user data;
- In-sequence delivery of upper layer packet data units (PDUs) at PDCP re-establishment procedure for RLC acknowledged mode (AM);
- For split bearers in dual connectivity (DC) (only support for RLC AM): PDCP PDU routing for transmission and PDCP PDU reordering for reception;
- Duplicate detection of lower layer service data units (SDUs) at PDCP re-establishment procedure for RLC AM;
- Retransmission of PDCP SDUs at handover and, for split bearers in DC, of PDCP PDUs at PDCP data-recovery procedure, for RLC AM;
- Ciphering and deciphering; and
- Timer-based SDU discard in uplink.

The RLC layer 1b-10 or 1b-35 may perform, for example, an automatic repeat request (ARQ) operation by reconfiguring PDCP PDUs to appropriate sizes. Main functions of the RLC layer 1b-10 or 1b-35 are summarized below. However, the main functions are not limited thereto.

- Transfer of upper layer PDUs;
- Error Correction through ARQ (only for AM data transfer);
- Concatenation, segmentation and reassembly of RLC SDUs (only for unacknowledged mode (UM) and AM data transfer);
- Re-segmentation of RLC data PDUs (only for AM data transfer);
- Reordering of RLC data PDUs (only for UM and AM data transfer);
- Duplicate detection (only for UM and AM data transfer);
- Protocol error detection (only for AM data transfer);
- RLC SDU discard (only for UM and AM data transfer); and
- RLC re-establishment.

The MAC layer 1b-15 or 1b-30 is connected to multiple RLC layers configured for a single UE and may multiplex RLC PDUs into a MAC PDU and demultiplex the RLC PDUs from the MAC PDU. Main functions of the MAC layer 1b-15 or 1b-30 are summarized below. However, the main functions are not limited thereto.

Mapping between logical channels and transport channels;
  Multiplexing/demultiplexing of MAC SDUs belonging to one or different logical channels into/from transport blocks (TB) delivered to/from the physical layer on transport channels;
  Scheduling information reporting;
  Error correction through hybrid ARQ (HARQ);
  Priority handling between logical channels of one UE;
  Priority handling between UEs by means of dynamic scheduling;
  MBMS service identification;
  Transport format selection; and
  Padding.

A physical (PHY) layer 1b-20 or 1b-25 may channel-code and modulate upper layer data into OFDM symbols and transmit the OFDM symbols through a radio channel, or demodulate OFDM symbols received through a radio channel and channel-decode and deliver the OFDM symbols to an upper layer. However, the main functions are not limited thereto.

Figure 1C:
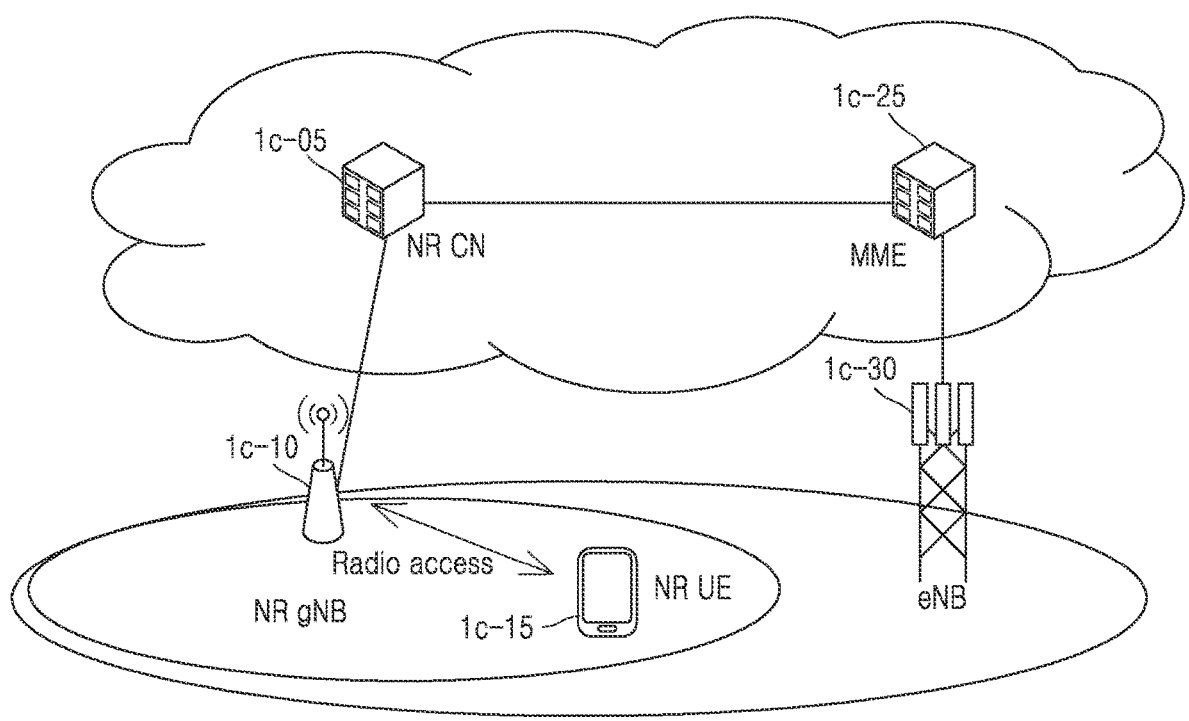
FIG. 1C is a diagram of a structure of a next-generation mobile communication system, according to an embodiment of the disclosure.

FIG. 1C is a diagram of a structure of a next-generation mobile communication system, according to an embodiment of the disclosure.

Referring to FIG. 1C, a RAN of the next-generation mobile communication system (e.g., a new radio (NR) or 5G system) may include a new radio node B (NR NB) or new radio next generation node B (NR gNB) 1c-10 and a new radio core network (NR CN) or next generation core network (NG CN) 1c-05. A new radio user equipment (NR UE) or UE 1c-15 may access an external network via the NR gNB 1c-10 and the NR CN 1c-05.

In FIG. 1C, the NR gNB 1c-10 may correspond to an eNB of an existing LTE system. The NR gNB 1c-10 is connected to the NR UE 1c-15 through radio channels and may provide superior services compared to an existing NB. Because all user traffic data is serviced through shared channels in the next-generation mobile communication system, an entity for collating buffer status information of UEs, available transmission power status information, channel status information, etc. and performing scheduling is required and such operations may be performed by the NR gNB 1c-10. A single NR gNB may control multiple cells. In the next-generation mobile communication system, a bandwidth greater than the maximum bandwidth of LTE may be given to achieve a current ultrahigh data rate, and beamforming technology may be added to radio access technology such as OFDM.

Also, according to some embodiments of the disclosure, AMC may also be used to determine a modulation scheme and a channel coding rate in accordance with a channel status of the NR UE 1c-15. The NR CN 1c-05 may perform functions such as mobility support, bearer setup, and quality of service (QoS) setup. The NR CN 1c-05 is an entity for performing a mobility management function and various control functions for the NR UE 1c-15 and may be connected to multiple NR gNBs. The next generation mobile communication system may cooperate with the existing LTE system, and the NR CN 1c-05 may be connected to an MME 1c-25 through a network interface. The MME 1c-25 may be connected to an existing eNB 1c-30.

Figure 1D:
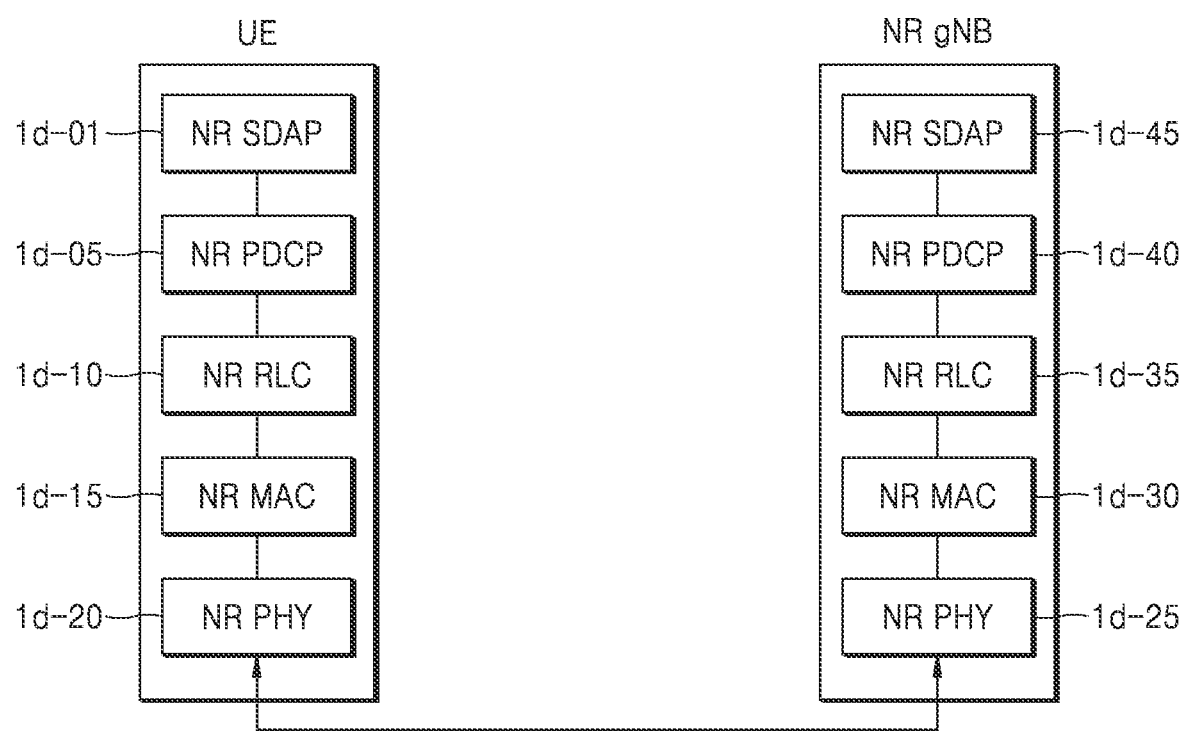
FIG. 1D is a block diagram of a radio protocol architecture of a next-generation mobile communication system, according to an embodiment of the disclosure.

FIG. 1D is a block diagram of a radio protocol architecture of a next-generation mobile communication system, according to an embodiment of the disclosure.

Referring to FIG. 1D, the radio protocol architecture of the next-generation mobile communication system may include NR service data adaptation protocol (SDAP) layers 1d-01 and 1d-45, NR PDCP layers 1d-05 and 1d-40, NR RLC layers 1d-10 and 1d-35, NR MAC layers 1d-15 and 1d-30, and NR PHY layers 1d-20 and 1d-25 respectively for a UE and an NR gNB.

Main functions of the NR SDAP layers 1d-01 and 1d-45 may include some of the following functions. However, the main functions are not limited thereto.

Transfer of user plane data;
  Mapping between QoS flow and a data radio bearer (DRB) for both DL and UL;
  Marking QoS flow ID in both DL and UL packets; and
  Reflective QoS flow to DRB mapping for the UL SDAP PDUs.

With respect to an SDAP layer, the UE may receive, via an RRC message, settings on whether to use a header of the SDAP layer or use a function of the SDAP layer for each PDCP layer, bearer, or logical channel. When an SDAP header is set, the UE may instruct a non-access stratum (NAS) reflective QoS 1-bit indicator and an access stratum (AS) reflective QoS 1-bit indicator of the SDAP header to update or reset mapping information regarding the data bearer and the QoS flow of UL and DL. According to some embodiments of the disclosure, the SDAP header may include QoS flow ID indicating QoS. Also, according to some embodiments, QoS information may be used as data processing priority information, scheduling information, etc. for supporting a smooth service.

Main functions of the NR PDCP layer 1d-05 or 1d-40 may include some of the following functions. However, the main functions are not limited thereto.

Header compression and decompression: robust header compression (ROHC) only;
  Transfer of user data;
  In-sequence delivery of upper layer PDUs;
  Out-of-sequence delivery of upper layer PDUs;
  PDCP PDU reordering for reception;
  Duplicate detection of lower layer SDUs;
  Retransmission of PDCP SDUs;
  Ciphering and deciphering; and
  Timer-based SDU discard in uplink.

According to some embodiments of the disclosure, the reordering function of the NR PDCP layer 1d-05 or 1d-40 may include at least one of a function of reordering PDCP PDUs received from a lower layer, on a PDCP sequence number (SN) basis, a function of delivering the reordered data to an upper layer in order or a function of immediately delivering the reordered data without considering an order, a function of recording missing PDCP PDUs by reordering the PDCP PDUs, a function of reporting status information of the missing PDCP PDUs to a transmitter, or a function of requesting to retransmit the missing PDCP PDUs.

According to some embodiments of the disclosure, the main functions of the NR RLC layer 1d-10 or 1d-35 may include at least some of the following functions. However, the main functions are not limited thereto.

Transfer of upper layer PDUs;
  In-sequence delivery of upper layer PDUs;
  Out-of-sequence delivery of upper layer PDUs;
  Error correction through ARQ;
  Concatenation, segmentation and reassembly of RLC SDUs;

Re-segmentation of RLC data PDUs;
Reordering of RLC data PDUs;
Duplicate detection;
Protocol error detection;
RLC SDU discard; and
RLC re-establishment.

According to some embodiments of the disclosure, the in-sequence delivery function of the NR RLC layer 1d-10 or 1d-35 may include a function of delivering RLC SDUs received from a lower layer, to an upper layer in order, a function of reassembling multiple RLC SDUs segmented from an RLC SDU and delivering the RLC SDU when the segmented RLC SDUs are received, a function of reordering received RLC PDUs on an RLC SN or PDCP SN basis and a function of recording missing RLC PDUs by reordering the RLC PDUs. Also, the in-sequence delivery function may include a function of reporting status information of the missing RLC PDUs to a transmitter and a function of requesting to retransmit the missing RLC PDUs. The in-sequence delivery function may include a function of delivering only RLC SDUs previous to a missing RLC SDU, to the upper entity in order, when the missing RLC SDU exists. Also, the in-sequence delivery function may include a function of delivering all RLC SDUs received before a timer is started, to the upper entity in order, although a missing RLC SDU exists, when a certain timer is expired, or a function of delivering all RLC SDUs received up to a current time, to the upper entity in order, although a missing RLC SDU exists, when a certain timer is expired. Further, the NR RLC layer 1d-10 or 1d-35 may process the RLC PDUs in order of reception (in order of arrival regardless of sequence numbers) and deliver the RLC PDUs to a PDCP entity out-of-order (out-of-sequence delivery), and reassemble segments received or stored in a buffer, into a whole RLC PDU and process and deliver the RLC PDU to the PDCP layer. According to some embodiments of the disclosure, the NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

The out-of-sequence delivery function of the NR RLC layer 1d-10 or 1d-35 may include at least one of a function of delivering the RLC SDUs received from the lower layer to the upper layer out-of-order, a function of reassembling multiple RLC SDUs segmented from an RLC SDU and delivering the RLC SDU when the segmented RLC SDUs are received, or a function of storing RLC SNs or PDCP SNs of received RLC PDUs and recording missing RLC PDUs by ordering the RLC PDUs.

The NR MAC layer 1d-15 or 1d-30 may be connected to multiple NR RLC layers configured for a single UE, and main functions of the NR MAC layer 1d-15 or 1d-30 may include at least some of the following functions. However, the functions are not limited thereto.

Mapping between logical channels and transport channels;
Multiplexing/demultiplexing of MAC SDUs;
Scheduling information reporting;
Error correction through HARQ;
Priority handling between logical channels of one UE;
Priority handling between UEs by means of dynamic scheduling;
Multimedia broadcast multicast service (MBMS) service identification;
Transport format selection; and
Padding.

According to some embodiments of the disclosure, the NR PHY layer 1d-20 or 1d-25 may channel-code and modulate upper layer data into OFDM symbols and transmit the OFDM symbols through a radio channel. Also, the NR PHY layer 1d-20 or 1d-25 may demodulate OFDM symbols received through a radio channel and channel-decode and deliver the OFDM symbols to an upper layer. However, the disclosure is not limited to the above examples.

Figure 1E:
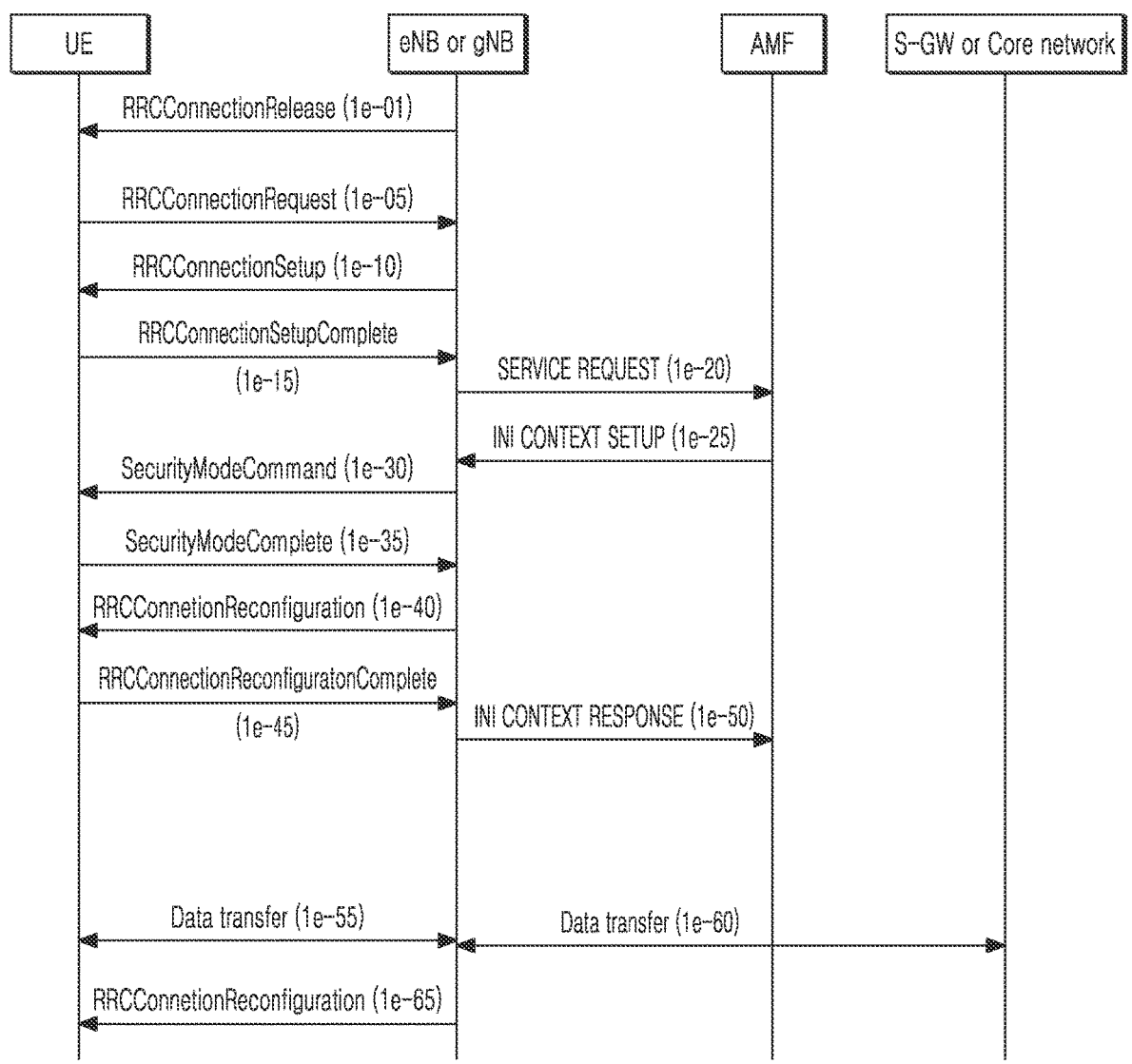
FIG. 1E is a diagram of procedures of a user equipment (UE) performing radio resource control (RRC) connection establishment with a base station when establishing a connection with a network, in a next-generation mobile communication system, according to an embodiment of the disclosure.

FIG. 1E is a diagram of procedures of a UE performing RRC connection establishment with a BS when establishing a connection with a network, in a next-generation mobile communication system, according to an embodiment of the disclosure.

Referring to FIG. 1E, when a UE that transmits or receives data in an RRC connected mode does not transmit or receive data for a certain reason or for a certain time, a gNB transmits an RRCConnectionRelease message to the UE to switch to an RRC idle mode (operation 1e-01). Thereafter, when data to be transmitted is generated, the UE that has not currently established a connection (hereinafter, the idle mode UE) may perform an RRC connection establishment procedure with the gNB.

The UE may establish reverse transmission synchronization with the gNB through a random-access procedure and transmit an RRCConnectionRequest message to the gNB (operation 1e-05). The RRCConnectionRequest message may include an identifier of the UE, establishment cause, or the like.

The gNB may transmit an RRCConnectionSetup message such that the UE establishes RRC connection (operation 1e-10). The RRCConnectionSetup message may include at least one of configuration information for each logical channel configuration information for each bearer, configuration information of a PDCP layer, configuration information of an RLC layer, or configuration information of a MAC layer.

The RRCConnectionsetup message may allocate a bearer identifier for each bearer (for example, an SRB identifier or a DRB identifier), and may instruct configuration of a PDCP layer, an RLC layer, a MAC layer, and a PHY layer for each bearer. Also, the RRCConnectionSetup message may configure the length (for example, 12 bits or 18 bits) of a PDCP sequence number used by the PDCP layer for each bearer, and configure the length (for example, 6 bits, 12 bits, or 18 bits) of an RLC sequence number used by the RLC layer. Also, the RRCConnectionSetup message may instruct the PDCP layer whether to use header compression and decompression protocols in UL or DL for each bearer and instruct whether to perform an integrity protection or verification procedure. Also, the RRCConnectionSetup message may instruct whether to perform out-of-order delivery by the PDCP layer.

The UE that established the RRC connection may transmit an RRCConnectionSetupComplete message to the gNB (operation 1e-15). The RRCConnectionSetupComplete message may include a control message such as a SERVICE REQUEST message for requesting an access and mobility management function (AMF) or an MME to configure a bearer for a certain service by the UE. The gNB transmits the SERVICE REQUEST message included in the RRCConnectionSetupComplete message to the AMF or the MME (operation 1e-20). The AMF or the MME may determine whether to provide the service requested by the UE through the SERVICE REQUEST message.

As a result of the determination, when the service requested by the UE is to be provided, the AMF or the MME may transmit an INITIAL CONTEXT SETUP REQUEST message to the gNB (operation 1e-25). The INITIAL CONTEXT SETUP REQUEST message includes QoS information to be applied in configuring a DRB, security information (e.g., a security key, a security algorithm, or the like) to be applied to the DRB, or the like.

The gNB exchanges a SecurityModeCommand message (operation 1e-30) and a SecurityModeComplete message (operation 1e-35) with the UE to configure a security mode. After the security mode is configured, the gNB may transmit an RRCConnectionReconfiguration message to the UE (operation 1e-40).

The RRCConnectionReconfiguration message may allocate a bearer identifier for each bearer (for example, an SRB identifier or a DRB identifier), and may instruct configuration of the PDCP layer, the RLC layer, the MAC layer, the PHY layer for each bearer. Also, the RRCConnectionReconfiguration message may configure the length (for example, 12 bits or 18 bits) of a PDCP sequence number used by the PDCP layer for each bearer, and configure the length (for example, 6 bits, 12 bits, or 18 bits) of an RLC sequence number used by the RLC layer. Also, the RRCConnectionReconfiguration message may instruct the PDCP layer whether to use header compression and decompression protocols in UL or DL for each bearer and instruct whether to perform an integrity protection or verification procedure. Also, the RRCConnectionReconfiguration message may instruct whether to perform out-of-order delivery by the PDCP layer.

Also, the RRCConnectionReconfiguration message may include configuration information about the DRB to process user data, and the UE may configure the DRB by using the configuration information and transmit an RRCConnectionReconfigurationComplete message to the gNB (operation 1e-45). The gNB that completed the DRB configuration with the UE may transmit an INITIAL CONTEXT SETUP COMPLETE message to the AMF or the MME (operation 1e-50).

After the above procedures are completed, the UE may transmit or receive data to or from the gNB through a core network (operations 1e-55 and 1e-60). According to some embodiments of the disclosure, data transmission processes largely include three steps of RRC connection establishment, security setting, and DRB configuration. Also, the gNB may transmit, to the UE, an RRCConnectionReconfiguration message to renew, add, or change the configuration for a certain reason (operation 1e-65).

The RRCConnectionReconfiguration message may allocate a bearer identifier for each bearer (for example, an SRB identifier or a DRB identifier) and may instruct configuration of the PDCP layer, the RLC layer, the MAC layer, the PHY layer for each bearer. Also, the RRCConnectionReconfiguration message may configure the length (for example, 12 bits or 18 bits) of a PDCP sequence number used by the PDCP layer for each bearer and configure the length (for example, 6 bits, 12 bits, or 18 bits) of an RLC sequence number used by the RLC layer. Also, the RRCConnectionReconfiguration message may instruct the PDCP layer whether to use header compression and decompression protocols in UL or DL for each bearer and instruct whether to perform an integrity protection or verification procedure. Also, the RRCConnectionReconfiguration message may instruct whether to perform out-of-order delivery by the PDCP layer.

The connection establishment procedure between the UE and the gNB according to the above embodiments of the disclosure may also be applied to connection establishment between the UE and an LTE base station and to connection establishment between the UE and an NR base station.

In the disclosure, a bearer may denote an SRB and a DRB, wherein SRB stands for a signaling radio bearer and the DRB stands for a data radio bearer. In the disclosure, a UM DRB denotes a DRB using an RLC layer operating in an unacknowledged mode (UM), and an AM DRB denotes a DRB using an RLC layer operating in an acknowledged mode (AM).

Operations of a transmission PDCP layer of a UE or a base station, according to some embodiments of the disclosure, may be as follows.

The transmission PDCP layer uses a first count variable maintaining a count value to be allocated to data transmitted next during data processing, and the first count variable may be referred to as TX_NEXT.

The transmission PDCP layer activates a PDCP data discarding timer upon receiving data (for example, PDCP SDU) from an upper layer and discards the data when the timer expires.

The transmission PDCP layer allocates a count value corresponding to TX_NEXT to the data received from the upper layer. An initial value of TX_NEXT may be set to 0, and TX_NEXT maintains a count value of data (PDCP SDU) to be transmitted next.

When a header compression protocol is set for the transmission PDCP layer, the transmission PDCP layer performs header compression on the data received from the upper layer.

When integrity protection is set for the transmission PDCP layer, the transmission PDCP layer generates a PDCP header and performs integrity protection by using a security key and the count value of TX_NEXT allocated to the data received from the upper layer, on the data received from the upper layer and the PDCP header.

The transmission PDCP layer performs an encoding procedure on the data received from the upper layer, by using the security key and the count value of TX_NEXT allocated to the data received from the upper layer. Also, the transmission PDCP layer sets, as a PDCP sequence number, lower least significant bits (LSBs) of a PDCP sequence number length from the count value of TX_NEXT.

The transmission PDCP layer increases the count value of TX_NEXT by 1 and transmits data processed via the above procedure to a lower layer together with the PDCP header by combining the data with the PDCP header.

Figure 1F:
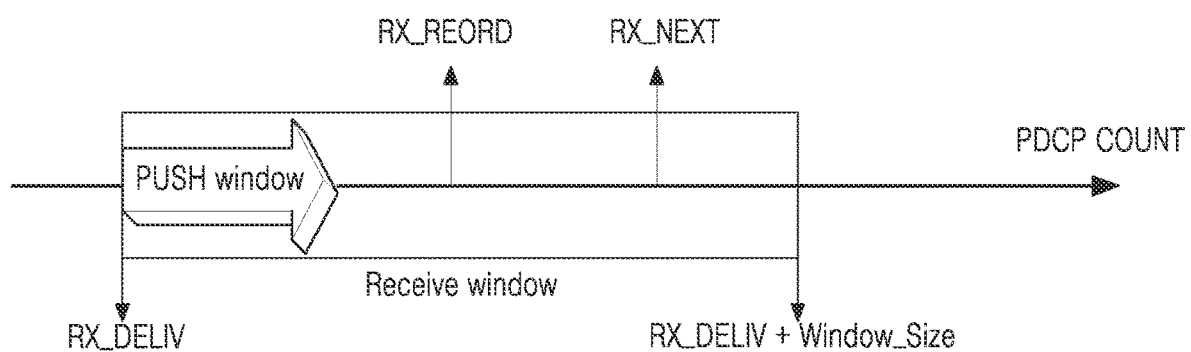
FIG. 1F is a diagram for describing an operation of a reception packet data convergence protocol (PDCP) layer, according to an embodiment of the disclosure.
Figure 11:
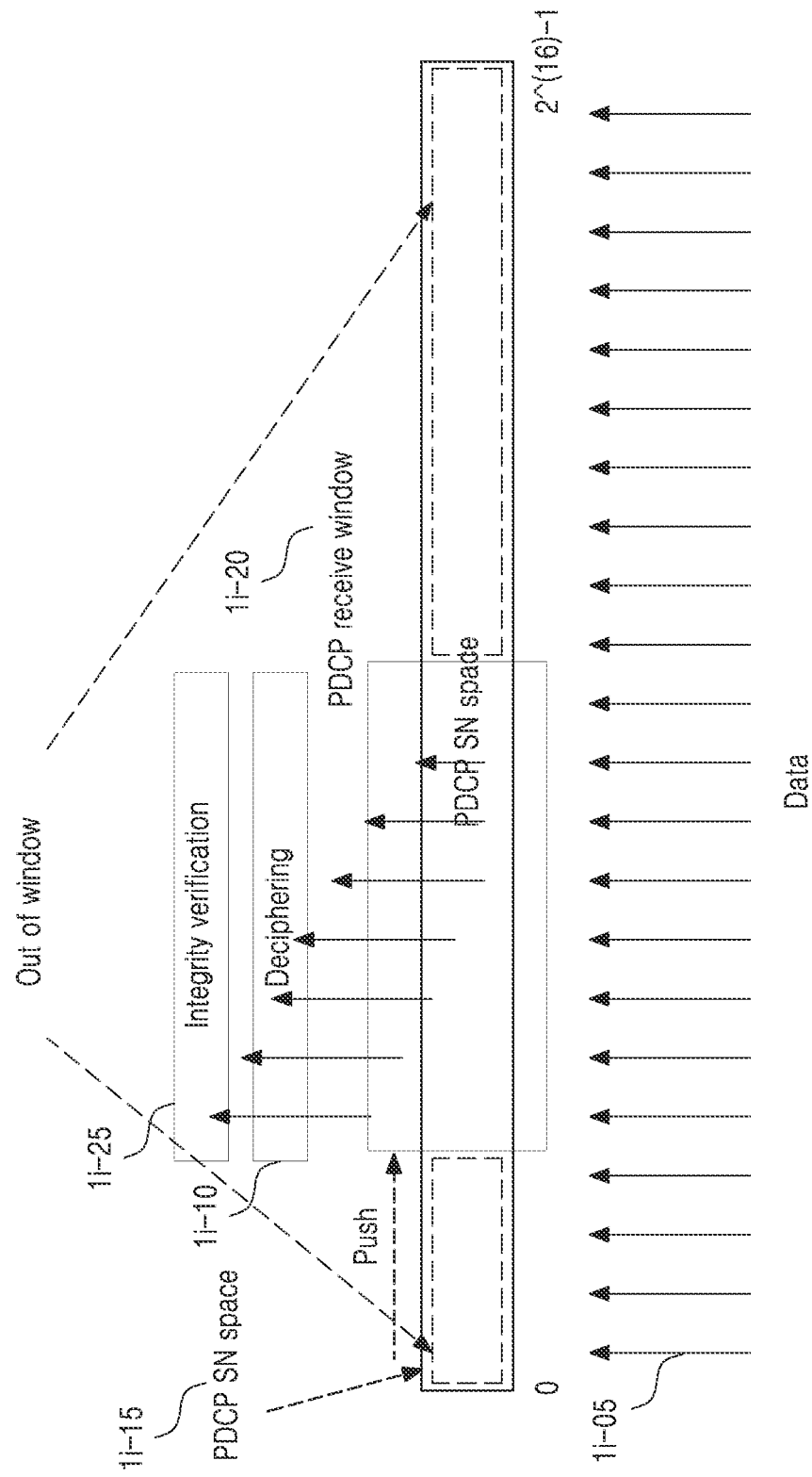

FIG. 1F is a diagram for describing an operation of a reception PDCP layer, according to an embodiment of the disclosure.

Referring to FIG. 1F, according to some embodiments of the disclosure, the reception PDCP layer may use a PDCP sequence number length (for example, 12 bits or 18 bits) set by a base station in RRC, identify a PDCP sequence number of received data (for example, PDCP PDU), and drive a receive window. The receive window driven by the reception PDCP layer may be set to half a size (for example, $2^{\wedge}$ (PDCP sequence number length−1) of a PDCP sequence number space and may be used to distinguish valid data. In other words, the reception PDCP layer may determine data received from out of the receive window as invalid data and discard the data. A case in which the data is received from out of the receive window may include a case in which data is received very late due to retransmission of an RLC layer from a lower layer or HARQ retransmission of a MAC layer. Also, the reception PDCP layer may drive a PDCP t-reordering timer together with the receive window.

The PDCP t-reordering timer may be triggered when a PDCP sequence number gap occurs based on the PDCP sequence number in the reception PDCP layer. When data corresponding to the PDCP sequence number gap does not arrive until the PDCP t-reordering timer expires, the reception PDCP layer may transmit data to an upper layer in an ascending order of the PDCP sequence number and move the receive window. Accordingly, when the data corresponding to the PDCP sequence number gap arrives after the PDCP t-reordering timer is expired, the data is not data in the receive window, and thus, the reception PDCP layer may discard the data corresponding to the PDCP sequence number gap arrived after the PDCP t-reordering timer is expired.

Specific procedures of an operation of the reception PDCP layer described above may be as follows.

A first example of the operation of the reception PDCP layer of a UE or a base station, according to some embodiments of the disclosure, may be as follows.

The reception PDCP layer may maintain and manage three count variables when processing received data. The reception PDCP layer may use a second count variable that maintains a count value of data (for example, PDCP SDU) expected to be received next when processing the received data, and the second count variable may be referred to as RX_NEXT. Also, the reception PDCP layer may use a third count variable that maintains a count value of first data (for example, PDCP SDU) that is not transmitted to an upper layer when processing the received data, and the third count variable may be referred to as RX_DELIV. Also, the reception PDCP layer may use a fourth count variable that maintains a count value of data (for example, PDCP SDU) that triggered the PDCP t-reordering timer when processing the received data, and the fourth count variable may be referred to as RX_REORD. Also, the reception PDCP layer may use a fifth count variable that maintains a count value of data (for example, PDCP SDU) currently received when processing the received data, and the fifth count variable may be referred to as RCVD_COUNT. The PDCP t-reordering timer described above may use a timer value or interval set via an RRC message as described in FIG. 1E in an upper layer (RRC layer). The PDCP t-reordering timer may be used to detect a lost PDCP PDU and only one timer may be driven at a time.

According to some embodiments of the disclosure, a UE may define and use the following variables in the operation of the reception PDCP layer. The disclosure is not limited thereto.

HFN: indicates a hyper frame number (HFN) of a window state variable.
SN: indicates a sequence number (SN) of a window state variable.
RCVD_SN: indicates a PDCP sequence number included in a header of a received PDCP PDU.
RCVD_HFN: an HFN value of a received PDCP PDU calculated by a reception PDCP layer.

A specific operation of the reception PDCP layer suggested in the first example of the disclosure may be as follows.

According to some embodiments of the disclosure, the reception PDCP layer may determine a count value of a received PDCP PDU as follows when the PDCP PDU is received from a lower layer.

When received RCVD_SN is RCVD_SN<=SN(RX_DELIV)−Window_Size, Equation 1 results in:

$$RCVD\_HFN=HFN(RX\_DELIV)+1 \quad \text{(Equation 1)}$$

On the other hand, when RCVD_SN is RCVD_SN>SN(RX_DELIV)+Window_Size, Equation 2 results in:

$$RCVD\_HFN=HFN(RX\_DELIV)-1 \quad \text{(Equation 2)}$$

For none of the cases above, Equation 3 results in:

$$RCVD\_HFN=HFN(RX\_DELIV) \quad \text{(Equation 3)}$$

RCVD_COUNT is determined to be RCVD_COUNT=[RCVD_HFN, RCVD_SN].

According to some embodiments of the disclosure, after determining the count value of the received PDCP PDU, the reception PDCP layer may update window state variables as follows and process the PDCP PDU.

According to some embodiments of the disclosure, the reception PDCP layer may perform decoding on the PDCP PDU by using the RCVD_COUNT, perform integrity verification and when the integrity verification fails, notify an upper layer of integrity verification failure and discard received PDCP data PDU (a data portion of the PDCP PDU).

According to some embodiments of the disclosure, when RCVD_COUNT<RX_DELIV or a PDCP PDU having a value of RCVD_COUNT has been received before (in case of a packet that is outdated, overdue, or out of a window, or in case of a duplicate packet), the received PDCP Data PDU (the data portion of the PDCP PDU) is discarded.

According to some embodiments of the disclosure, when the received PDCP PDU is not discarded, the reception PDCP layer may operate as follows.

The PDCP SDU processed above is stored in a receive buffer.
When RCVD_COUNT>=RX_NEXT, the RX_NEXT is updated to RCVD_COUNT+1.
When out-of-order delivery indicator (outOfOrderDelivery) is set (when an out-of-order delivery is instructed), the PDCP SDU is transmitted to the upper layer.
When RCVD_COUNT is equal to RX_DELIV, and when header compression is not released before, header decompression is performed and then the PDCP SDU is transmitted to the upper layer in an order of count values and consecutive PDCP SDUs are all transmitted to the upper layer from COUNT=RX_DELIV. Otherwise, the RX_DELIV is updated to a count value of a first PDCP SDU that is not transmitted to the upper layer, wherein the count value is equal to or greater than current RX_DELIV.
When the t-reordering is driven and RX_DELIV is equal to or greater than RX_REORD, the t-reordering timer is stopped and reset.
When the t-reordering timer is not driven (including the stop in the above condition) and RX_DELIV is smaller than RX_NEXT, the RX_REORD is updated to RX_NEXT and the t-reordering timer is started.

According to some embodiments of the disclosure, the reception PDCP layer may operate as follows when the PDCP t-reordering timer is expired.

When header compression is not released before, header decompression is performed and then the PDCP SDUs are transmitted to the upper layer in an order of count values, all PDCP SDUs having count values smaller than RX_REORD are transmitted to the upper layer and all PDCP SDUs having consecutive count values from RX_REORD are transmitted to the upper layer.
RX_DELIV is updated to a count value of a first PDCP SDU that is not transmitted to the upper layer, wherein the count value is equal to or greater than RX_REORD.

When RX_DELIV is smaller than RX_NEXT, the RX_REORD is updated to RX_NEXT and the t-reordering timer is started.

FIG. 1G is a diagram of procedures of performing a first example of an operation of a reception PDCP layer by a UE or base station, in which integrity protection is not set, according to an embodiment of the disclosure.

Referring to FIG. 1G, the first example of the operation of the reception PDCP layer according to some embodiments of the disclosure is as follows.

Upon receiving data (operation 1g-05) (for example, PDCP PDU) from a lower layer, the reception PDCP layer reads a PDCP sequence number of a PDCP header, determines a count value of the received data, and performs a decoding or deciphering procedure on the received data (operation 1g-10). In other words, the reception PDCP layer performs the decoding procedure on all pieces of data received with respect to all sections of a PDCP sequence number space (operation 1g-15). Then, the reception PDCP layer distinguishes valid data and invalid data by using a PDCP receive window (operation 1g-20) as a filter, updates window state variables (variables for maintaining count values) with respect to data included in the PDCP receive window 1g-20 or received data, and performs a data process.

In the procedure of the first example described above, the reception PDCP layer unnecessarily performs the decoding procedure on data received from out of a window (operation 1g-25) and discards unnecessary data after the decoding procedure during a window filtering procedure. In other words, the decoding procedure is unnecessarily performed on the data out of the window (operation 1g-25), which is to be discarded during the window filtering procedure. In the first example described above, because a decoding procedure is performed on data received from out of a window and the data is discarded during a window filtering procedure, the decoding procedure is unnecessarily performed on the data to be discarded.

A second example of the operation of the reception PDCP layer of a UE or a base station, according to some embodiments of the disclosure, may be as follows. In the second example of the disclosure, the reception PDCP layer may not perform an unnecessary decoding procedure, unlike the first example described above.

In the second example of the disclosure, the reception PDCP layer may first perform data filtering via a PDCP receive window on data received in a lower layer to discard data out of a window and perform a decoding procedure only on valid data received from inside the window.

A specific operation procedure of the reception PDCP layer of a UE or a base station, according to the second example of the disclosure, may be as follows.

According to some embodiments of the disclosure, the reception PDCP layer may determine a count value of a received PDCP PDU as follows when the PDCP PDU is received from a lower layer.

When received RCVD_SN is RCVD_SN<=SN(RX_DELIV)−Window_Size, the RCVD_HFN=HFN(RX_DELIV)+1.

On the other hand, when RCVD_SN is RCVD_SN>SN(RX_DELIV)+Window_Size, the RCVD_HFN=HFN(RX_DELIV)−1.

For none of the cases above, the RCVD_HFN=HFN(RX_DELIV).

RCVD_COUNT is determined to be RCVD_COUNT=[RCVD_HFN, RCVD_SN].

According to some embodiments of the disclosure, after determining the count value of the received PDCP PDU, the reception PDCP layer may update window state variables as follows and process the PDCP PDU.

When integrity protection and verification procedures are set, decoding is performed on the PDCP PDU by using the RCVD_COUNT, integrity verification is performed and when the integrity verification fails, notify an upper layer of integrity verification failure and discard received PDCP data PDU (a data portion of the PDCP PDU).

When RCVD_COUNT<RX_DELIV or a PDCP PDU having a value of RCVD_COUNT has been received before (in case of a packet that is outdated, overdue, or out of a window, or in case of a duplicate packet), the received PDCP Data PDU (the data portion of the PDCP PDU) is discarded.

According to some embodiments of the disclosure, when the received PDCP PDU is not discarded, the reception PDCP layer may operate as follows.

When the integrity protection and verification procedures are not set (or when the decoding procedure is not performed), decoding is performed on the PDCP PDU by using RCVD_COUNT.

The PDCP SDU processed above is stored in a receive buffer.

When RCVD_COUNT>=RX_NEXT, the RX_NEXT is updated to RCVD_COUNT+1.

When out-of-order delivery indicator (outOfOrderDelivery) is set (when an out-of-order delivery is instructed), the PDCP SDU is transmitted to the upper layer.

When RCVD_COUNT is equal to RX_DELIV and when header compression is not released before, header decompression is performed and then the PDCP SDU is transmitted to the upper layer in an order of count values and consecutive PDCP SDUs are all transmitted to the upper layer from COUNT=RX_DELIV. Otherwise, RX_DELIV is updated to a count value of a first PDCP SDU that is not transmitted to the upper layer, wherein the count value is equal to or greater than current RX_DELIV.

When the t-reordering is driven and RX_DELIV is equal to or greater than RX_REORD, the t-reordering timer is stopped and reset.

When the t-reordering timer is not driven (including the stop in the above condition) and RX_DELIV is smaller than RX_NEXT, the RX_REORD is updated to RX_NEXT and the t-reordering timer is started.

According to some embodiments of the disclosure, the reception PDCP layer may operate as follows when the PDCP t-reordering timer is expired.

When header compression is not released before, header decompression is performed and then the PDCP SDUs are transmitted to the upper layer in an order of count values, all PDCP SDUs having count values smaller than RX_REORD are transmitted to the upper layer and all PDCP SDUs having consecutive count values from RX_REORD are transmitted to the upper layer.

RX_DELIV is updated to a count value of a first PDCP SDU that is not transmitted to the upper layer, wherein the count value is equal to or greater than RX_REORD.

When RX_DELIV is smaller than RX_NEXT, the RX_REORD is updated to RX_NEXT and the t-reordering timer is started.

FIG. 1H is a diagram of procedures of performing the second example of the operation of the reception PDCP layer by a UE or base station, in which integrity protection is not set, according to an embodiment of the disclosure.

Referring to FIG. 1H, the second example of the operation of the reception PDCP layer according to some embodiments of the disclosure is as follows.

Upon receiving data (operation 1h-05) (for example, PDCP PDU) from a lower layer, the reception PDCP layer according to some embodiments of the disclosure reads a PDCP sequence number of a PDCP header and determines a count value of the received data. Then, the reception PDCP layer distinguishes valid data and invalid data from the received data (operation 1h-05) by using a PDCP receive window (operation 1h-20) as a filter and performs a decoding or deciphering procedure (operation 1h-10) only on data included in the PDCP receive window (operation 1h-20) or received data. In other words, the reception PDCP layer does not perform the decoding procedure on all pieces of received data with respect to all sections of a PDCP sequence number space (operation 1h-15), but performs the decoding procedure after applying receive window filtering on the received data, updates window state variables (variables for maintaining count values), and performs a data process.

Thus, according to the second example of the disclosure, because data filtering is first performed via a PDCP receive window on data received in a lower layer to discard data out of a window, and a decoding procedure is performed only on valid data received from inside the window, an unnecessary decoding procedure may be prevented.

A third example of the operation of the reception PDCP layer of a UE or a base station, according to some embodiments of the disclosure, may be as follows. In the third example of the disclosure, an operation of the PDCP layer for reducing data processing complexity by applying a decoding procedure and an integrity verification procedure only on valid data, when integrity protection and verification are set, is suggested. In other words, according to the third example of the disclosure, because data filtering is first performed via a PDCP receive window on data received in a lower layer to discard data out of a window, and a decoding procedure and integrity verification are performed only on valid data received from inside the window, an unnecessary decoding procedure and integrity verification may be prevented.

A specific operation procedure of the reception PDCP layer of a UE or a base station, according to the third example of the disclosure, may be as follows.

According to some embodiments of the disclosure, the reception PDCP layer may determine a count value of a received PDCP PDU as follows when the PDCP PDU is received from a lower layer.

When received RCVD_SN is RCVD_SN<=SN(RX_DELIV)−Window_Size, the RCVD_HFN=HFN(RX_DELIV)+1.

On the other hand, when RCVD_SN is RCVD_SN>SN(RX_DELIV)+Window_Size, the RCVD_HFN=HFN(RX_DELIV)−1.

For none of the cases above, the RCVD_HFN=HFN(RX_DELIV).

RCVD_COUNT is determined to RCVD_COUNT=[RCVD_HFN, RCVD_SN].

According to some embodiments of the disclosure, after determining the count value of the received PDCP PDU, the reception PDCP layer may update window state variables as follows and process the PDCP PDU.

When RCVD_COUNT<RX_DELIV or a PDCP PDU having a value of RCVD_COUNT has been received before (in case of a packet that is outdated, overdue, or out of a window, or in case of a duplicate packet), the received PDCP Data PDU (the data portion of the PDCP PDU) is discarded.

According to some embodiments of the disclosure, when the received PDCP PDU is not discarded, the reception PDCP layer may operate as follows.

Perform decoding on the PDCP PDU by using the RCVD_COUNT, perform integrity verification and when the integrity verification fails, notify an upper layer of integrity verification failure and discard received PDCP data PDU (a data portion of the PDCP PDU).

When the PDCP SDU is not discarded, the processed PDCP SDU is stored in a receive buffer.

When RCVD_COUNT>=RX_NEXT, the RX_NEXT is updated to RCVD_COUNT+1.

When out-of-order delivery indicator (outOfOrderDelivery) is set (when an out-of-order delivery is instructed), the PDCP SDU is transmitted to the upper layer.

When RCVD_COUNT is equal to RX_DELIV, and when header compression is not released before, header decompression is performed and then the PDCP SDU is transmitted to the upper layer in an order of count values, consecutive PDCP SDUs are all transmitted to the upper layer from COUNT=RX_DELIV and the RX_DELIV is updated to a count value of a first PDCP SDU that is not transmitted to the upper layer, wherein the count value is equal to or greater than current RX_DELIV.

When the t-reordering is driven and RX_DELIV is equal to or greater than RX_REORD, the t-reordering timer is stopped and reset.

When the t-reordering timer is not driven (including the stop in the above condition) and RX_DELIV is smaller than RX_NEXT, the RX_REORD is updated to RX_NEXT and the t-reordering timer is started.

According to some embodiments of the disclosure, the reception PDCP layer may operate as follows when the PDCP t-reordering timer is expired.

When header compression is not released before, header decompression is performed and then the PDCP SDUs are transmitted to the upper layer in an order of count values, all PDCP SDUs having count values smaller than RX_REORD are transmitted to the upper layer and all PDCP SDUs having consecutive count values from RX_REORD are transmitted to the upper layer.

RX_DELIV is updated to a count value of a first PDCP SDU that is not transmitted to the upper layer, wherein the count value is equal to or greater than RX_REORD.

When RX_DELIV is smaller than RX_NEXT, the RX_REORD is updated to RX_NEXT and the t-reordering timer is started.

FIG. 1I is a diagram of procedures of performing the third example of the operation of the reception PDCP layer by a UE or base station, in which integrity protection is set, according to an embodiment of the disclosure.

Referring to FIG. 1I, the third example of the operation of the reception PDCP layer according to some embodiments of the disclosure is as follows.

Upon receiving data (operation 1i-05) (for example, PDCP PDU) from a lower layer, the reception PDCP layer according to some embodiments of the disclosure reads a PDCP sequence number of a PDCP header and determines a count value of the received data. Then, the reception PDCP layer distinguishes valid data and invalid data from the received data (operation 1i-05) by using a PDCP receive window (operation 1i-20) as a filter and performs a decoding of deciphering procedure and an integrity verification procedure only on data included in the PDCP receive window (operation 1*i*-20) or received data ((operations 1*i*-10 and 1*i*-25). In other words, the reception PDCP layer does not perform the decoding procedure and the integrity verification procedure on all pieces of received data with respect to all sections of a PDCP sequence number space (operation 1*i*-15), but performs the decoding procedure and the integrity verification procedure after applying receive window filtering on the received data, updates window state variables (variables for maintaining count values), and performs a data process.

Accordingly, according to the third example of the disclosure, because the data filtering is first performed via the PDCP receive window 1*i*-20 on data received in a lower layer to discard data out of a window, and the decoding procedure and the integrity verification procedure are performed only on valid data received from inside the window, unnecessary decoding procedure and integrity verification procedure may be prevented.

In a next-generation mobile communication system, integrity protection and verification procedures may be set not only on an SRB but also on a DRB.

Hereinafter, a method of processing failure in an integrity verification procedure when integrity protection and verification procedures are set in a DRB, according to some embodiments of the disclosure, will be described. The method of processing the failure in the integrity verification procedure, according to some embodiments of the disclosure, may also be applied to the first through third examples of the disclosure described above.

A fourth example as the method of processing the failure in the integrity verification procedure in the DRB, according to some embodiments of the disclosure, is as follows.

An operation of a reception PDCP layer according to the fourth example of the disclosure may be as follows.

When an integrity verification procedure fails with respect to received data, a failure in the integrity verification procedure is notified to an upper layer (for example, an RRC layer), and the data is discarded.

In the fourth example of the disclosure, a PDCP layer or an RRC layer may define a variable for calculating the number of failures in an integrity verification procedure, wherein the variable for calculating the number of failures in the integrity verification procedure is referred to as ipFailureCount and is set to have an initial value of 0. Also, in the fourth example of the disclosure, the PDCP layer or the RRC layer may define a variable for setting the highest allowable number of failures in the integrity verification procedure, wherein the highest allowable number of failures in the integrity verification procedure is referred to as maxIpFailureThreshold and is set to have an initial value of 0. The highest allowable number of failures in the integrity verification procedure may be set by a base station to the RRC layer or set by a UE. Specific operations of the PDCP layer or the RRC layer according to some embodiments of the disclosure, may be as follows.

When the number of failures in the integrity verification procedure is notified from a lower layer (when the procedure is performed by the RRC layer) or when the failure in the integrity verification procedure occurs (when the procedure is performed by the PDCP layer), the ipFailureCount is increased by 1 and when ipFailureCount is equal to maxIpFailureThreshold, an upper layer may be notified (the RRC layer) (when the procedure is performed by the PDCP layer). (For example, the PDCP layer may be notified to trigger a radio link failure (RLF)). The RLF may be triggered (when the procedure is performed by the RRC layer).

A fifth example as the method of processing the failure in the integrity verification procedure in the DRB, according to some embodiments of the disclosure, is as follows.

An operation of a reception PDCP layer according to the fifth example of the disclosure may be as follows.

When an integrity verification procedure fails with respect to received data, a failure in the integrity verification procedure is notified to an upper layer (for example, an RRC layer), and the data is discarded.

In the fifth example of the disclosure, a PDCP layer or an RRC layer may define a variable for calculating the number of failures in an integrity verification procedure, wherein the variable for calculating the number of failures in the integrity verification procedure is referred to as ipFailureCount and is set to have an initial value of 0. Also, in the fifth example of the disclosure, the PDCP layer or the RRC layer defines a variable for setting the highest allowable number of failures in the integrity verification procedure, wherein the highest allowable number of failures in the integrity verification procedure is referred to as maxIpFailureThreshold and is set to have an initial value of 0. Also, the PDCP layer or the RRC layer may periodically initialize ipFailureCount by driving a timer (resetTimer). The highest allowable number of failures in the integrity verification procedure or a timer value may be set by a base station to the RRC layer or set by a UE. The timer value may be started when data transmission is started or when ipFailureCount is 0 and the failure in the integrity verification procedure occurs for the first time. Specific operations of the PDCP layer or the RRC layer according to some embodiments of the disclosure, may be as follows.

When the number of failures in the integrity verification procedure is notified from a lower layer (when the procedure is performed by the RRC layer) or when the failure in the integrity verification procedure occurs (when the procedure is performed by the PDCP layer), the ipFailureCount is increased by 1 and when the ipFailureCount is equal to 1, the resetTimer is driven. When the resetTimer is expired, the ipFailureCount is initialized to 1. When ipFailureCount is equal to maxIpFailureThreshold, an upper layer may be notified (the RRC layer) (when the procedure is performed by the PDCP layer). (For example, the upper layer may be notified to trigger RLF). The RLF may be triggered (when the procedure is performed by the RRC layer).

The fourth and fifth examples of the method of processing the failure in the integrity verification procedure, according to some embodiments of the disclosure, described above may also be applied to the first through third examples of the disclosure.

Figure 1J:
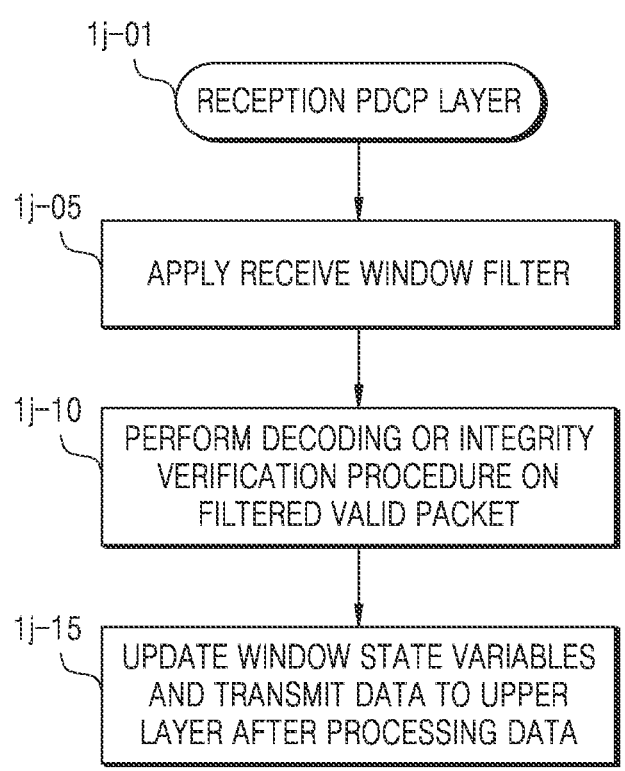
FIG. 1J is a flowchart for describing an operation of a reception PDCP layer, according to an embodiment of the disclosure.

FIG. 1J is a flowchart for describing an operation of a reception PDCP layer at operation 1*j*-01, according to an embodiment of the disclosure.

Referring to FIG. 1J, upon receiving data (for example, PDCP PDU) from a lower layer, the reception PDCP layer at operation 1*j*-01 according to some embodiments of the disclosure reads a PDCP sequence number of a PDCP header and determines a count value of the received data. Then, the reception PDCP layer distinguishes valid data and invalid data from the received data by using a PDCP receive window as a filter at operation 1*j*-05 and performs a decoding procedure and an integrity verification procedure only on the valid data included in the PDCP receive window or received valid data at operation 1*j*-10. Also, the reception PDCP layer updates window state variables and transmit data to an upper layer after processing the data at operation 1*j*-15.

In other words, the reception PDCP layer at operation 1*j*-01 according to some embodiments of the disclosure does not perform the decoding procedure and the integrity verification procedure on all pieces of received data with respect to all sections of a PDCP sequence number space, but performs the decoding procedure and the integrity verification procedure after applying receive window filtering, updates the window state variables (variables for maintaining count values), and transmits the data to the upper layer after processing the data.

Figure 1K:
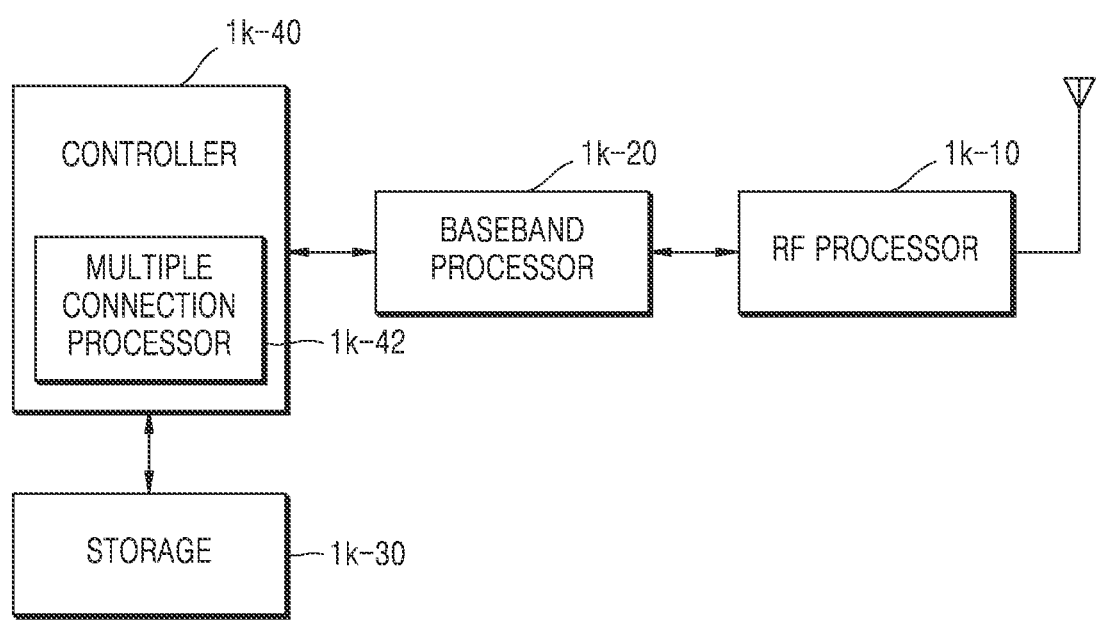
FIG. 1K is a block diagram of a structure of a UE, according to an embodiment of the disclosure.

FIG. 1K is a block diagram of a structure of a UE, according to an embodiment of the disclosure.

Referring to FIG. 1K, the UE includes a radio frequency (RF) processor 1*k*-10, a baseband processor 1*k*-20, a storage 1*k*-30, and a controller or at least one processor 1*k*-40. However, the UE is not limited thereto and may include more or less components than those shown in FIG. 1K.

The RF processor 1*k*-10 may perform functions for transmitting and receiving signals through radio channels, e.g., signal band conversion and amplification. That is, the RF processor 1*k*-10 up-converts a baseband signal provided from the baseband processor 1*k*-20, to an RF band signal and transmit the RF band signal through an antenna, and down-converts an RF band signal received through an antenna, to a baseband signal. For example, the RF processor 1*k*-10 may include a transmit filter, a receive filter, an amplifier, a mixer, an oscillator, a digital-to-analog converter (DAC), and an analog-to-digital converter (ADC). Although only a single antenna is illustrated in FIG. 1K, the UE may include multiple antennas. The RF processor 1*k*-10 may include a plurality of RF chains. The RF processor 1*k*-10 may perform beamforming. For beamforming, the RF processor 1*k*-10 may adjust phases and amplitudes of signals transmitted or received through multiple antennas or antenna elements. The RF processor 1*k*-10 may perform multiple input multiple output (MIMO) and may receive data of multiple layers in the MIMO operation. The RF processor 1*k*-10 may perform received beam sweeping by appropriately configuring multiple antennas or antenna elements, or adjust a direction and a beam width of the received beam to coordinate with a transmit beam, under the control of the controller 1*k*-40.

The baseband processor 1*k*-20 may convert between a baseband signal and a bitstream based on physical layer specifications of a system. For example, for data transmission, the baseband processor 1*k*-20 generates complex symbols by encoding and modulating a transmit bitstream. For data reception, the baseband processor 1*k*-20 may reconstruct a received bitstream by demodulating and decoding a baseband signal provided from the RF processor 1*k*-10. For example, according to an OFDM scheme, for data transmission, the baseband processor 1*k*-20 generates complex symbols by encoding and modulating a transmit bitstream, maps the complex symbols to subcarriers, and then configures OFDM symbols by performing inverse fast Fourier transformation (IFFT) and cyclic prefix (CP) insertion. For data reception, the baseband processor 1*k*-20 may split a baseband signal provided from the RF processor 1*k*-10, in OFDM symbol units, reconstruct signals mapped to subcarriers by performing fast Fourier transformation (FFT), and then reconstruct a received bitstream by demodulating and decoding the signals.

The baseband processor 1*k*-20 and the RF processor 1*k*-10 transmit and receive signals as described above. As such, each of the baseband processor 1*k*-20 and the RF processor 1*k*-10 may also be called a transmitter, a receiver, a transceiver, or a communicator. At least one of the baseband processor 1*k*-20 or the RF processor 1*k*-10 may include multiple communication modules to support multiple different radio access technologies. Also, at least one of the baseband processor 1*k*-20 or the RF processor 1*k*-10 may include multiple communication modules to process signals of different frequency bands. For example, the different radio access technologies may include an LTE network, NR network, etc. The different frequency bands may include a super-high frequency (SHF) (e.g., 2.5 GHz and 5 GHz) band and a millimeter wave (mmWave) (e.g., 60 GHz) band. The UE may transmit or receive a signal to or from a base station by using the baseband processor 1*k*-20 and the RF processor 1*k*-10, and the signal may include control information and data.

The storage 1*k*-30 may store data for operation of the UE, e.g., basic programs, application programs, and configuration information. The storage 1*k*-30 may provide the stored data upon request by the controller 1*k*-40. The storage 1*k*-30 may be configured in a storage medium, such as ROM, RAM, a hard disk, CD-ROM, or DVD, or a combination thereof. Also, the storage 1*k*-30 may be configured in a plurality of memories.

The controller 1*k*-40 may control overall operations of the UE. For example, the controller 1*k*-40 may transmit and receive signals through the baseband processor 1*k*-20 and the RF processor 1*k*-10. The controller 1*k*-40 may record and read data on and from the storage 1*k*-30. In this regard, the controller 1*k*-40 may include at least one processor. For example, the controller 1*k*-40 may include a communication processor (CP) for controlling communications and an application processor (AP) for controlling an upper layer such as an application program. For example, controller 1*k*-40 may include multiple connection processor 1*k*-42. Also, at least one component in the UE may be embodied in one chip.

Figure 1L:
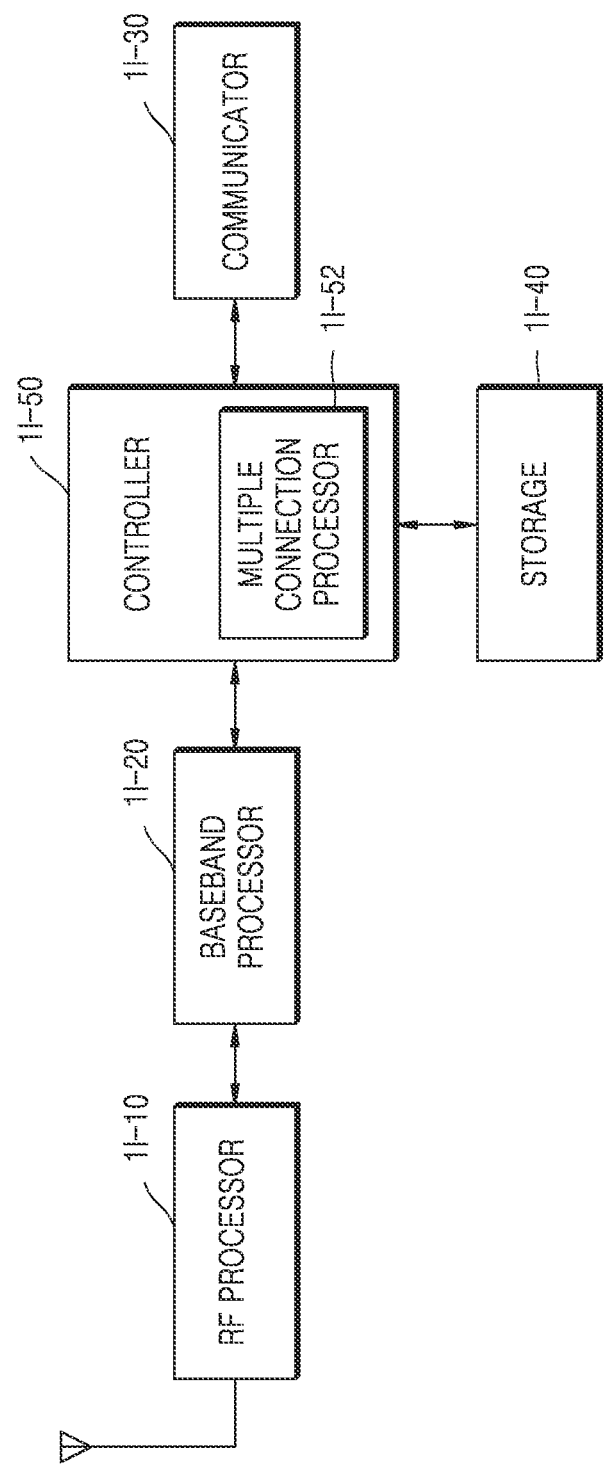
FIG. 1L is a block diagram of a transmission/reception point (TRP) in a wireless communication system, according to an embodiment of the disclosure.

FIG. 1L is a block diagram of a transmission/reception point (TRP) in a wireless communication system, according to an embodiment of the disclosure.

Referring to FIG. 1L, the TRP (or base station) may include an RF processor 1*l*-10, a baseband processor 1*l*-20, a communicator 1*l*-30, a storage 1*l*-40, and a controller 1*l*-50. However, the TRP is not limited thereto, and may include more or less components than those shown in FIG. 1L.

The RF processor 1*l*-10 may perform functions for transmitting and receiving signals through radio channels, e.g., signal band conversion and amplification. That is, the RF processor 1*l*-10 up-converts a baseband signal provided from the baseband processor 1*l*-20, to an RF band signal and transmit the RF band signal through an antenna, and down-converts an RF band signal received through an antenna, to a baseband signal. For example, the RF processor 1*l*-10 may include a transmit filter, a receive filter, an amplifier, a mixer, an oscillator, a DAC, and an ADC. Although only a single antenna is illustrated in FIG. 1L, the RF processor 1*l*-10 may include a plurality of antennas. The RF processor 1*l*-10 may include a plurality of RF chains. In addition, the RF processor 1*l*-10 may perform beamforming. For beamforming, the RF processor 1*l*-10 may adjust phases and amplitudes of signals transmitted or received through multiple antennas or antenna elements. The RF processor 1*l*-10 may perform DL MIMO by transmitting data of two or more layers.

The baseband processor 1*l*-20 may convert between a baseband signal and a bitstream based on physical layer specifications of a first radio access technology. For example, for data transmission, the baseband processor 1*l*-20 may generate complex symbols by encoding and modulating a transmit bitstream. For data reception, the baseband processor 1*l*-20 reconstructs a received bitstream by demodulating and decoding a baseband signal provided from the RF processor 1*l*-10. For example, according to an OFDM scheme, for data transmission, the baseband processor 1*l*-20 generates complex symbols by encoding and modulating a transmit bitstream, maps the complex symbols to subcarriers, and then configures OFDM symbols by performing IFFT and CP insertion. For data reception, the baseband processor 1*l*-20 may split a baseband signal provided from the RF processor 1*l*-10, in OFDM symbol units, reconstruct signals mapped to subcarriers by performing FFT, and then reconstruct a received bitstream by demodulating and decoding the signals. The baseband processor 1*l*-20 and the RF processor 1*l*-10 may transmit and receive signals as described above. As such, each of the baseband processor 1*l*-20 and the RF processor 1*l*-10 may also be called a transmitter, a receiver, a transceiver, a communicator, or a wireless communicator. The TRP may transmit or receive a signal to or from a UE by using the baseband processor 1*l*-20 and the RF processor 1*l*-10, and the signal may include control information and data.

The communicator 1*l*-30 may provide an interface for communicating with other nodes in a network. According to some embodiments of the disclosure, the communicator 1*l*-30 may be a backhaul communicator.

The storage 1*l*-40 may store data for operation of the base station described above, e.g., basic programs, application programs, and configuration information. In particular, the storage 1*l*-40 may store information about bearers allocated for a connected UE, a measurement report transmitted from the connected UE, etc. The storage 1*l*-40 may store criteria information used to determine whether to provide or release multi-connectivity to or from the UE. The storage 1*l*-40 may provide the stored data upon request by the controller 1*l*-50. The storage 1*l*-40 may be configured in a storage medium, such as ROM, RAM, a hard disk, CD-ROM, or DVD, or a combination thereof. Also, the storage 1*l*-40 may be configured in a plurality of memories.

The controller 1*l*-50 may control overall operations of the TRP (or base station). For example, the controller 1*l*-50 may transmit and receive signals through the baseband processor 1*l*-20 and the RF processor 1*l*-10 or through the communicator 1*l*-30. The controller 1*l*-50 may record and read data on and from the storage 1*l*-40. In this regard, the controller 1*l*-50 may include at least one processor. For example, controller 1*l*-50 may include multiple connection processor 1*l*-52. Also, at least one component in the TRP may be embodied in one chip.

The disclosure proposes a method and apparatus for preventing header compression protocol configuration information from being lost in a next-generation mobile communication system.

In the next-generation mobile communication system, a PDCP layer may use a header compression protocol for compressing a header. However, in order to apply the header compression protocol, a transmission PDCP layer and a reception PDCP layer need to exchange and synchronize header compression protocol information. However, when the reception PDCP layer discards received data not in an existing order while the PDCP layer performs reestablishment procedure during a handover or RLF procedure, data including the header compression protocol configuration information may be lost.

An operation of the reception PDCP layer in the next-generation mobile communication system, according to some embodiments of the disclosure, may enable the PDCP layer not to lose the data including the header compression protocol configuration information even when the PDCP layer performs the reestablishment procedure due to handover or RLF.

Figure 2A:
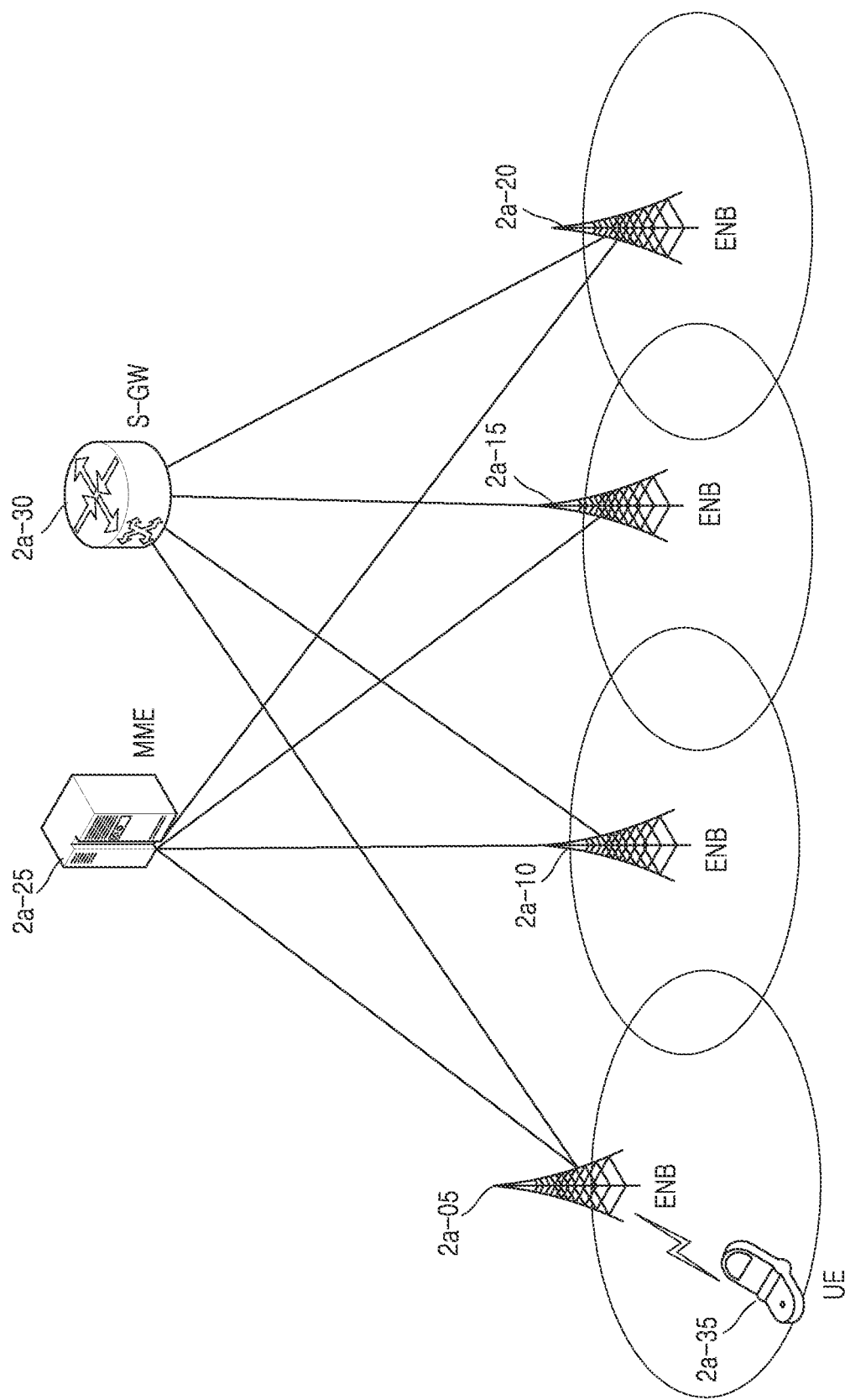
FIG. 2A is a diagram of a structure of an LTE system, according to an embodiment of the disclosure.

FIG. 2A is a diagram of a structure of an LTE system, according to an embodiment of the disclosure.

Referring to FIG. 2A, a RAN of the LTE system includes eNBs or NBs 2*a*-05, 2*a*-10, 2*a*-15, and 2*a*-20, a MME 2*a*-25, and an S-GW 2*a*-30. A UE or terminal 2*a*-35 may access an external network via the eNB 2*a*-05, 2*a*-10, 2*a*-15, or 2*a*-20 and the S-GW 2*a*-30.

In FIG. 2A, each of the eNBs 2*a*-05, 2*a*-10, 2*a*-15, and 2*a*-20 may correspond to an existing NB of a UMTS. Each eNB 2*a*-05, 2*a*-10, 2*a*-15, or 2*a*-20 may be connected to the UE 2*a*-35 through radio channels and may perform complex functions compared to the existing NB. Because all user traffic data including real-time services such as voice over Internet protocol (VoIP) is serviced through shared channels in the LTE system, an entity for collating buffer status information of UEs, available transmission power status information, channel status information, etc. and performing scheduling is required and each of the eNBs 2*a*-05, 2*a*-10, 2*a*-15, and 2*a*-20 serves as such an entity. A single eNB generally controls multiple cells. For example, the LTE system may use radio access technology such as OFDM at a bandwidth of 20 MHz to achieve a data rate of 100 Mbps. The LTE system may also use AMC to determine a modulation scheme and a channel coding rate in accordance with a channel status of the UE 2*a*-35. The S-GW 2*a*-30 is an entity for providing data bearers and may configure or release the data bearers under the control of the MME 2*a*-25. The MME 2*a*-25 is an entity for performing a mobility management function and various control functions for the UE 2*a*-35 and may be connected to the eNBs 2*a*-05, 2*a*-10, 2*a*-15, and 2*a*-20.

Figure 2B:
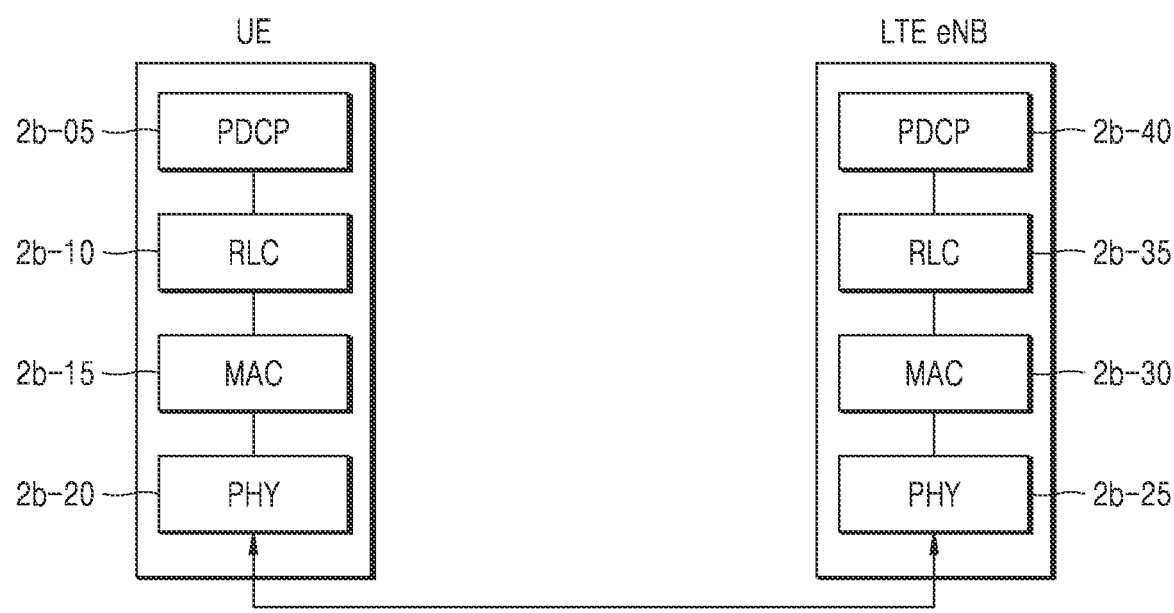
FIG. 2B is a block diagram of a radio protocol architecture in an LTE system, according to an embodiment of the disclosure.

FIG. 2B is a block diagram of a radio protocol architecture in an LTE system, according to an embodiment of the disclosure.

Referring to FIG. 2B, the radio protocol architecture of the LTE system may include PDCP layers 2*b*-05 and 2*b*-40, RLC layers 2*b*-10 and 2*b*-35, and MAC layers 2*b*-15 and 2*b*-30 respectively for a UE and an eNB. The PDCP layer 2*b*-05 or 2*b*-40 is in charge of IP header compression/decompression, etc. Main functions of the PDCP layer 1*b*-05 or 1*b*-40 are summarized below. However, the main functions are not limited thereto.

Header compression and decompression: ROHC only;
Transfer of user data;
In-sequence delivery of upper layer PDUs at PDCP re-establishment procedure for RLC AM;
For split bearers in DC (only support for RLC AM): PDCP PDU routing for transmission and PDCP PDU reordering for reception;
Duplicate detection of lower layer SDUs at PDCP re-establishment procedure for RLC AM;
Retransmission of PDCP SDUs at handover and, for split bearers in DC, of PDCP PDUs at PDCP data-recovery procedure, for RLC AM;
Ciphering and deciphering; and
Timer-based SDU discard in uplink.

The RLC layer 2*b*-10 or 2*b*-35 may perform, for example, an ARQ operation by reconfiguring PDCP PDUs to appropriate sizes. Main functions of the RLC layer 2b-10 or 2b-35 are summarized below. However, the main functions are not limited thereto.

Transfer of upper layer PDUs;
Error Correction through ARQ (only for AM data transfer);
Concatenation, segmentation, and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM data transfer); and
RLC reestablishment.

The MAC layer 2b-15 or 2b-30 is connected to multiple RLC layers configured for a single UE and may multiplex RLC PDUs into a MAC PDU and demultiplex the RLC PDUs from the MAC PDU. Main functions of the MAC layer 2b-15 or 2b-30 are summarized below. However, the main functions are not limited thereto.

Mapping between logical channels and transport channels;
Multiplexing/demultiplexing of MAC SDUs belonging to one or different logical channels into/from TB delivered to/from the physical layer on transport channels;
Scheduling information reporting;
Error correction through HARQ;
Priority handling between logical channels of one UE;
Priority handling between UEs by means of dynamic scheduling;
MBMS service identification;
Transport format selection; and
Padding.

A PHY layer 2b-20 or 2b-25 may channel-code and modulate upper layer data into OFDM symbols and transmit the OFDM symbols through a radio channel, or demodulate OFDM symbols received through a radio channel and channel-decode and deliver the OFDM symbols to an upper layer. However, the disclosure is not limited thereto.

Figure 2C:
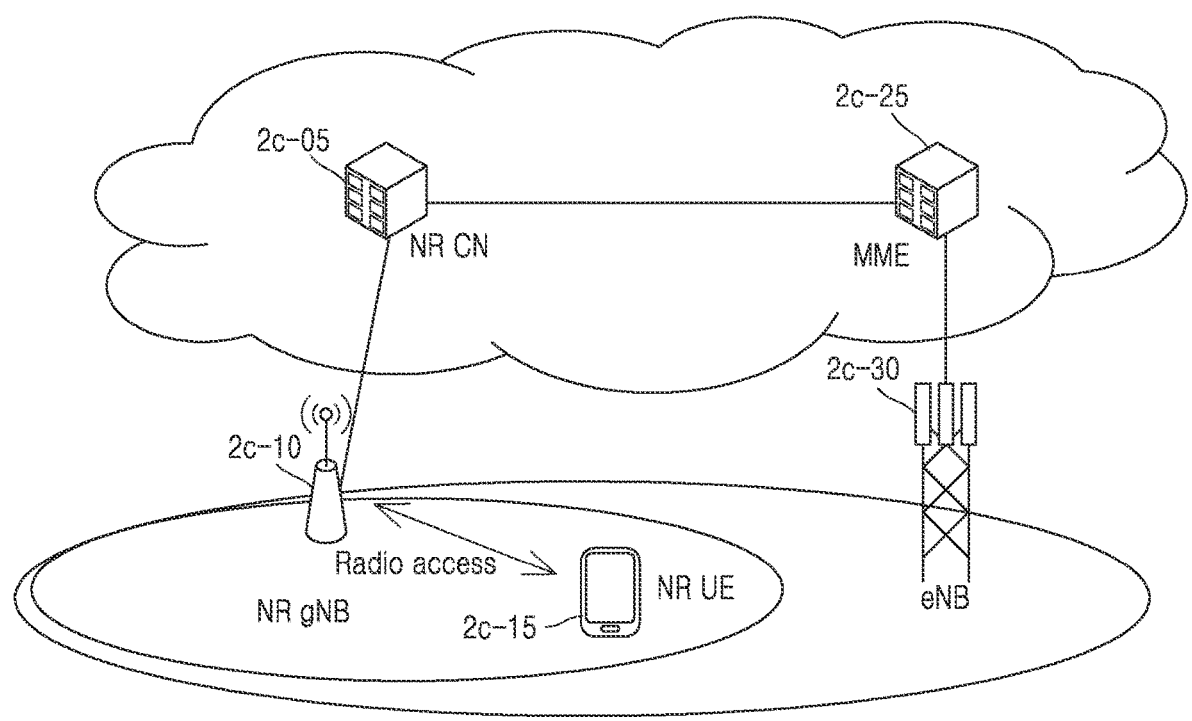
FIG. 2C is a diagram of a structure of a next-generation mobile communication system, according to an embodiment of the disclosure.

FIG. 2C is a diagram of a structure of a next-generation mobile communication system, according to an embodiment of the disclosure.

Referring to FIG. 2C, a RAN of the next-generation mobile communication system (e.g., an NR or 5G system) may include an NR NB or NR gNB 2c-10 and an NR CN or an NR CN 2c-05. An NR UE or UE 2c-15 may access an external network via the NR gNB 2c-10 and the NR CN 2c-05.

In FIG. 2C, the NR gNB 2c-10 may correspond to an eNB of an existing LTE system. The NR gNB 2c-10 is connected to the NR UE 2c-15 through radio channels and may provide superior services compared to an existing NB. Because all user traffic data is serviced through shared channels in the next-generation mobile communication system, an entity for collating buffer status information of UEs, available transmission power status information, channel status information, etc. and performing scheduling is required and such operations may be performed by the NR gNB 2c-10. A single NR gNB may control multiple cells. In the next-generation mobile communication system, a bandwidth greater than the maximum bandwidth of LTE may be given to achieve a current ultrahigh data rate, and beamforming technology may be added to radio access technology such as OFDM.

Also, according to some embodiments of the disclosure, AMC may also be used to determine a modulation scheme and a channel coding rate in accordance with a channel status of the NR UE 2c-15. The NR CN 2c-05 may perform functions such as mobility support, bearer setup, and QoS setup. The NR CN 2c-05 is an entity for performing a mobility management function and various control functions for the NR UE 2c-15 and may be connected to multiple NR gNBs. The next generation mobile communication system may cooperate with the existing LTE system, and the NR CN 2c-05 may be connected to an MME 2c-25 through a network interface. The MME 2c-25 may be connected to an existing eNB 2c-30.

Figure 2D:
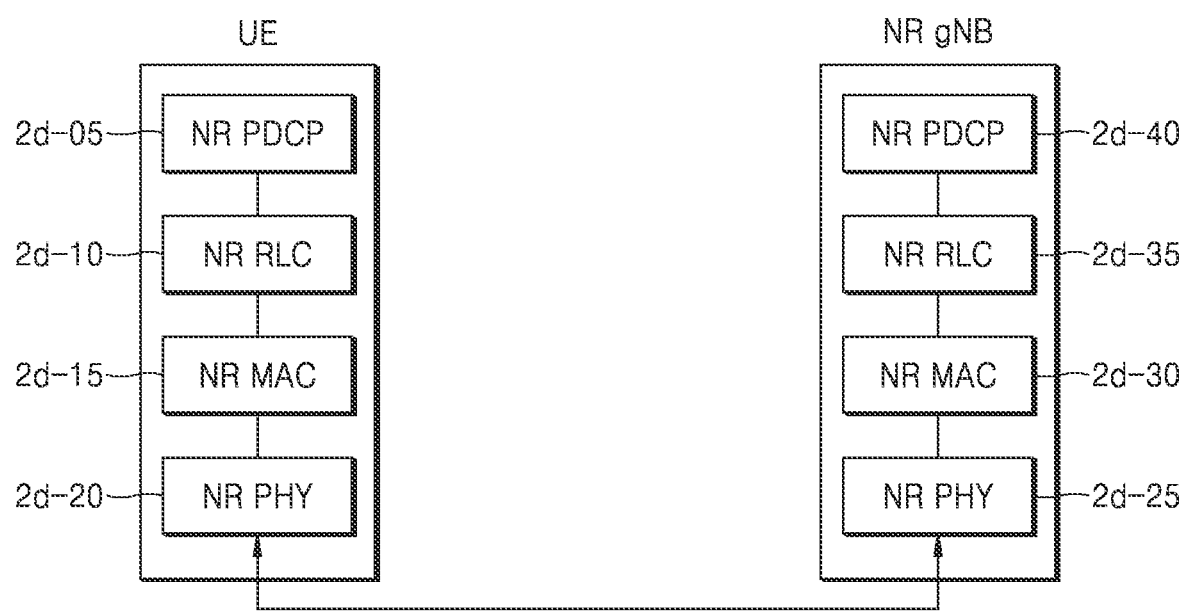
FIG. 2D is a block diagram of a radio protocol architecture of a next-generation mobile communication system, according to an embodiment of the disclosure.

FIG. 2D is a block diagram of a radio protocol architecture of a next-generation mobile communication system, according to an embodiment of the disclosure.

Referring to FIG. 2D, the radio protocol architecture of the next-generation mobile communication system may include NR PDCP layers 2d-05 and 2d-40, NR RLC layers 2d-10 and 2d-35, and NR MAC layers 2d-15 and 2d-30 respectively for a UE and an NR gNB.

Meanwhile, the main functions, the main functions of the NR PDCP layer 2d-05 or 2d-40 may include some of the following functions. However, the main functions are not limited thereto.

Header compression and decompression: ROHC only;
Transfer of user data;
In-sequence delivery of upper layer PDUs;
Out-of-sequence delivery of upper layer PDUs;
PDCP PDU reordering for reception;
Duplicate detection of lower layer SDUs;
Retransmission of PDCP SDUs;
Ciphering and deciphering; and
Timer-based SDU discard in uplink.

According to some embodiments of the disclosure, the reordering function of the NR PDCP layer 1d-05 or 1d-40 may include a function of reordering PDCP PDUs received from a lower layer, on a PDCP sequence number (SN) basis, a function of delivering the reordered data to an upper layer in order or a function of immediately delivering the reordered data without considering an order, a function of recording missing PDCP PDUs by reordering the PDCP PDUs, and a function of reporting status information of the missing PDCP PDUs to a transmitter, and may include a function of requesting to retransmit the missing PDCP PDUs.

According to some embodiments of the disclosure, the main functions of the NR RLC layer 2d-10 or 2d-35 may include at least some of the following functions. However, the main functions are not limited thereto.

Transfer of upper layer PDUs;
In-sequence delivery of upper layer PDUs;
Out-of-sequence delivery of upper layer PDUs;
Error correction through ARQ;
Concatenation, segmentation and reassembly of RLC SDUs;
Re-segmentation of RLC data PDUs;
Reordering of RLC data PDUs;
Duplicate detection;
Protocol error detection;
RLC SDU discard; and
RLC re-establishment.

According to some embodiments of the disclosure, the in-sequence delivery function of the NR RLC layer 2d-10 or 2d-35 may include a function of delivering RLC SDUs received from a lower layer, to an upper layer in order, a function of reassembling multiple RLC SDUs segmented from an RLC SDU and delivering the RLC SDU when the segmented RLC SDUs are received, a function of reordering received RLC PDUs on an RLC SN or PDCP SN basis and a function of recording missing RLC PDUs by reordering the RLC PDUs. Also, the in-sequence delivery function may include a function of reporting status information of the missing RLC PDUs to a transmitter and a function of requesting to retransmit the missing RLC PDUs. The in-sequence delivery function may include a function of delivering only RLC SDUs previous to a missing RLC SDU, to the upper entity in order, when the missing RLC SDU exists. Also, the in-sequence delivery function may include a function of delivering all RLC SDUs received before a timer is started, to the upper entity in order, although a missing RLC SDU exists, when a certain timer is expired, or a function of delivering all RLC SDUs received up to a current time, to the upper entity in order, although a missing RLC SDU exists, when a certain timer is expired. Further, the NR RLC layer 2d-10 or 2d-35 may process the RLC PDUs in order of reception (in order of arrival regardless of sequence numbers) and deliver the RLC PDUs to a PDCP entity out-of-order (out-of-sequence delivery), and reassemble segments received or stored in a buffer, into a whole RLC PDU and process and deliver the RLC PDU to the PDCP layer. According to some embodiments of the disclosure, the NR RLC layer 2d-10 or 2d-35 may not have a concatenation function, and the concatenation function may be performed by the NR MAC layer 2d-15 or 2d-30 or be replaced with a multiplexing function of the NR MAC layer 2d-15 or 2d-30.

The out-of-sequence delivery function of the NR RLC layer 2d-10 or 2d-35 may include at least one of a function of delivering the RLC SDUs received from the lower layer to the upper layer out-of-order, a function of reassembling multiple RLC SDUs segmented from an RLC SDU and delivering the RLC SDU when the segmented RLC SDUs are received, or a function of storing RLC SNs or PDCP SNs of received RLC PDUs and recording missing RLC PDUs by ordering the RLC PDUs.

The NR MAC layer 2d-15 or 2d-30 may be connected to multiple NR RLC layers configured for a single UE, and main functions of the NR MAC layer 2d-15 or 2d-30 may include at least some of the following functions. However, the main functions are not limited thereto.

Mapping between logical channels and transport channels;
Multiplexing/demultiplexing of MAC SDUs;
Scheduling information reporting;
Error correction through HARQ;
Priority handling between logical channels of one UE;
Priority handling between UEs by means of dynamic scheduling;
MBMS service identification;
Transport format selection; and
Padding.

According to some embodiments of the disclosure, the NR PHY layer 2d-20 or 2d-25 may channel-code and modulate upper layer data into OFDM symbols and transmit the OFDM symbols through a radio channel. Also, the NR PHY layer 2d-20 or 2d-25 may demodulate OFDM symbols received through a radio channel and channel-decode and deliver the OFDM symbols to an upper layer. However, the disclosure is not limited to the above examples.

Figure 2E:
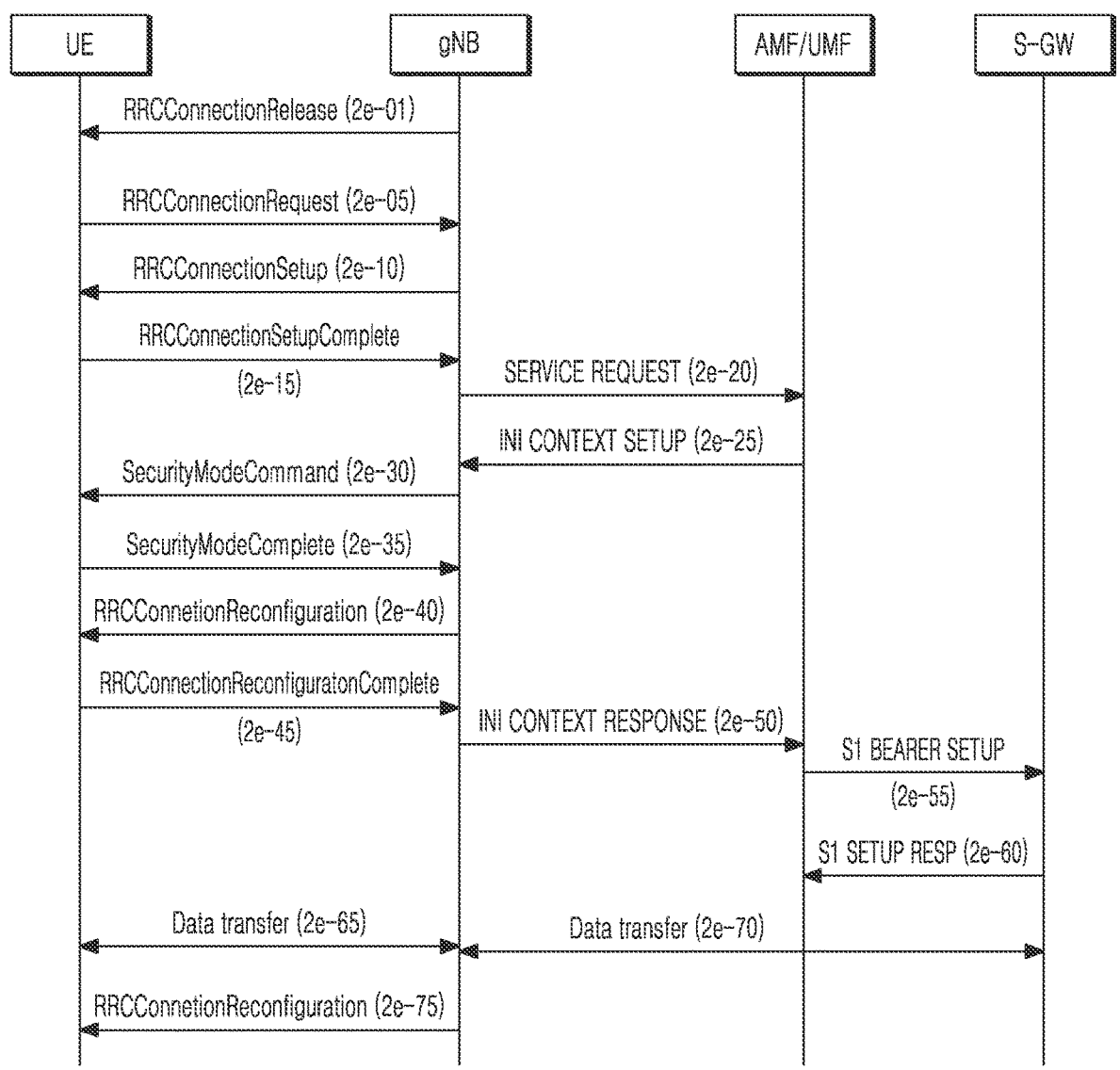
FIG. 2E is a diagram for describing procedures of a UE establishing a connection with a network by switching from an RRC idle mode to an RRC connected mode, according to an embodiment of the disclosure.

FIG. 2E is a diagram for describing procedures of a UE establishing a connection with a network by switching from an RRC idle mode to an RRC connected mode, according to an embodiment of the disclosure.

Referring to FIG. 2E, when a UE that transmits or receives data in an RRC connected mode does not transmit or receive data for a certain reason or for a certain time, a gNB transmits an RRCConnectionRelease message to the UE to switch to an RRC idle mode (operation 2e-01). Thereafter, when data to be transmitted is generated, the UE that has not currently established a connection (hereinafter, the idle mode UE) may perform an RRC connection establishment procedure with the gNB.

The UE may establish reverse transmission synchronization with the gNB through a random-access procedure and transmit an RRCConnectionRequest message to the gNB (operation 2e-05). The RRCConnectionRequest message may include an identifier of the UE, establishment cause, or the like.

The gNB may transmit an RRCConnectionSetup message such that the UE establishes RRC connection (operation 2e-10). The RRCConnectionSetup message may include configuration information for each service/bearer/RLC entity or for each logical channel or bearer, and may include information about whether to use ROHC for each bearer/logical channel, ROHC configuration information (for example, ROHC version or initial information), statusReportRequired information (information instructing UE for PDCP status report by gNB), drb-ContinueROHC information (configuration information for maintaining and using ROHC configuration information as it is and included and transmitted in a MobilityControlInfo message), and an indicator (delayedRetransmission) indicating to perform retransmission after receiving PDCP status report during handover. Also, the RRCConnectionSetup message may include RRC connection configuration information or the like. RRC connection is also referred to as SRB and may be used during transmission and reception of an RRC message that is a control message between the UE and the gNB.

The UE that established the RRC connection may transmit an RRCConnectionSetupComplete message to the gNB (operation 2e-15). The RRCConnectionSetupComplete message may include a control message such as a SERVICE REQUEST message for requesting an MME (or AMF/UMF) to configure a bearer for a certain service by the UE. The gNB transmits the SERVICE REQUEST message included in the RRCConnectionSetupComplete message to the MME (or AMF/UMF) (operation 2e-20). The MME (or AMF/UMF) may determine whether to provide the service requested by the UE.

As a result of the determination, when the service requested by the UE is to be provided, the MME (or AMF/UMF) may transmit an INITIAL CONTEXT SETUP REQUEST message to the gNB (operation 2e-25). The message may include QoS information to be applied while configuring DRB, security-related information (for example, a security key or a security algorithm) to be applied to DRB.

The gNB exchanges a SecurityModeCommand message (operation 2e-30) and a SecurityModeComplete message (operation 2e-35) with the UE to configure a security mode. After the security mode is configured, the gNB may transmit an RRCConnectionReconfiguration message to the UE (operation 2e-40).

The RRCConnectionReconfiguration message includes configuration information for each service/bearer/RLC entity or for each logical channel or bearer, and may include information about whether to use ROHC for each bearer/logical channel, ROHC configuration information (for example, ROHC version or initial information), statusReportRequired information (information instructing UE for PDCP status report by gNB), drb-ContinueROHC information (configuration information for maintaining and using ROHC configuration information as it is and included and transmitted in a MobilityControlInfo message), and an indicator (delayedRetransmission) indicating to perform retransmission after receiving PDCP status report during handover. Also, the RRCConnectionReconfiguration message may include configuration information of DRB for processing user data.

The UE configures the DRB by applying the configuration information of the DRB for processing the user data and transmits an RRCConnectionReconfigurationComplete message to the gNB (operation 2e-45). Upon completing the DRB configuration with the UE, the gNB transmits an INITIAL CONTEXT SETUP COMPLETE message to the MME (or AMF/UMF) (operation 2e-50), and upon receiving the INITIAL CONTEXT SETUP COMPLETE message, the MME (or AMF/UMF) exchanges an S1 BEARER SETUP message and an S1 BEARER SETUP RESPONSE message with the S-GW to configure an S1 bearer (operations 2e-55 and 2e-60). The S1 bearer is a connection for data transmission, which is configured between the S-GW and the gNB, and corresponds to the DRB in a one-to-one manner After the above procedures are completed, the UE may transmit or receive data to or from the gNB through the S-GW in operations (operations 2e-65 and 2e-70).

As such, general data transmission processes may largely include three steps of RRC connection establishment, security setting, and DRB configuration. Also, the gNB may transmit, to the UE, an RRCConnectionReconfiguration message to renew, add, or change the configuration for a certain reason (operation 2e-75). The RRCConnectionReconfiguration message includes configuration information for each service/bearer/RLC entity or for each logical channel or bearer, and may include information about whether to use ROHC for each bearer/logical channel, ROHC configuration information (for example, ROHC version or initial information), statusReportRequired information (information instructing UE for PDCP status report by gNB), drbContinueROHC information (configuration information for maintaining and using ROHC configuration information as it is and included and transmitted in a MobilityControlInfo message), and an indicator (delayedRetransmission) indicating to perform retransmission after receiving PDCP status report during handover.

FIG. 2F is a diagram for describing a ROHC protocol, according to an embodiment of the disclosure.

Referring to FIG. 2F, an IP header 2f-05 and a header 2f-10 of FIG. 2F indicate that a header overhead of an IP packet may be reduced when ROHC protocol is applied. For example, when IPv6 header is used, the IP header 2f-05 having the size of 60 bytes may be compressed to the header 2f-10 having the size of 2 or 4 bytes. A header compression method of the ROHC protocol does not use compression coding or source coding. The header compression method of the ROHC protocol may be as follows. First, entire header information (a source IP address, a destination IP address, TCP/IP sequence number, and the like) of an IP header configuration information (context identifier (CID) and the like) of an ROHC protocol are shared by a transmission PDCP layer and a reception PDCP layer. The entire header information (the source IP address, the destination IP address, the TCP/IP sequence number, and the like) of the IP header may be transmitted by being included in an initialization and refresh state (IR) packet, the transmission PDCP layer may piggyback the entire header information on a PDCP data PDU to the reception PDCP layer, and the reception PDCP layer may receive and share the entire header information. Most of the shared information is fixed information (the source IP address, the destination IP address, and the like) that does not change until connection reestablishment, and only a small portion thereof may be dynamic information (the CID, the TCP/IP sequence number, and the like). Accordingly, after the transmission PDCP layer and the reception PDCP layer once share the entire header information and the configuration information of the ROHC protocol, the transmission PDCP layer transmits only the dynamic information to the reception PDCP layer. As such, when the transmission PDCP layer transmits only the dynamic information without transmitting the entire head information of the IP header, the header overhead may be transmitted after being reduced and compressed. Accordingly, because the transmission PDCP layer transmits only the dynamic information without transmitting the entire header information of the IP header after the transmission PDCP layer and the reception PDCP layer share the entire header information and the configuration information of the ROHC protocol, the ORHC protocol may normally operate only after the reception PDCP layer normally receives the IR packet including the entire header information (the source IP address, the destination IP address, the TCP/IP sequence number, and the like) of the IP header.

The header compression protocol may be applied to the PDCP layer, and the ROHC protocol is unable to be used normally when the entire header information and the configuration information of the ROHC protocol are not shared and synchronized between a transmission PDCP layer 2f-15 and a reception PDCP layer 2f-20. In other words, the reception PDCP layer 2f-20 is unable to decompress the compressed IP header when the transmission PDCP layer 2f-15 and the reception PDCP layer 2f-20 do not share and synchronize the entire header information and the configuration information, even when the transmission PDCP layer 2f-15 compresses and transmits the IP header.

Accordingly, an ROHC protocol of the transmission PDCP layer 2f-15 first transmits an IR packet 2f-25 including the entire header information and the configuration information to the reception PDCP layer 2f-20, and upon receiving the IR packet 2f-25, the reception PDCP layer 2f-20 synchronizes with the transmission PDCP layer 2f-15 in ROHC header 2f-35. Thereafter, the ROHC protocol of the transmission PDCP layer 2f-15 transmits the IR packet 2f-25 to the reception PDCP layer 2f-20 after compressing header 2f-30. Upon receiving the ROHC compressed header, the reception PDCP layer 2f-20 decompresses the ROHC compressed header 2f-35.

Figure 2G:
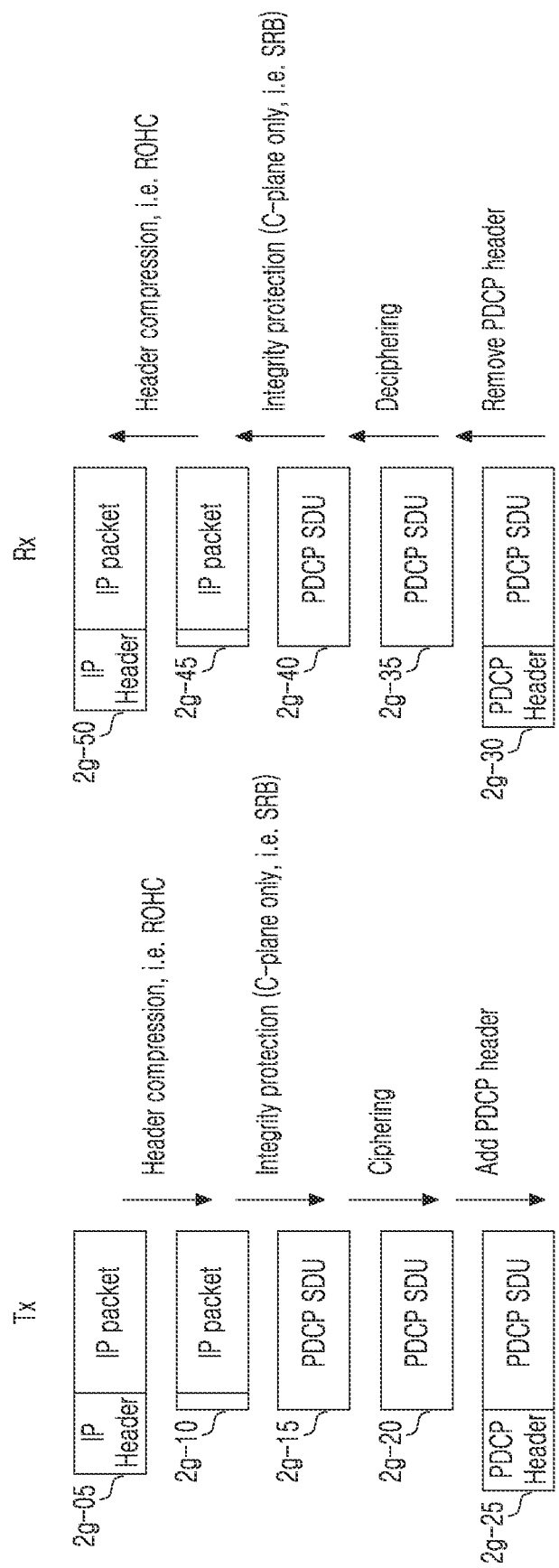
FIG. 2G is a diagram for describing a data processing procedure of a transmission PDCP layer and a reception PDCP layer, according to an embodiment of the disclosure.

FIG. 2G is a diagram for describing a data processing procedure of a transmission PDCP layer and a reception PDCP layer, according to an embodiment of the disclosure.

Referring to FIG. 2G, upon receiving an IP packet (operation 2g-05), a transmission PDCP layer performs header compression (operation 2g-10) on an IP header when a PDCP layer uses an ROHC protocol and performs integrity protection (operation 2g-15) on control plane data or SRB. The transmission PDCP layer performs encoding on the data by using a security key and a count value (operation 2g-20). The transmission PDCP layer allocates a PDCP sequence number, configures a header field corresponding to the data (the control plane data or user plane data), attaches a header to the encoded data, and transmits the header to a lower layer (operation 2g-25).

Upon receiving a PDCP PDU from a lower layer, a reception PDCP layer reads a PDCP sequence number and header field of a PDCP header and removes a header (operation 2g-30). The reception PDCP layer performs decoding on the data from which the header is removed by using a security key and a count value (operation 2g-35). The reception PDCP layer performs integrity verification on the control plane data or SRB (operation 2g-40). When the header is compressed via a PDCP protocol, the reception PDCP layer decompresses the header and reconstructs the IP header before being compressed (operation 2g-45). The reception PDCP layer transmits the reconstructed IP packet to an upper layer (operation 2g-50).

In the disclosure, the term 'order' denotes an ascending order. In the disclosure, header decompression means that a ROHC protocol includes a procedure for verifying a header of a TCP/IP packet or an upper layer packet, and when a packet is an IR packet, the ROHC protocol includes operations of verifying information of the IP packet and updating configuration information of the ROHC protocol according to the information, and when the header is compressed, decompression is performed by verifying the configuration information of the ROHC protocol and the decompressed header is reconstructed.

The transmission PDCP layer and the reception PDCP layer described in the disclosure may be entities in which each PDCP layer belongs to a UE or to a base station, according to a downlink scenario and an uplink scenario. In other words, in the uplink scenario, the transmission PDCP layer denotes an entity of a UE and the reception PDCP layer denotes an entity of a base station. Also, in the downlink scenario, the transmission PDCP layer denotes an entity of a base station and the reception PDCP layer denotes an entity of a UE. A reestablishment procedure of the transmission PDCP layer and the reception PDCP layer described in the disclosure may be applied to both scenarios, and operations of the transmission PDCP layer and operations of the reception PDCP layer may also be applied to both scenarios.

FIG. 2H is a diagram for describing a handover process in a next-generation mobile communication system, according to an embodiment of the disclosure.

Referring to FIG. 2H, a UE 2h-01 in a connected mode state transmits cell measurement information (a measurement report) to a current source gNB (or eNB) 2h-02 when a periodic or specific event is satisfied (operation 2h-05). The source gNB 2h-02 may determine whether the UE 2h-01 is to perform handover to an adjacent cell, based on the cell measurement information. The handover is a technique of changing the source gNB 2h-02 providing a service to the UE 2h-01 in the connected mode state to another gNB (or another cell in the same gNB).

When the source eNB 2h-02 determined the handover, the source eNB 2h-02 requests a new eNB, i.e., a target gNB (or eNB) 2h-03, providing a service to the UE 2h-01 for the handover by transmitting a handover (HO) request message (operation 2h-10). When the target gNB 2h-03 accepts an HO request, the target gNB 2h-03 transmits an HO request Ack message to the source gNB 2h-02 (operation 2h-15). Upon receiving the HO request Ack message, the source gNB 2h-02 transmits an HO command message to the UE 2h-01 (operation 2h-20). The HO command message is transmitted from the source gNB 2h-02 to the UE 2h-01 by using an RRCConnectionReconfiguration message (operation 2h-20). Upon receiving the HO command message, the UE 2h-01 stops exchanging data with the source gNB 2h-02 and starts a T304 timer. The T304 timer sets the UE 2h-01 to an original setting and to an RRC idle state when the handover of the UE 2h-01 to the target gNB 2h-03 does not succeed for a certain time. The source gNB 2h-02 transmits a sequence number (SN) state with respect to uplink/downlink data and transmits the downlink data to the target gNB 2h-03 when there is the downlink data (operations 2h-30 and 2h-35). The UE 2h-01 attempts random access to a target cell instructed by the source gNB 2h-02 (operation 2h-40). The UE 2h-01 attempts the random access to notify the target cell that the UE 2h-01 is moving via the handover and at the same time, to synchronize the uplink. For the random access, the UE 2h-01 transmits, to the target gNB 2h-03, a preamble corresponding to a preamble ID provided from the source gNB 2h-02 or a preamble ID randomly selected. When a certain number of subframes is passed after the preamble is transmitted, the UE 2h-01 monitors whether a random-access response (RAR) message is transmitted from the target gNB 2h-03. A time section where whether the RAR message is transmitted is monitored is referred to as a RAR window. For a certain time, when the RAR message is received (operation 2h-45), the UE 2h-01 transmits RRC-ConnectionReconfigurationComplete message to the target gNB 2h-03 as an HO complete message (operation 2h-55). Upon successfully receiving the RAR message from the target gNB 2h-03, the UE 2h-01 stops the T304 timer (operation 2h-50). The target gNB 2h-03 requests an MME (or S-GW or AMF) 2h-04 to switch a path (operations 2h-60 and 2h-65) so as to switch a path of bearers set in the source gNB 2h-02, and notifies the source gNB 2h-02 to release UE context of the UE 2h-01 (operation 2h-70). Accordingly, the UE 2h-01 attempts to receive data from the target gNB 2h-03 from a point of time when the RAR window starts, and after receiving the RAR message, starts to transmit data to the target gNB 2h-03 while transmitting the RRCConnectionReconfigurationComplete message.

Figure 2I:
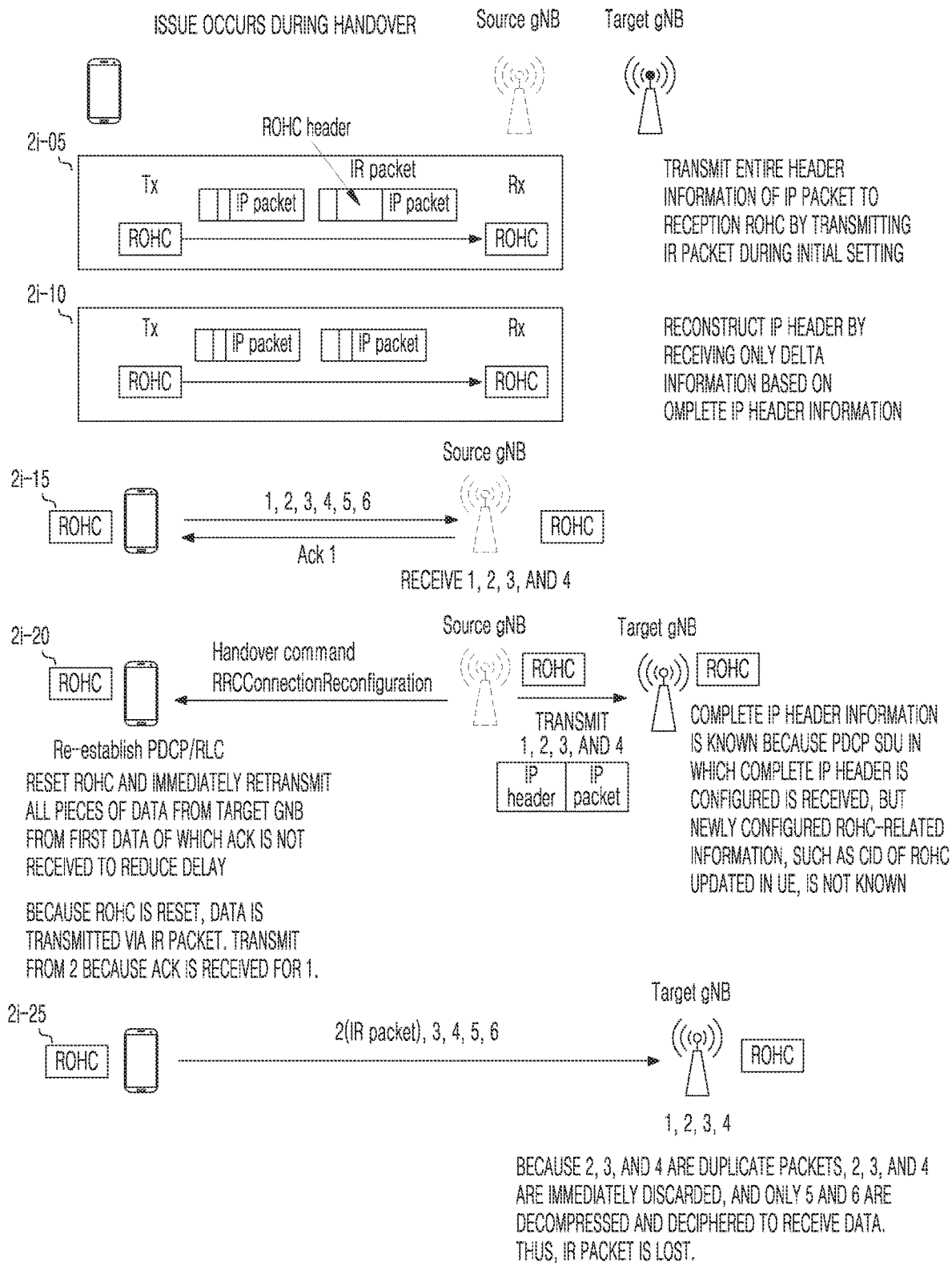
FIG. 2I is a diagram for describing a scenario in which a decompression error occurs as header compression protocol information is lost in a reception PDCP layer, when a transmission PDCP layer and the reception PDCP layer use an ROHC protocol during a handover procedure, according to an embodiment of the disclosure.

FIG. 2I is a diagram for describing a scenario in which a decompression error occurs as header compression protocol information is lost in a reception PDCP layer, when a transmission PDCP layer and the reception PDCP layer use an ROHC protocol during a handover procedure, according to an embodiment of the disclosure.

Referring to FIG. 2I, a UE including a reception PDCP layer (an AM DRB and an AM data radio bearer) connected (or set) to an RLC layer supporting an AM mode and in which an out-of-delivery indicator is not set via an RRC message establishes a connection with a source gNB. Then, when the UE received a setting from the source gNB to use an ROHC protocol before transmitting or receiving data (settable via an RRC message shown in operations 2e-10, 2e-40, and 2e-75 of FIG. 2E), the UE completes bearer setting and ROHC protocol setting, configures an IR packet, and transmits the IR packet to the source gNB. A reception PDCP layer of the source gNB receives the IR packet and synchronizes an ROHC protocol with a transmission PDCP layer of the UE. In other words, the reception PDCP layer of the source gNB verifies and stores entire header information of a header of the IP packet and configuration information related to the ROHC protocol, and uses the entire header information and the configuration information to decompress the header compressed via the ROHC protocol in scenario 2i-05.

When the ROHC protocol of the transmission PDCP layer of the UE and the ROHC protocol of the reception PDCP layer of the source gNB are synchronized in scenario 2i-05, the transmission PDCP layer of the UE may compress and transmit the header of the IP packet via the ROHC protocol in scenario 2i-10. The reception PDCP layer of the source gNB decompresses and reconstructs the data transmitted from the transmission PDCP layer of the UE via the ROHC protocol, and transmits the data to an upper layer.

In addition to scenarios 2i-05 and 2i-10, scenario 2i-20 will now be described assuming scenario 2i-15 that the UE transmitted data corresponding to PDCP sequence numbers 1 through 6 to the source gNB, the source gNB successfully received the data corresponding to the PDCP sequence number 1 and then successfully received only the data corresponding to the PDCP sequence numbers 2 through 4, and then the UE received RLC ACK corresponding to the PDCP sequence number 1.

Upon receiving a handover command from the source gNB, the UE re-establishes a PDCP layer (PDCP re-establishment). The re-establishment of the PDCP layer may denote that the ROHC protocol is reset and pieces of data are continuously retransmitted to a target gNB from data corresponding to a first PDCP sequence number of which ACK is not received from a lower layer of the PDCP layer. The source gNB transmits data received from the UE to the target gNB in scenario 2i-20. In the scenario 2i-20, because the target gNB needs to newly configure a ROHC protocol with respect to the PDCP layer corresponding to the UE, the ROHC protocol of the PDCP layer of the target gNB, which corresponds to the UE, is not synchronized with the ROHC protocol of the PDCP layer of the UE.

In the scenario 2i-20, the UE completes connection establishment with the target gNB, and in order to synchronize the ROHC protocol of the PDCP layer of the UE and the ROHC protocol of the PDCP layer of the target gNB, the UE configures an IR packet that does not include the entire header information and the configuration information of the ROHC protocol and transmits the IR packet to the target gNB by piggybacking the IR packet on the data corresponding to the PDCP sequence number 2 that is the first PDCP sequence number of which ACK is not received from the lower layer. Also, the UE retransmits the data corresponding to the PDCP sequence numbers 3 through 6 to the target gNB in scenario 2i-25. IP headers of IP packets corresponding to the PDCP sequence numbers 3 through 6 may be compressed via the ROHC protocol.

Because the target gNB has already received the data corresponding to the PDCP sequence numbers 1 through 4 (from the source gNB), the target gNB considers the data corresponding to the PDCP sequence numbers 1 through 4 as duplicate packets and immediately discards the data corresponding to the PDCP sequence numbers 1 through 4 (the same issue may occur for an outdated packet instead of a duplicate packet). Accordingly, the IR packet is lost in the target gNB, and the ROHC protocol of the PDCP layer of the target gNB and the ROHC protocol of the PDCP layer of the UE may not be synchronized. When the ROHC protocol of the PDCP layer of the target gNB and the ROHC protocol of the PDCP layer of the UE are not synchronized, the target gNB is unable to perform decompression on the received data compressed via the ROHC protocol and thus a decompression error may occur in the target gNB.

Figure 2J:
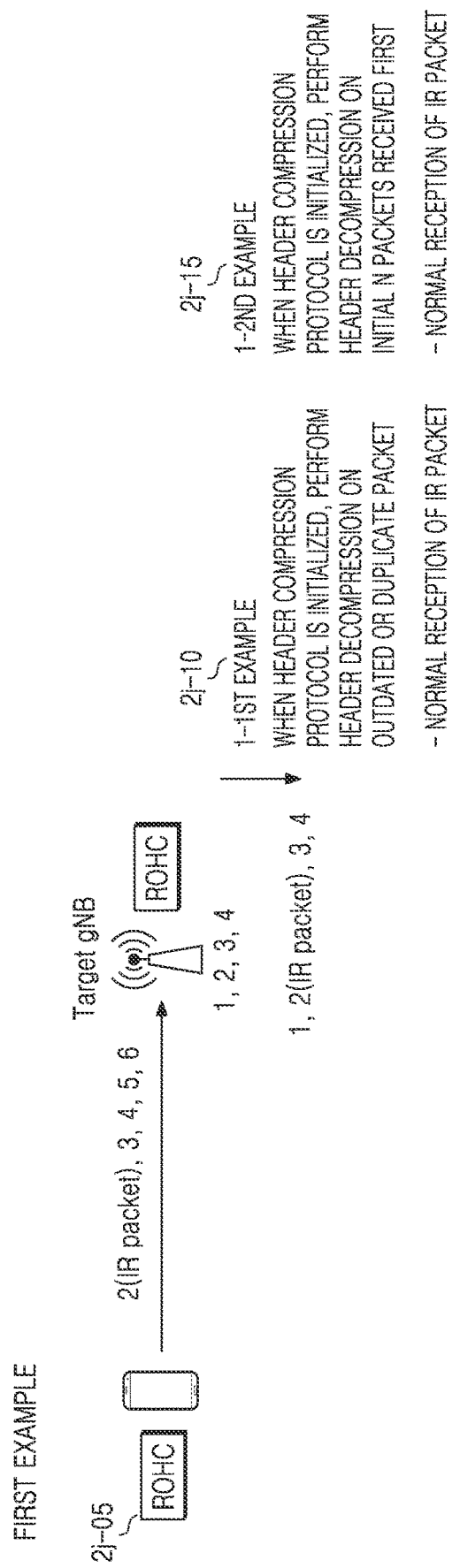
FIG. 2J is a diagram for describing a first example for preventing the occurrence of a decompression error as compression protocol information is lost in a reception PDCP layer, when transmission and reception PDCP layers use an ROHC protocol during a handover procedure in a next-generation mobile communication system, according to an embodiment of the disclosure.

FIG. 2J is a diagram for describing a first example for preventing the occurrence of a decompression error in a reception PDCP layer, when transmission and reception PDCP layers use an ROHC protocol during a handover procedure in a next-generation mobile communication system, according to an embodiment of the disclosure.

In FIG. 2I, an issue has been described with an example of an uplink according to some embodiments of the disclosure, but the same issue may occur in a downlink. In other words, in FIG. 2I, a UE may be a source gNB (or a target gNB), and the same issue may occur during a handover process or a PDCP reestablishment process in a downlink in which a source gNB and a target gNB operate as one gNB. Accordingly, methods suggested in the first example of the disclosure may be applied to both uplink and downlink.

Hereinafter, the first example of the disclosure will be described assuming an uplink transmission situation, and that a UE performs operations of a transmission PDCP layer and a gNB performs operations of a reception PDCP layer. However, the disclosure is not limited thereto, and the first example of the disclosure may also be applied to uplink transmission situation. In other words, the first example may be applied to the downlink transmission situation in which a gNB performs operations of a transmission PDCP layer and a UE performs operations of a reception PDCP layer. Thus, the operations of the transmission PDCP layer and the operations of the reception PDCP layer proposed in the first example of the disclosure may be applied to both uplink and downlink.

Referring to FIG. 2J, a UE receives a handover command from a gNB, performs a PDCP reestablishment procedure, performs handover to a target gNB, and then performs retransmission in an order from a first PDCP PDU of which ACK is not confirmed from a lower layer. Thus, even when the target gNB already received data corresponding to PDCP sequence numbers 2 through 4, when ACK is received only for data corresponding to a PDCP sequence number 1 is received, the UE performs retransmission from the data corresponding to the PDCP sequence number 2. Accordingly, an ROHC protocol of a transmission PDCP layer of the UE may piggyback an IR packet on the data corresponding to the PDCP sequence number 2 (because the IR packet is an important packet in initializing and configuring the ROHC protocol, the IR packet may be piggybacked on the data corresponding to the PDCP sequence numbers 3 and 4 according to embodiments of the disclosure).

In an 1-1st example according to some embodiments of the disclosure, when the ROHC protocol is initialized (operation 2j-05) (for example, when the ROHC protocol is in a no context (NC) state in a unidirectional (U) mode), a reception PDCP layer may not immediately discard a received packet even when the received packet is outdated or duplicate, but may decode the received packet, perform integrity verification, and perform header decompression. Accordingly, the reception PDCP layer may normally receive the IR packet without losing the IR packet. Such an operation may enable a reception ROHC protocol to be performed in an NC state of a U mode, a bidirectional optimistic (O) mode, or a bidirectional reliable (R) mode, or in a static context (SC) state. In other words, the reception PDCP layer according to the 1-1st example of the disclosure may not immediately discard the received packet even when the received packet is an outdated or duplicate packet, but may perform integrity verification and header decompression. Accordingly, even when the IR packet is piggybacked on a duplicate packet, the reception PDCP layer may receive the duplicate packet on which the IR packet is piggybacked, verify entire header information and configuration information of the ROHC protocol, and synchronize with a transmission ROHC protocol. Thus, the reception PDCP layer may successfully perform header decompression on PDCP PDUs transmitted from the transmission PDCP layer and of which headers are compressed (operation 2j-10), in the 1-1st example.

In a 1-2nd example according to some embodiments of the disclosure, when the ROHC protocol is initialized (operation 2j-05) or PDCP layer reestablishment is performed, the reception PDCP layer may perform header decompression on n packets received first. In other words, regardless of whether received data is outdated or duplicate data (outdated or duplicated PDCP PDUs), the reception PDCP layer may perform header decompression on n PDCP PDUs received first after PDCP layer reestablishment is performed or the ROHC protocol is initialized to prevent the IR packet from being lost (operation 2j-15). According to some embodiments of the disclosure, n that is the number of packets received first after the header decompression is performed may be adjustable according to implementation, may be determined to one value in common as a standard, or may be set via an RRC message (i.e., a specific value of n may be instructed via the RRC message).

According to some embodiments of the disclosure, the reception PDCP layer may use a PDCP sequence number length (for example, 12 bits or 18 bits) set by the gNB in RRC, identify a PDCP sequence number of received data (for example, PDCP PDU), and drive a receive window. The receive window driven by the reception PDCP layer may be set to half a size (for example, 2^(PDCP sequence number length−1) of a PDCP sequence number space and may be used to distinguish valid data. In other words, the reception PDCP layer may determine data received from out of the receive window as invalid data and discard the data. A case in which the data is received from out of the receive window may include a case in which data is received very late due to retransmission of an RLC layer from a lower layer or HARQ retransmission of a MAC layer. Also, the reception PDCP layer may drive a PDCP t-reordering timer together with the receive window.

The PDCP t-reordering timer may be triggered when a PDCP sequence number gap occurs based on the PDCP sequence number in the reception PDCP layer. When data corresponding to the PDCP sequence number gap does not arrive until the PDCP t-reordering timer expires, the reception PDCP layer may transmit data to an upper layer in an ascending order of the PDCP sequence number and move the receive window. Accordingly, when the data corresponding to the PDCP sequence number gap arrives after the PDCP t-reordering timer is expired, the data is not data in the receive window, and thus the reception PDCP layer may discard the data corresponding to the PDCP sequence number gap arrived after the PDCP t-reordering timer is expired.

A 1-1-1st example that is specific procedures of the 1-1st example described above with respect to the operations of the reception PDCP layer of the UE or gNB proposed in the disclosure may be as follows.

According to some embodiments of the disclosure, the reception PDCP layer may maintain and manage three count variables when processing received data. The reception PDCP layer may use a second count variable that maintains a count value of data (for example, PDCP SDU) expected to be received next when processing the received data, and the second count variable may be referred to as RX_NEXT. Also, the reception PDCP layer may use a third count variable that maintains a count value of first data (for example, PDCP SDU) that is not transmitted to an upper layer when processing the received data, and the third count variable may be referred to as RX_DELIV. Also, the reception PDCP layer may use a fourth count variable that maintains a count value of data (for example, PDCP SDU) that triggered the PDCP t-reordering timer when processing the received data, and the fourth count variable may be referred to as RX_REORD. Also, the reception PDCP layer may use a fifth count variable that maintains a count value of data (for example, PDCP SDU) currently received when processing the received data, and the fifth count variable may be referred to as RCVD_COUNT. The PDCP t-reordering timer described above may use a timer value or interval set via an RRC message as described in FIG. 1E in an upper layer (RRC layer). The PDCP t-reordering timer is used to detect a lost PDCP PDU and only one timer may be driven at a time.

According to some embodiments of the disclosure, the UE may define and use the following variables in the operation of the reception PDCP layer. The disclosure is not limited thereto.

HFN: indicates an HFN of a window state variable.
SN: indicates an SN of a window state variable.
RCVD_SN: indicates a PDCP sequence number included in a header of a received PDCP PDU.
RCVD_HFN: an HFN value of a received PDCP PDU calculated by a reception PDCP layer.

A specific operation of the reception PDCP layer suggested in the 1-1-1st example of the disclosure may be as follows.

According to some embodiments of the disclosure, the reception PDCP layer may determine a count value of a received PDCP PDU as follows when the PDCP PDU is received from a lower layer.

When received RCVD_SN is RCVD_SN<=SN(RX_DELIV)−Window_Size, the RCVD_HFN=HFN(RX_DELIV)+1.

On the other hand, when RCVD_SN is RCVD_SN>SN(RX_DELIV)+Window_Size, the RCVD_HFN=HFN(RX_DELIV)−1.

For none of the cases above, the RCVD_HFN=HFN(RX_DELIV).

RCVD_COUNT is determined to RCVD_COUNT=[RCVD_HFN, RCVD_SN].

According to some embodiments of the disclosure, after determining the count value of the received PDCP PDU, the reception PDCP layer may update window state variables as follows and process the PDCP PDU.

Perform decoding on the PDCP PDU by using the RCVD_COUNT, perform integrity verification and when the integrity verification fails, notify an upper layer of integrity verification failure and discard received PDCP data PDU (a data portion of the PDCP PDU).

When RCVD_COUNT<RX_DELIV or a PDCP PDU having a value of RCVD_COUNT has been received before (in case of a packet that is outdated, overdue, or out of a window, or in case of a duplicate packet), and when the ROHC is in an NC state of a U mode (or when ROHC is reset and is not set), the header decompression is performed on the received packet (when not discarded). Otherwise, the received PDCP Data PDU (the data portion of the PDCP PDU) is discarded.

According to some embodiments of the disclosure, when the received PDCP PDU is not discarded, the reception PDCP layer may operate as follows.

The PDCP SDU processed above is stored in a receive buffer.

When RCVD_COUNT>=RX_NEXT, the RX_NEXT is updated to RCVD_COUNT+1.

When out-of-order delivery indicator (outOfOrderDelivery) is set (when an out-of-order delivery is instructed), the PDCP SDU is transmitted to the upper layer.

When RCVD_COUNT is equal to RX_DELIV and when header compression is not released before, header decompression is performed and then the PDCP SDU is transmitted to the upper layer in an order of count values and consecutive PDCP SDUs are all transmitted to the upper layer from COUNT=RX_DELIV. Otherwise, the RX_DELIV is updated to a count value of a first PDCP SDU that is not transmitted to the upper layer, wherein the count value is equal to or greater than current RX_DELIV.

When the t-reordering is driven and RX_DELIV is equal to or greater than RX_REORD, the t-reordering timer is stopped and reset.

When the t-reordering timer is not driven (including the stop in the above condition) and RX_DELIV is smaller than RX_NEXT, the RX_REORD is updated to RX_NEXT and the t-reordering timer is started.

According to some embodiments of the disclosure, the reception PDCP layer may operate as follows when the PDCP t-reordering timer is expired.

When header compression is not released before, header decompression is performed and then the PDCP SDUs are transmitted to the upper layer in an order of count values, all PDCP SDUs having count values smaller than RX_REORD are transmitted to the upper layer and all PDCP SDUs having consecutive count values from RX_REORD are transmitted to the upper layer.

RX_DELIV is updated to a count value of a first PDCP SDU that is not transmitted to the upper layer, wherein the count value is equal to or greater than RX_REORD.

When RX_DELIV is smaller than RX_NEXT, the RX_REORD is updated to RX_NEXT and the t-reordering timer is started.

A 1-1-2nd example that is specific procedures of the 1-1st example described above with respect to the operations of the reception PDCP layer of the UE or gNB proposed in the disclosure may be as follows.

According to some embodiments of the disclosure, the reception PDCP layer may determine a count value of a received PDCP PDU as follows when the PDCP PDU is received from a lower layer.

When received RCVD_SN is RCVD_SN<=SN(RX_DELIV)−Window_Size, the RCVD_HFN=HFN(RX_DELIV)+1.

On the other hand, when RCVD_SN is RCVD_SN>SN(RX_DELIV)+Window_Size, the RCVD_HFN=HFN(RX_DELIV)−1.

For none of the cases above, the RCVD_HFN=HFN(RX_DELIV).

RCVD_COUNT is determined to RCVD_COUNT=[RCVD_HFN, RCVD_SN].

According to some embodiments of the disclosure, after determining the count value of the received PDCP PDU, the reception PDCP layer may update window state variables as follows and process the PDCP PDU.

Perform decoding on the PDCP PDU by using the RCVD_COUNT, perform integrity verification and when the integrity verification fails, notify an upper layer of integrity verification failure and discard received PDCP data PDU (a data portion of the PDCP PDU).

When RCVD_COUNT<RX_DELIV or a PDCP PDU having a value of RCVD_COUNT has been received before (in case of a packet that is outdated, overdue, or out of a window, or in case of a duplicate packet), header decompression is performed on the received packet (when not discarded) and the received PDCP Data PDU (the data portion of the PDCP PDU) is discarded.

When the received PDCP PDU is not discarded, the reception PDCP layer operates as follows.

The PDCP SDU processed above is stored in a receive buffer.

When RCVD_COUNT>=RX_NEXT, the RX_NEXT is updated to RCVD_COUNT+1.

When out-of-order delivery indicator (outOfOrderDelivery) is set (when an out-of-order delivery is instructed), the PDCP SDU is transmitted to the upper layer.

When RCVD_COUNT is equal to RX_DELIV, and when header compression is not released before, header decompression is performed and then the PDCP SDU is transmitted to the upper layer in an order of count values and consecutive PDCP SDUs are all transmitted to the upper layer from COUNT=RX_DELIV. Otherwise, the RX_DELIV is updated to a count value of a first PDCP SDU that is not transmitted to the upper layer, wherein the count value is equal to or greater than current RX_DELIV.

When the t-reordering is driven and RX_DELIV is equal to or greater than RX_REORD, the t-reordering timer is stopped and reset.

When the t-reordering timer is not driven (including the stop in the above condition) and RX_DELIV is smaller than RX_NEXT, the RX_REORD is updated to RX_NEXT and the t-reordering timer is started.

According to some embodiments of the disclosure, the reception PDCP layer may operate as follows when the PDCP t-reordering timer is expired.

When header compression is not released before, header decompression is performed and then the PDCP SDUs are transmitted to the upper layer in an order of count values, all PDCP SDUs having count values smaller than RX_REORD are transmitted to the upper layer and all PDCP SDUs having consecutive count values from RX_REORD are transmitted to the upper layer.

RX_DELIV is updated to a count value of a first PDCP SDU that is not transmitted to the upper layer, wherein the count value is equal to or greater than RX_REORD.

When RX_DELIV is smaller than RX_NEXT, the RX_REORD is updated to RX_NEXT and the t-reordering timer is started.

A 1-1-3rd example that is specific procedures of the 1-1st example described above with respect to the operations of the reception PDCP layer of the UE or gNB proposed in the disclosure may be as follows.

According to some embodiments of the disclosure, the reception PDCP layer may determine a count value of a received PDCP PDU as follows when the PDCP PDU is received from a lower layer.

When received RCVD_SN is RCVD_SN<=SN(RX_DELIV)−Window_Size, the RCVD_HFN=HFN(RX_DELIV)+1.

On the other hand, when RCVD_SN is RCVD_SN>SN(RX_DELIV)+Window_Size, the RCVD_HFN=HFN(RX_DELIV)−1.

For none of the cases above, the RCVD_HFN=HFN(RX_DELIV).

RCVD_COUNT is determined to RCVD_COUNT=[RCVD_HFN, RCVD_SN].

According to some embodiments of the disclosure, after determining the count value of the received PDCP PDU, the reception PDCP layer may update window state variables as follows and process the PDCP PDU.

When integrity protection and verification procedures are set, decoding is performed on the PDCP PDU by using the RCVD_COUNT, integrity verification is performed and when the integrity verification fails, notify an upper layer of integrity verification failure and discard received PDCP data PDU (a data portion of the PDCP PDU).

When RCVD_COUNT<RX_DELIV or a PDCP PDU having a value of RCVD_COUNT has been received before (in case of a packet that is outdated, overdue, or out of a window, or in case of a duplicate packet) and when the ROHC is in an NC state of a U mode (or when ROHC is reset and is not set) and when decoding is not performed in the above, the PDCP PDU is decoded by using the RCVD_COUNT and header decompression is performed on the received packet (when not discarded). Otherwise, the received PDCP Data PDU (the data portion of the PDCP PDU) is discarded.

According to some embodiments of the disclosure, when the received PDCP PDU is not discarded in the above, the reception PDCP layer may operate as follows.

When the integrity protection and verification procedures are not set (or when the decoding procedure is not performed), decoding is performed on the PDCP PDU by using RCVD_COUNT.

The PDCP SDU processed above is stored in a receive buffer.

When RCVD_COUNT>=RX_NEXT, the RX_NEXT is updated to RCVD_COUNT+1.

When out-of-order delivery indicator (outOfOrderDelivery) is set (when an out-of-order delivery is instructed), the PDCP SDU is transmitted to the upper layer.

When RCVD_COUNT is equal to RX_DELIV and when header compression is not released before, header decompression is performed and then the PDCP SDU is transmitted to the upper layer in an order of count values, and consecutive PDCP SDUs are all transmitted to the upper layer from COUNT=RX_DELIV. Otherwise, the RX_DELIV is updated to a count value of a first PDCP SDU that is not transmitted to the upper layer, wherein the count value is equal to or greater than current RX_DELIV.

When the t-reordering is driven and RX_DELIV is equal to or greater than RX_REORD, the t-reordering timer is stopped and reset.

When the t-reordering timer is not driven (including the stop in the above condition) and RX_DELIV is smaller than RX_NEXT, the RX_REORD is updated to RX_NEXT and the t-reordering timer is started.

According to some embodiments of the disclosure, the reception PDCP layer may operate as follows when the PDCP t-reordering timer is expired.

When header compression is not released before, header decompression is performed and then the PDCP SDUs are transmitted to the upper layer in an order of count values, all PDCP SDUs having count values smaller than RX_REORD are transmitted to the upper layer and all PDCP SDUs having consecutive count values from RX_REORD are transmitted to the upper layer.

RX_DELIV is updated to a count value of a first PDCP SDU that is not transmitted to the upper layer, wherein the count value is equal to or greater than RX_REORD.

When RX_DELIV is smaller than RX_NEXT, the RX_REORD is updated to RX_NEXT and the t-reordering timer is started.

A 1-1-4th example that is specific procedures of the 1-1st example described above with respect to the operations of the reception PDCP layer of the UE or gNB proposed in the disclosure may be as follows.

According to some embodiments of the disclosure, the reception PDCP layer may determine a count value of a received PDCP PDU as follows when the PDCP PDU is received from a lower layer.

When received RCVD_SN is RCVD_SN<=SN(RX_DELIV)−Window_Size, the RCVD_HFN=HFN(RX_DELIV)+1.

On the other hand, when RCVD_SN is RCVD_SN>SN(RX_DELIV)+Window_Size, the RCVD_HFN=HFN(RX_DELIV)−1.

For none of the cases above, the RCVD_HFN=HFN(RX_DELIV).

RCVD_COUNT is determined to RCVD_COUNT=[RCVD_HFN, RCVD_SN].

According to some embodiments of the disclosure, after determining the count value of the received PDCP PDU, the reception PDCP layer may update window state variables as follows and process the PDCP PDU.

When integrity protection and verification procedures are set, decoding is performed on the PDCP PDU by using the RCVD_COUNT, integrity verification is performed and when the integrity verification fails, notify an upper layer of integrity verification failure and discard received PDCP data PDU (a data portion of the PDCP PDU).

When RCVD_COUNT<RX_DELIV or a PDCP PDU having a value of RCVD_COUNT has been received before (in case of a packet that is outdated, overdue, or out of a window, or in case of a duplicate packet) and when decoding is not performed in the above, the PDCP PDU is decoded by using the RCVD_COUNT, header decompression is performed on the received packet (when not discarded), and the received PDCP Data PDU (the data portion of the PDCP PDU) is discarded.

According to some embodiments of the disclosure, when the received PDCP PDU is not discarded in the above, the reception PDCP layer may operate as follows.

When the integrity protection and verification procedures are not set (or when the decoding procedure is not performed), decoding is performed on the PDCP PDU by using RCVD_COUNT.

The PDCP SDU processed above is stored in a receive buffer.

When RCVD_COUNT>=RX_NEXT, the RX_NEXT is updated to RCVD_COUNT+1.

When out-of-order delivery indicator (outOfOrderDelivery) is set (when an out-of-order delivery is instructed), the PDCP SDU is transmitted to the upper layer.

When RCVD_COUNT is equal to RX_DELIV and when header compression is not released before, header decompression is performed and then the PDCP SDU is transmitted to the upper layer in an order of count values and consecutive PDCP SDUs are all transmitted to the upper layer from COUNT=RX_DELIV. Otherwise, the RX_DELIV is updated to a count value of a first PDCP SDU that is not transmitted to the upper layer, wherein the count value is equal to or greater than current RX_DELIV.

When the t-reordering is driven and RX_DELIV is equal to or greater than RX_REORD, the t-reordering timer is stopped and reset.

When the t-reordering timer is not driven (including the stop in the above condition) and RX_DELIV is smaller than RX_NEXT, the RX_REORD is updated to RX_NEXT and the t-reordering timer is started.

According to some embodiments of the disclosure, the reception PDCP layer may operate as follows when the PDCP t-reordering timer is expired.

When header compression is not released before, header decompression is performed and then the PDCP SDUs are transmitted to the upper layer in an order of count values, all PDCP SDUs having count values smaller than RX_REORD are transmitted to the upper layer and all PDCP SDUs having consecutive count values from RX_REORD are transmitted to the upper layer.

RX_DELIV is updated to a count value of a first PDCP SDU that is not transmitted to the upper layer, wherein the count value is equal to or greater than RX_REORD.

When RX_DELIV is smaller than RX_NEXT, the RX_REORD is updated to RX_NEXT and the t-reordering timer is started.

In the disclosure, header decompression means that a ROHC protocol includes a procedure for verifying a header of a TCP/IP packet or an upper layer packet, and when a packet is an IR packet, the ROHC protocol includes operations of verifying information of the IP packet and updating configuration information of the ROHC protocol according to the information, and when the header is compressed, decompression is performed by verifying the configuration information of the ROHC protocol and the decompressed header is reconstructed.

Figure 2K:
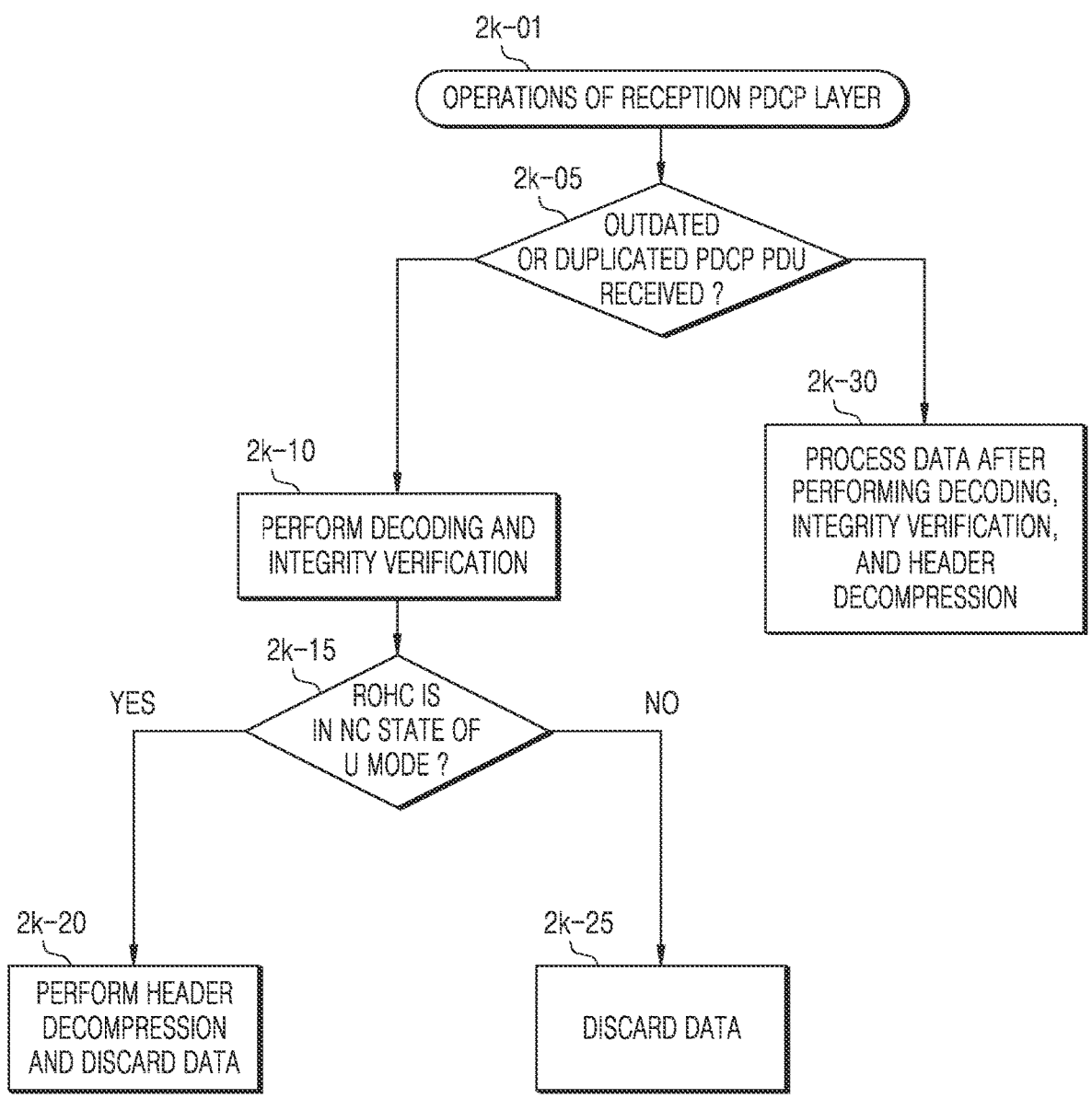
FIG. 2K is a flowchart showing operations when a reception PDCP layer receives an outdated or duplicated PDCP packet data unit (PDU), according to an embodiment of the disclosure.

FIG. 2K is a flowchart showing operations when a reception PDCP layer receives an outdated or duplicated PDCP PDU, according to an embodiment of the disclosure.

Referring to FIG. 2K, when the reception PDCP layer receives the data at operation 2$k$-01, the reception PDCP layer checks for outdated or duplicated data (PDCP PDU) at operation 2$k$-05, the reception PDCP layer performs decoding and integrity verification on the received data (when the reception PDCP layer fails the integrity verification, the reception PDCP layer notifies an upper layer of an integrity verification failure and immediately discards data of which the integrity verification is failed) at operation 2$k$-10. According to some embodiments of the disclosure, the outdated data may be data (PDCP PDU) that arrived after a PDCP t-reordering timer is started and then expired in the reception PDCP layer. Also, according to some embodiments of the disclosure, the duplicated data may be data duplicating data pre-received by the reception PDCP layer.

When the ROHC is in an NC state of a U mode at operation 2$k$-15, the reception PDCP layer performs header decompression (verifies presence of an IR packet and updates configuration information of the ROHC when the IR packet is present) and discards the data at operation 2$k$-20. When the ROHC is in a state other than the NC state of the U mode at operation 2$k$-15, the reception PDCP layer discards the received data at operation 2$k$-25.

When the received data (PDCP PDU) is not outdated or duplicated at operation 2$k$-05, the reception PDCP layer processes the data after performing decoding, integrity verification, and header decompression on the data at operation 2$k$-30.

When the 1-2nd example of the disclosure is applied, header decompression may be performed always on first nth packet (or n packets) (regardless of whether the packet is outdated or duplicated), when the ROHC is in the NC state of the U mode during the receiving operation or when the ROHC is initialized (reset).

Figure 2L:
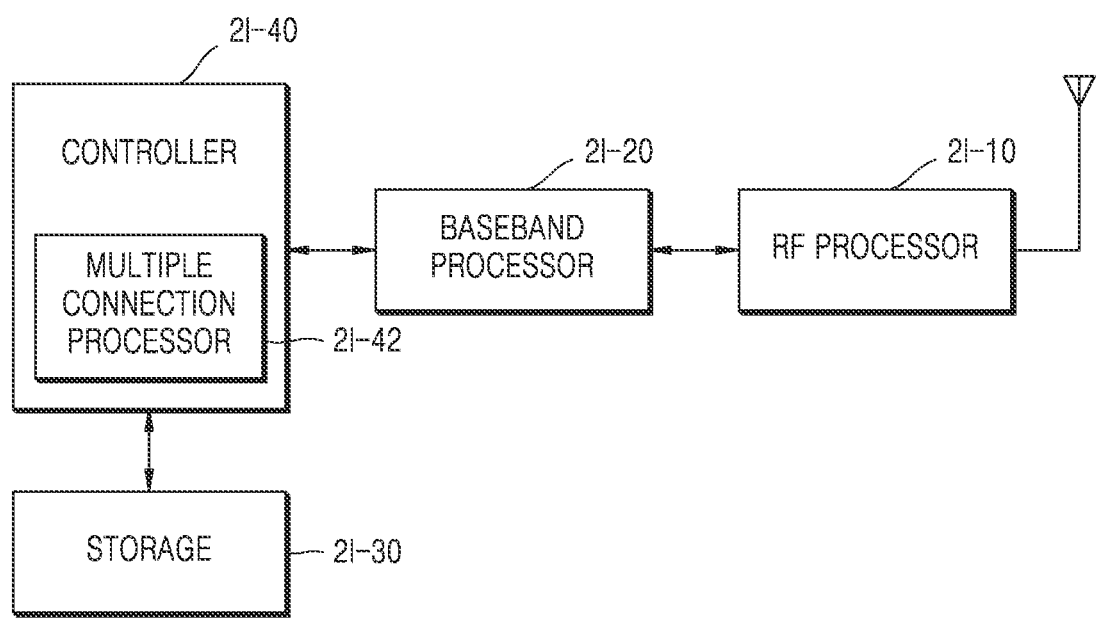
FIG. 2L is a block diagram of a structure of a UE, according to an embodiment of the disclosure.

FIG. 2L is a block diagram of a structure of a UE, according to an embodiment of the disclosure.

Referring to FIG. 2L, the UE includes an RF processor 2$l$-10, a baseband processor 2$l$-20, a storage 2$l$-30, and a controller or at least one processor 2$l$-40. However, the UE is not limited thereto, and may include more or less components than those shown in FIG. 2L.

The RF processor 2$l$-10 may perform functions for transmitting and receiving signals through radio channels, e.g., signal band conversion and amplification. That is, the RF processor 2$l$-10 up-converts a baseband signal provided from the baseband processor 2$l$-20 to an RF band signal and transmits the RF band signal through an antenna, and down-converts an RF band signal received through an antenna, to a baseband signal. For example, the RF processor 2$l$-10 may include a transmit filter, a receive filter, an amplifier, a mixer, an oscillator, a DAC, and an ADC. Although only a single antenna is illustrated in FIG. 2L, the UE may include multiple antennas. The RF processor 2$l$-10 may include a plurality of RF chains. The RF processor 2$l$-10 may perform beamforming. For beamforming, the RF processor 2$l$-10 may adjust phases and amplitudes of signals transmitted or received through multiple antennas or antenna elements. The RF processor 2$l$-10 may perform MIMO and may receive data of multiple layers in the MIMO operation. The RF processor 2$l$-10 may perform received beam sweeping by appropriately configuring multiple antennas or antenna elements, or adjust a direction and a beam width of the received beam to coordinate with a transmit beam, under the control of the controller 2$l$-40.

The baseband processor 2$l$-20 may convert between a baseband signal and a bitstream based on physical layer specifications of a system. For example, for data transmission, the baseband processor 2$l$-20 generates complex symbols by encoding and modulating a transmit bitstream. For data reception, the baseband processor 2$l$-20 may reconstruct a received bitstream by demodulating and decoding a baseband signal provided from the RF processor 2$l$-10. For example, according to an OFDM scheme, for data transmission, the baseband processor 2$l$-20 generates complex symbols by encoding and modulating a transmit bitstream, maps the complex symbols to subcarriers, and then configures OFDM symbols by performing IFFT and CP insertion. For data reception, the baseband processor 2$l$-20 may split a baseband signal provided from the RF processor 2$l$-10, in OFDM symbol units, reconstruct signals mapped to subcarriers by performing FFT, and then reconstruct a received bitstream by demodulating and decoding the signals.

The baseband processor 2$l$-20 and the RF processor 2$l$-10 transmit and receive signals as described above. As such, each of the baseband processor 2$l$-20 and the RF processor 2$l$-10 may also be called a transmitter, a receiver, a transceiver, or a communicator. At least one of the baseband processor 2$l$-20 or the RF processor 2$l$-10 may include multiple communication modules to support multiple different radio access technologies. Also, at least one of the baseband processor 2$l$-20 or the RF processor 2$l$-10 may include multiple communication modules to process signals of different frequency bands. For example, the different radio access technologies may include an LTE network, NR network, etc. The different frequency bands may include an SHF (e.g., 2.5 GHz and 5 GHz) band and a mmWave (e.g., 60 GHz) band. The UE may transmit or receive a signal to or from a base station by using the baseband processor 2$l$-20 and the RF processor 2$l$-10, and the signal may include control information and data.

The storage 2$l$-30 may store data for operation of the UE, e.g., basic programs, application programs, and configuration information. The storage 2$l$-30 may provide the stored data upon request by the controller 2$l$-40. The storage 2$l$-30 may be configured in a storage medium, such as ROM, RAM, a hard disk, CD-ROM, or DVD, or a combination thereof. Also, the storage 2$l$-30 may be configured in a plurality of memories.

The controller 2$l$-40 may control overall operations of the UE. For example, the controller 2$l$-40 may transmit and receive signals through the baseband processor 2$l$-20 and the RF processor 2$l$-10. The controller 2$l$-40 may record and read data on and from the storage 2$l$-30. In this regard, the controller 2*l*-40 may include at least one processor. For example, the controller 2*l*-40 may include a CP for controlling communications and an AP for controlling an upper layer such as an application program. For example, controller 2*l*-40 may include multiple connection processor 2*l*-42. Also, at least one component in the UE may be embodied in one chip.

Figure 2M:
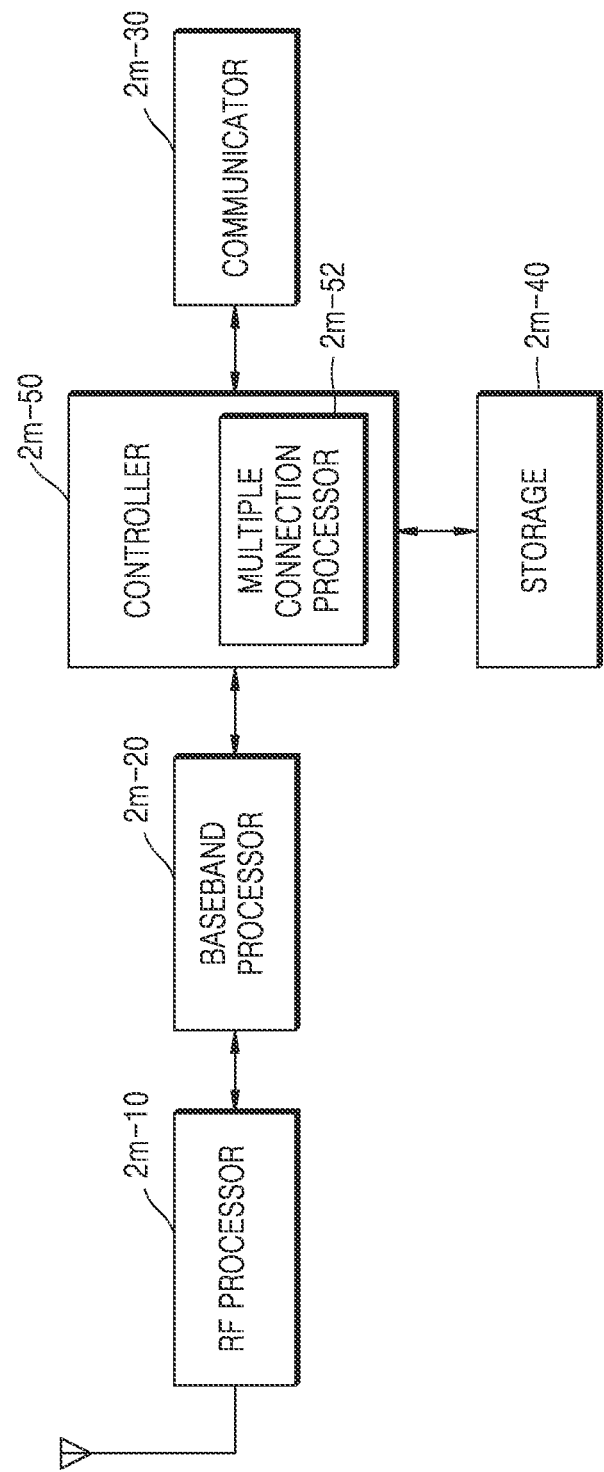
FIG. 2M is a block diagram of a TRP in a wireless communication system, according to an embodiment of the disclosure.

FIG. 2M is a block diagram of a TRP in a wireless communication system, according to an embodiment of the disclosure.

Referring to FIG. 2M, the TPR (or a base station) may include an RF processor 2*m*-10, a baseband processor 2*m*-20, a communicator 2*m*-30, a storage 2*m*-40, and a controller or at least one processor 2*m*-50. However, the TRP is not limited thereto, and may include more or less components than those shown in FIG. 2M.

The RF processor 2*m*-10 may perform functions for transmitting and receiving signals through radio channels, e.g., signal band conversion and amplification. That is, the RF processor 2*m*-10 up-converts a baseband signal provided from the baseband processor 2*m*-20, to an RF band signal and transmit the RF band signal through an antenna, and down-converts an RF band signal received through an antenna, to a baseband signal. For example, the RF processor 2*m*-10 may include a transmit filter, a receive filter, an amplifier, a mixer, an oscillator, a DAC, and an ADC. Although only a single antenna is illustrated in FIG. 2M, the RF processor 2*m*-10 may include a plurality of antennas. The RF processor 2*m*-10 may include a plurality of RF chains. In addition, the RF processor 2*m*-10 may perform beamforming. For beamforming, the RF processor 2*m*-10 may adjust phases and amplitudes of signals transmitted or received through multiple antennas or antenna elements. The RF processor 2*m*-10 may perform DL MIMO by transmitting data of two or more layers.

The baseband processor 2*m*-20 may convert between a baseband signal and a bitstream based on physical layer specifications of a first radio access technology. For example, for data transmission, the baseband processor 2*m*-20 may generate complex symbols by encoding and modulating a transmit bitstream. For data reception, the baseband processor 2*m*-20 reconstructs a received bitstream by demodulating and decoding a baseband signal provided from the RF processor 2*m*-10. For example, according to an OFDM scheme, for data transmission, the baseband processor 2*m*-20 generates complex symbols by encoding and modulating a transmit bitstream, maps the complex symbols to subcarriers, and then configures OFDM symbols by performing IFFT and CP insertion. For data reception, the baseband processor 2*m*-20 may split a baseband signal provided from the RF processor 2*m*-10, in OFDM symbol units, reconstruct signals mapped to subcarriers by performing FFT, and then reconstruct a received bitstream by demodulating and decoding the signals. The baseband processor 2*m*-20 and the RF processor 2*m*-10 may transmit and receive signals as described above. As such, each of the baseband processor 2*m*-20 and the RF processor 2*m*-10 may also be called a transmitter, a receiver, a transceiver, a communicator, or a wireless communicator. The TRP may transmit or receive a signal to or from a UE by using the baseband processor 2*m*-20 and the RF processor 2*m*-10, and the signal may include control information and data.

The communicator 2*m*-30 may provide an interface for communicating with other nodes in a network. According to some embodiments of the disclosure, the communicator 2*m*-30 may be a backhaul communicator.

The storage 2*m*-40 may store data for operation of the base station described above, e.g., basic programs, application programs, and configuration information. In particular, the storage 2*m*-40 may store information about bearers allocated for a connected UE, a measurement report transmitted from the connected UE, etc. The storage 2*m*-40 may store criteria information used to determine whether to provide or release multi-connectivity to or from the UE. The storage 2*m*-40 may provide the stored data upon request by the controller 2*m*-50. The storage 2*m*-40 may be configured in a storage medium, such as ROM, RAM, a hard disk, CD-ROM, or DVD, or a combination thereof. Also, the storage 2*m*-40 may be configured in a plurality of memories.

The controller 2*m*-50 may control overall operations of the TRP. For example, the controller 2*m*-50 may transmit and receive signals through the baseband processor 2*m*-20 and the RF processor 2*m*-10 or through the communicator 2*m*-30. The controller 2*m*-50 may record and read data on and from the storage 2*m*-40. In this regard, the controller 2*m*-50 may include at least one processor. For example, controller 2*m*-50 may include multiple connection processor 2*m*-52. Also, at least one component in the TRP may be embodied in one chip.

The methods according to the embodiments of the disclosure described in the claims or the detailed description may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

The embodiments of the disclosure provide an apparatus and method for effectively providing a service in a wireless communication system.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments of the disclosure described with reference to the specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined with each other as required. For example, a portion of one embodiment and a portion of another embodiment of the disclosure may be combined with each other to enable a base station and a UE to operate. Further, the embodiments of the disclosure are also applicable to another communication system, and other modifications based on technical ideas of the embodiments of the disclosure are also feasible.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a packet data convergence protocol (PDCP) entity of a user equipment (UE), of deciphering data in a wireless communication system, the method comprising:
    receiving a first PDCP data packet data unit (PDU);
    identifying an RCVD_COUNT of the first PDCP data PDU;
    identifying whether integrity protection is configured;
    in case that the integrity protection is configured, performing deciphering of the first PDCP data PDU using the RCVD_COUNT, performing integrity verification of the deciphered first PDCP data PDU, discarding the deciphered first PDCP data PDU in case that the integrity verification of the deciphered first PDCP data PDU fails, and discarding the deciphered first PDCP data PDU in case that the RCVD_COUNT is smaller than an RX_DELIV or in case that a second PDCP data PDU corresponding to the RCVD_COUNT is received before receiving the first PDCP data PDU; and
    in case that the integrity protection is not configured, discarding the first PDCP data PDU in case that the RCVD_COUNT is smaller than the RX_DELIV or in case that the second PDCP data PDU corresponding to the RCVD_COUNT is received before receiving the first PDCP data PDU, and performing deciphering of the first PDCP data PDU using the RCVD_COUNT in case that the first PDCP data PDU is not discarded based on the RCVD_COUNT not being smaller than the RX_DELIV and the second PDCP data PDU corresponding to the RCVD_COUNT not being received before receiving the first PDCP data PDU,
    wherein the RCVD_COUNT is a count value of the first PDCP data PDU, and
    wherein the RX_DELIV is a count value of a first PDCP service data unit (SDU) not delivered to an upper layer of the PDCP entity.

2. The method of claim 1, further comprising:
    indicating a failure of the integrity verification to the upper layer of the PDCP entity in case that the integrity verification of the deciphered first PDCP data PDU fails.

3. The method of claim 1, wherein the identifying of the RCVD_COUNT of the first PDCP data PDU comprises:
    comparing a sequence number (SN) of the first PDCP data PDU to an SN of the RX_DELIV;
    identifying, according to a result of the comparing, a hyper frame number (HFN) of the first PDCP data PDU based on an HFN of the RX_DELIV; and
    identifying the RCVD_COUNT based on the HFN of the first PDCP data PDU and the SN of the first PDCP data PDU.

4. The method of claim 1, further comprising:
    applying data filtering prior to performing the integrity verification and/or the deciphering.

5. A user equipment (UE) deciphering data in a wireless communication system, the UE comprising:
    a transceiver; and
    at least one controller coupled with the transceiver, the at least one controller configured to:
        receive, by a packet data convergence protocol (PDCP) entity of the UE, a first PDCP data packet data unit (PDU),
        identify, by the PDCP entity, an RCVD_COUNT of the first PDCP data PDU,
        identify, by the PDCP entity, whether integrity protection is configured,
        in case that the integrity protection is configured, perform, by the PDCP entity, deciphering of the first PDCP data PDU using the RCVD_COUNT, perform integrity verification of the deciphered first PDCP data PDU, discard the deciphered first PDCP data PDU in case that the integrity verification of the deciphered first PDCP data PDU fails, and discard, by the PDCP entity, the deciphered first PDCP data PDU in case that the RCVD_COUNT is smaller than an RX_DELIV or in case that a second PDCP data PDU corresponding to the RCVD_COUNT is received before receiving the first PDCP data PDU, and
        in case that the integrity protection is not configured, discard, by the PDCP entity, the first PDCP data PDU in case that the RCVD_COUNT is smaller than the RX_DELIV or in case that the second PDCP data PDU corresponding to the RCVD_COUNT is received before receiving the first PDCP data PDU, and perform, by the PDCP entity, deciphering of the first PDCP data PDU using the RCVD_COUNT in case that the first PDCP data PDU is not discarded based on the RCVD_COUNT not being smaller than the RX_DELIV and the second PDCP data PDU corresponding to the RCVD_COUNT not being received before receiving the first PDCP data PDU,
    wherein the RCVD_COUNT is a count value of the first PDCP data PDU, and
    wherein the RX_DELIV is a count value of a first PDCP service data unit (SDU) not delivered to an upper layer of the PDCP entity.

6. The UE of claim 5, wherein the at least one controller is further configured to:
    indicate a failure of the integrity verification to the upper layer of the PDCP entity in case that the integrity verification of the deciphered first PDCP data PDU fails.

7. The UE of claim 5, wherein the at least one controller is further configured to:
    compare a sequence number (SN) of the first PDCP data PDU to an SN of the RX_DELIV, identify, according to a result of the comparing, a hyper frame number (HFN) of the first PDCP data PDU based on an HFN of the RX_DELIV, and identify the RCVD_COUNT based on the HFN of the first PDCP data PDU and the SN of the first PDCP data PDU.

* * * * *